(12) United States Patent
Lam et al.

(10) Patent No.: US 11,906,798 B2
(45) Date of Patent: Feb. 20, 2024

(54) METHOD OF FORMING AN HERMETIC SEAL ON ELECTRONIC AND OPTOELECTRONIC PACKAGES

(71) Applicant: POET Technologies, Inc., San Jose, CA (US)

(72) Inventors: Yee Loy Lam, Singapore (SG); Suresh Venkatesan, Los Gatos, CA (US); Long Cheng Koh, Singapore (SG)

(73) Assignee: POET Technologies, Inc., Allentown, PA (US)

( * ) Notice: Subject to any disclaimer, the term of this patent is extended or adjusted under 35 U.S.C. 154(b) by 354 days.

(21) Appl. No.: 17/408,714

(22) Filed: Aug. 23, 2021

(65) Prior Publication Data
US 2021/0389532 A1    Dec. 16, 2021

Related U.S. Application Data

(63) Continuation of application No. 16/258,308, filed on Jan. 25, 2019, now Pat. No. 11,099,338, which is a continuation-in-part of application No. 16/036,151, filed on Jul. 16, 2018, now Pat. No. 10,551,561, and a continuation-in-part of application No. 16/036,179, filed on Jul. 16, 2018, now Pat. No. 10,962,715, and a continuation-in-part of application No. 16/036,208, filed on Jul. 16, 2018, now Pat. No. 10,663,660, and a continuation-in-part of application No. 16/036,234,
(Continued)

(51) Int. Cl.
| | |
|---|---|
| G02B 6/42 | (2006.01) |
| G02B 6/02 | (2006.01) |
| G02B 6/13 | (2006.01) |
| G02B 6/12 | (2006.01) |

(52) U.S. Cl.
CPC ....... *G02B 6/4251* (2013.01); *G02B 6/02309* (2013.01); *G02B 6/13* (2013.01); *G02B 2006/1213* (2013.01); *G02B 2006/12169* (2013.01); *G02B 2006/12173* (2013.01); *G02B 2006/12176* (2013.01)

(58) Field of Classification Search
CPC .... G02B 6/4251; G02B 6/02309; G02B 6/13; G02B 2006/1213; G02B 2006/12169; G02B 2006/12173; G02B 2006/12176; G02B 6/12
See application file for complete search history.

(56) References Cited

U.S. PATENT DOCUMENTS

| | | | | |
|---|---|---|---|---|
| 2007/0128966 A1* | 6/2007 | Becken | ................. | H05B 33/04 445/24 |
| 2009/0277887 A1* | 11/2009 | Kurachi | ............... | B23K 26/206 219/121.64 |

* cited by examiner

*Primary Examiner* — Selim U Ahmed
(74) *Attorney, Agent, or Firm* — Tue Nguyen

(57) ABSTRACT

A method for forming hermetic seals between the cap and sub-mount for electronic and optoelectronic packages includes the formation of metal mounds on the sealing surfaces. Metal mounds, as precursors to a metal hermetic seal between the cap and sub-mount of a sub-mount assembly, facilitates the evacuation and purging of the volume created within cap and sub-mount assemblies prior to formation of the hermetic seal. The method is applied to discrete cap and sub-mount assemblies and also at the wafer level on singulated and non-singulated cap and sub-mount wafers. The method that includes the formation of the hermetic seal provides an inert environment for a plurality of electrical, optoelectrical, and optical die that are attached within an enclosed volume of the sub-mount assembly.

20 Claims, 37 Drawing Sheets

Related U.S. Application Data filed on Jul. 16, 2018, now Pat. No. 10,795,079, and a continuation-in-part of application No. 16/258,292, filed on Jan. 25, 2019, now Pat. No. 10,718,905.

(60) Provisional application No. 62/621,659, filed on Jan. 25, 2018, provisional application No. 62/727,538, filed on Sep. 5, 2018.

Magnified view of area within dotted lines

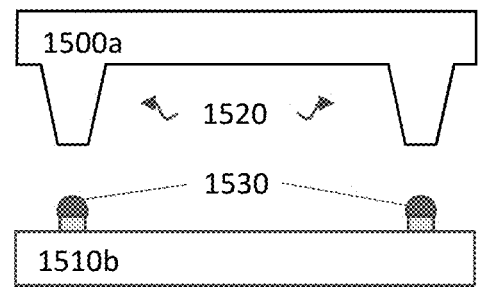 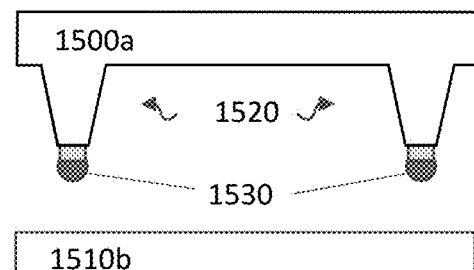
(a) (b)
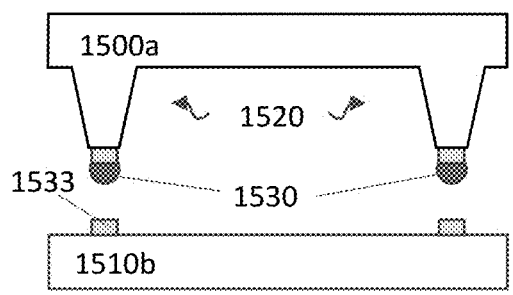 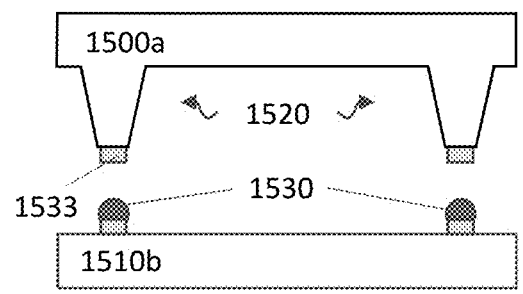
(c) (d)
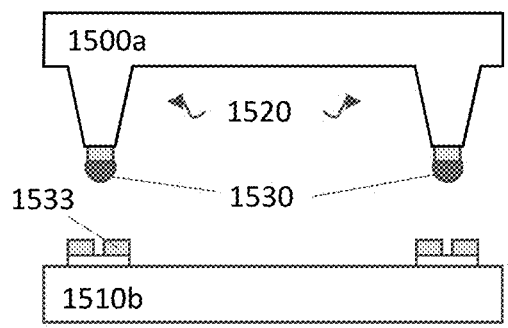 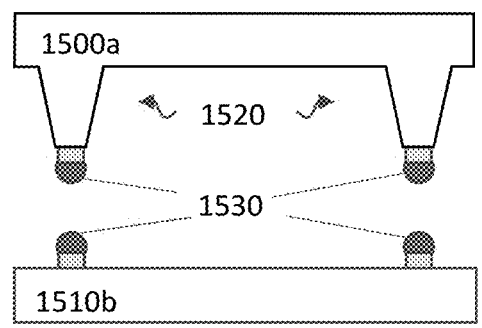
(e) (f)
Figure 15A

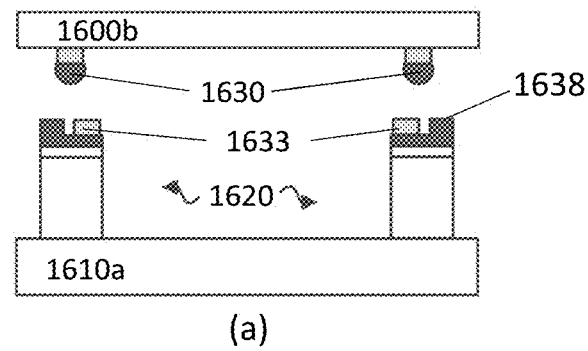
(a)
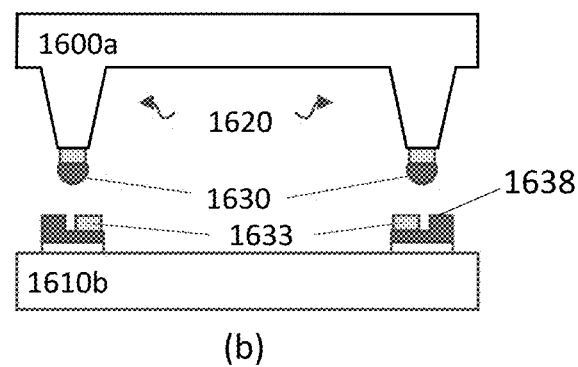
(b)
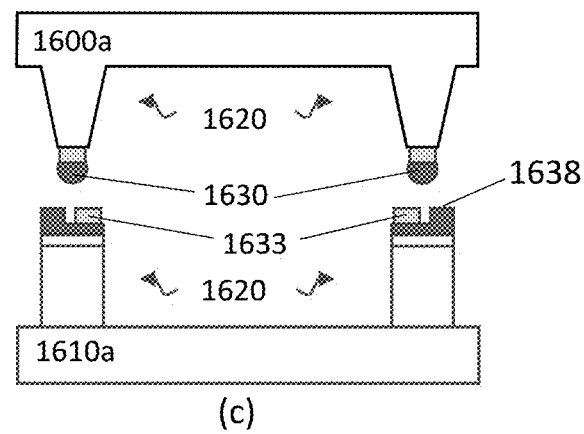
(c)
Figure 16A

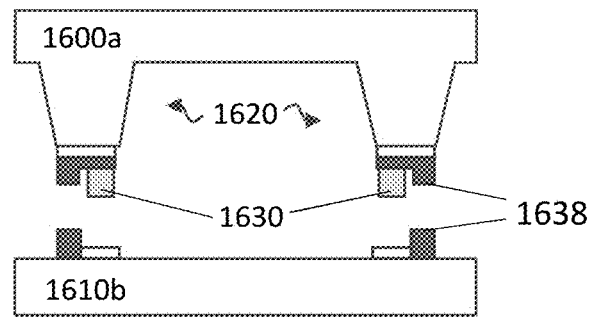
(a)
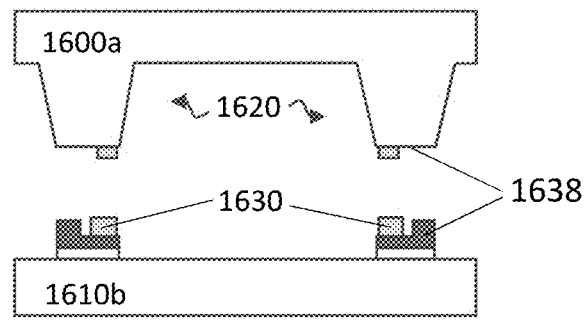
(b)
Figure 16C

400GBASE-DR4 Optical Engine Block Architecture using Dielectric Interposers

400GBASE-FR-8, LR8 Optical Engine Block Architecture using Dielectric Interposers

METHOD OF FORMING AN HERMETIC SEAL ON ELECTRONIC AND OPTOELECTRONIC PACKAGES

The present application is a continuation and claims priority from U.S. patent application Ser. No. 16/258,308, filed on Jan. 25, 2019, entitled "METHOD OF FORMING AN HERMETIC SEAL ON ELECTRONIC AND OPTO-ELECTRONIC PACKAGES" (OPE-106), which is a continuation in-part of and claims priority from U.S. Provisional Patent Application Ser. No. 62/621,659, filed on Jan. 25, 2018, entitled: "Optical Dielectric Interposer" (OPE010-PRO), U.S. Provisional Patent Application Ser. No. 62/727,538, filed on Sep. 5, 2018, entitled: "Hermetic Sealing Method for Capped Subassemblies" (OPE106-PRO), U.S. Utility patent application Ser. No. 16/036,151, filed on Jul. 16, 2018, entitled: "Optical Dielectric Waveguide Structures" (OPE101), U.S. Utility patent application Ser. No. 16/036,179, filed on Jul. 16, 2018, entitled: "Methods for Optical Dielectric Waveguide Structures" (OPE102), U.S. Utility patent application Ser. No. 16/036,208, filed on Jul. 16, 2018, entitled: "OPTICAL DIELECTRIC WAVEGUIDE SUBASSEMBLY STRUCTURES" (OPE103), U.S. Utility patent application Ser. No. 16/036,234, filed on Jul. 16, 2018, entitled: "METHODS FOR OPTICAL DIELECTRIC WAVEGUIDE SUBASSEMBLY STRUCTURE" (OPE104), U.S. Utility patent application Ser. No. 16/258,292, filed on Jan. 25, 2019, entitled: "OPTICAL DIELECTRIC PLANAR WAVEGUIDE PROCESS" (OPE105) all of which are incorporated herein by reference.

FIELD OF THE INVENTION

The present invention relates to the packaging of optoelectronic and electronic devices, and more particularly to a method for the formation of hermetic seals in the manufacturing of packaged electronic and optoelectronic assemblies.

BACKGROUND

Electronic devices benefit from operation in a controlled environment. Methods for the formation of hermetic seals Conventional packaging of optoelectronic packages In Photonic Integrated Circuits (PICs), various optical, electronic, optoelectronic, and electrical functionalities are commonly combined on a substrate, an interposer or a submount assembly. Interposers are used in the fabrication of optical and electronic devices as a platform upon which discrete circuit elements are combined to perform a specific function or set of functions. In optical assemblies, for example, a set of components such as a sending device, a receiving device, and a waveguide device are combined to create a transceiver. In this example, a laser (sending device), a photodetector (receiving device), and an arrayed waveguide (waveguide) are combined on a substrate. The substrate, or platform upon which the devices are combined, is often referred to as an interposer or a sub-mount, and the combination of the interposer with the components is often referred to as a sub-mount assembly. The sub-mount assembly is a platform for assembling and interconnecting discrete devices such as lasers, photodetectors, and other devices such as waveguides into a functional product. Similar subassemblies have been used in the industry for electronic applications that include integrated circuits, photonic integrated circuits, sensors, biomedical devices, among others.

In both optoelectronic and electronic applications, there is often a need for the mounted optical and electrical devices and circuits to be isolated from ambient conditions. Isolation is often provided by capping the interposer or sub-mount assembly. Hermetic sealing of a capped subassembly aids in maintaining functionality and performance of the optical die and optoelectric circuit components contained within an optoelectronic enclosure by reducing or eliminating uncontrolled environmental conditions. Similar requirements are often required for the packaging of electronic circuits, electromechanical devices, sensors, biomedical devices, and a range of other devices that are susceptible to degradation or drift in properties upon prolonged exposure to ambient conditions. Conventional packaging methods for optical enclosures, for example, can be bulky and difficult to implement. Thus, there is a need in the art for applications that require isolation from ambient, for a cost-effective method to provide an hermetically sealed cap over the submount assembly.

SUMMARY

In an embodiment of the present invention, a method for forming an hermetic seal on an optoelectronic or electronic package is provided. The optoelectronic or electronic package includes a sub-mount, at least one optical or electrical die, and a cap. Metal mounds are formed on the sub-mount, the cap, or both. The solder mounds provide the means for evacuating or displacing air from the capped assembly, prior to forming the hermetic seal, and provide the material for forming the hermetic seal between the cap and submount.

In some embodiments, solder mounds are formed on the sealing surface on the cap. The cap is then positioned such that the spaced solder mounds are in contact with a sub-mount to allow for displacement of the air from a cavity formed within the cap and sub-mount with an inert gas. Upon replacement of the air with an inert gas through the gaps in the solder mounds, the cap and sub-mount are heated to contain the inert gas in the cavity and to form an hermetic seal between the cap and the sub-mount.

In some embodiments, the metal mounds are formed on individual caps that are then mounted to individual sub-mounts. In yet other embodiments, the metal mounds are formed on individual caps that are then combined with singulated or non-singulated sub-mounts. In yet other embodiments, the solder mounds are sequentially formed on multiple singulated or non-singulated cap structures prior to combining with singulated or non-singulated sub-mounts. In yet other embodiments, the metal mounds are simultaneously formed on caps that are fabricated across multiple singulated or non-singulated cap structures, prior to combining with singulated or non-singulated sub-mounts. Formation of the metal mounds is accomplished in some embodiments on singulated caps and in some embodiments on non-singulated caps. Similarly, the combining of one or more caps with one or more sub-mounts is accomplished in some embodiments on singulated sub-mounts and in some embodiments on non-singulated sub-mounts.

The advantages of the hermetic sealing methods will become more apparent upon reference to the descriptions, drawings, and disclosed exemplary embodiments described herein.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIG. 1A top and side views of sub-mount without a cap that shows the hermetic seal layer and the area of the sub-mount enclosed by the hermetic seal, and FIG. 1B the top and side views of sub-mount with cap that shows the cavity in the assembly;

FIG. 8A patterned mask formation of cavity walls and FIG. 8B etch to form cavity;

FIG. 15A(a-f) show embodiments for a cap with cavity and flat sub-mount substrate;

FIG. 16A(a-c) shows cap and sub-mount assembly in embodiments with z-stops and with metal mounds on the cap for FIG. 16Aa assembly with flat cap and cavity in sub-mount, FIG. 16Ab assembly with cavity in cap and flat sub-mount, and FIG. 16Ac assembly with cavities in both the cap and the sub-mount;

FIG. 16Ba with metal mounds on the sub-mount, FIG. 16Bb with metal mounds on the cap, and FIG. 16Bc with metal mounds on both the cap and the sub-mount;

FIG. 16C(a-b) show cap and sub-mount assembly in embodiments with z-stops for assemblies with a cavity in the cap: FIG. 16Ca with metal mounds on the cap, and FIG. 16Cb with metal mounds on the sub-mount and with the cap used as a portion of the z-stop;

FIG. 27A Neighboring die from a ODI submount wafer that shows the relative position of the loop back waveguide wafer level test feature before singulation of the die, and FIG. 27B a single submount assembly substrate after singulation of the die;

FIG. 28A shows a cap without cantilevered section for mounting optical fibers and FIG. 28B shows a cap with a cantilevered section for mounting optical fibers;

FIG. 29B A drawing of the cross section of the structure in FIG. 29A, with the fiber positioned in place within the V-groove;

Figure 1A:
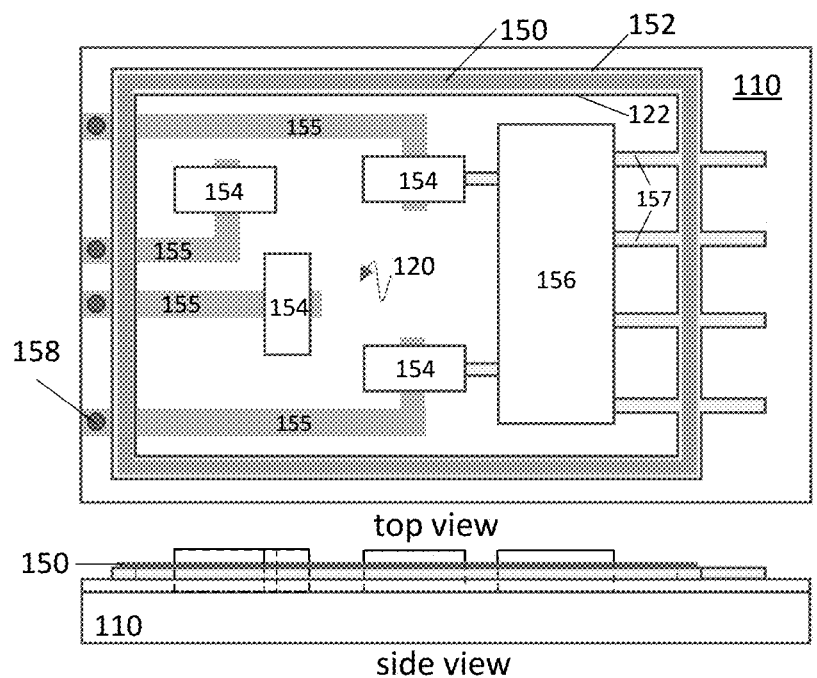
FIG. 1A-1B show an embodiment of a cap and a sub-mount assembly with an hermetically sealed volume.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

A "substrate" as used herein and throughout this disclosure refers to, but is not limited to, a surface upon which semiconductor structures, such as a single-mode dielectric optical waveguide (SMDOW) and embodiments of the invention may be formed. This may include, but not be limited to, InP, GaAs, silicon, silica-on-silicon, silica, silica-on-polymer, glass, a metal, a ceramic, a polymer, or a combination thereof.

A "metal" as used herein and throughout this disclosure refers to, but is not limited to, a material (element, compound, and alloy) that has good electrical and thermal conductivity as a result of readily losing outer shell electrons. This may include, but not be limited to, solder and solder alloys, tin, silver, gold, chromium, aluminum, lead, indium, platinum, nickel, copper, rhodium, palladium, tungsten, and combinations of such materials.

A "solder" as used herein and throughout this disclosure refers to, but is not limited to, a material (element, compound, and alloy) that has a low melting point (<400-500° C.) and has good bonding properties with other metals, and includes but is not limited to SnAgCu (SAC 105, SAC 305, SAC 405), SnAg, PbSn (95/5, 90/10), AuSn 80/20, InSn, and SnBi.

An "electrical device" as used herein and throughout this disclosure refers to, but is not limited to, a device that exhibits one or more of electrical properties such as resistance, capacitance, and inductance, and which are typically connected into an electrical circuit. Types of electrical devices include electrical devices, optoelectrical devices, electro-optical devices, p-n junctions, diodes, sensors, micro-electromechanical devices (MEMS), bioMEMS, switches, transistors, and superconductive devices, among others. Electrical devices typically have electrical contacts.

An "optical device" as used herein and throughout this disclosure refers to, but is not limited to, devices that respond to, generate, or transmit optical signals. Types of optical devices include waveguides, gratings, spectrometers, lasers, photodetectors, among others. Some optical devices such as lasers and photodetectors, among others, are also electrical devices, optoelectrical devices, or electro-optical devices.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Referring to FIG. 1A, top and side views of an embodiment of sub-mount substrate 110 are shown. In the top view, hermetic seal 150 is shown on patterned dielectric layer 152. Patterned dielectric layer 152 forms a patterned enclosure within which electrical and optoelectrical devices 101 are mounted. Electrical traces 104 provide interconnections between devices within the enclosed volume 120 (not shown) and also provide connections to the outside of enclosed area 120. Also shown within the enclosed volume 120 on sub-mount 110 is optical device 102. Optical devices 120, in some embodiments, are connected to the outside of the enclosed volume 120 via waveguides 105.

Figure 1B:
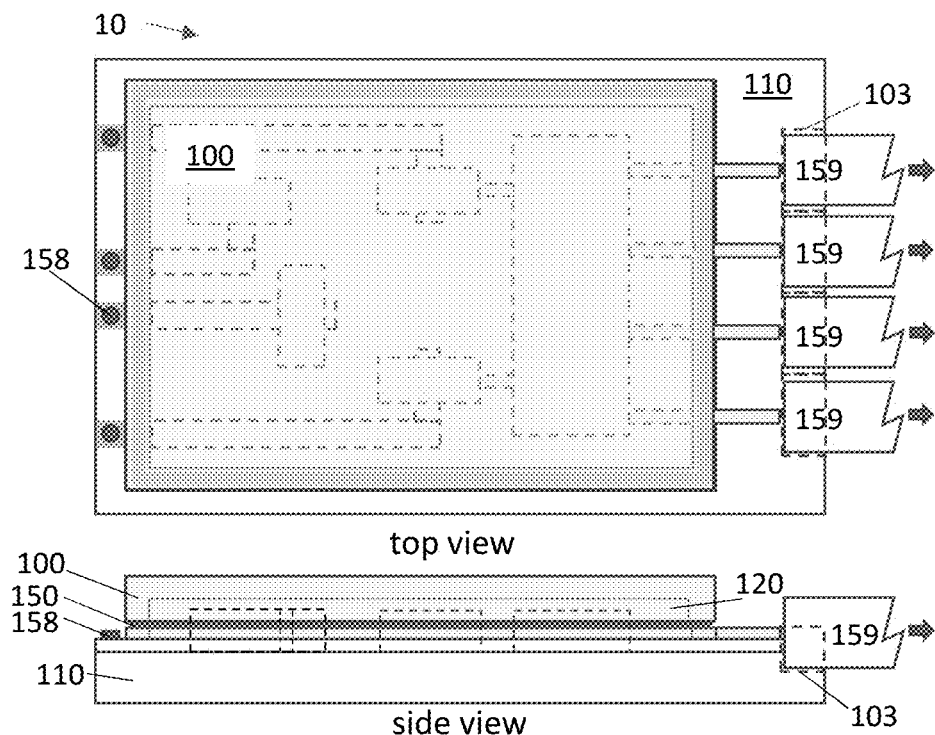

Referring to FIG. 1B, top and side views of an embodiment of sub-mount substrate 110 with cap 100 over enclosed volume 120 are shown. In the embodiment shown in the top view of FIG. 1b, the cap 100 covers the enclosed volume 120. In the embodiment shown in FIG. 1, an hermetic seal 150 is shown on patterned dielectric layer 152. Electrical traces 104 provide connections to the outside of enclosed volume 120 in embodiment shown. Also shown within the enclosed volume 120 on sub-mount 110 is optical device 102. Optical devices 120, in some embodiments, are connected to the outside of the enclosed area 120 via waveguides 105. Optical fibers 103 connect to sub-mount 110 in the embodiments shown in FIG. 1B. Hermetic seal 150 contains and isolates environment within volume 120 from ambient.

Figure 2A:
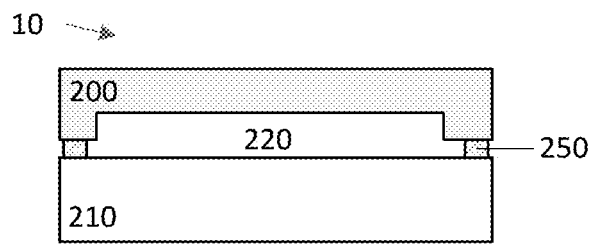
FIG. 2A-2C show schematic cross sections of cap and sub-mount subassemblies with hermetic seal layer and with cavities in FIG. 2A the cap, FIG. 2B the sub-mount, and FIG. 2C both the cap and the sub-mount.
Figure 2B:
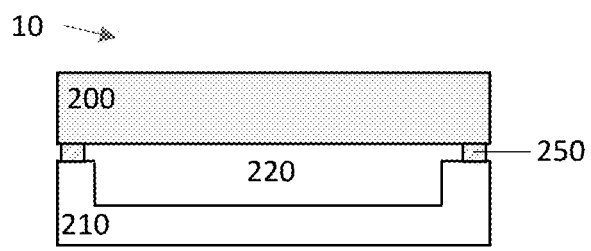
Figure 2C:
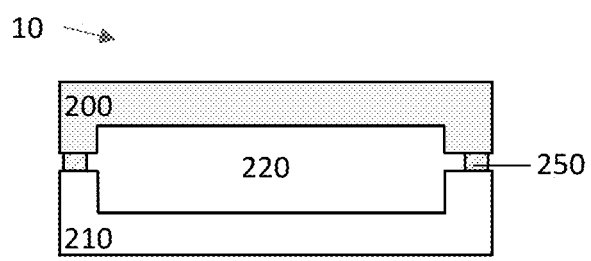

Referring now to FIG. 2, a cross sectional schematic views of some embodiments of cap and sub-mount assemblies 20 are shown. FIG. 2A shows a cap and sub-mount assembly with cap 200, sub-mount 210, and hermetic seal 250. A recess in the cap 200 forms cavity 220 between the cap 200 and the sub-mount 210. In embodiments, an inert environment is provided in the enclosed volume formed in cavity 220 between the cap 200 and the sub-mount 210 as described herein. The recess is provided in embodiments to accommodate optical, optoelectrical, and electrical devices, and in some embodiments, the interconnections between these devices. In FIG. 1a, a recess is provided in the cap 200. In FIG. 2B, a recess is shown in the sub-mount 210 and in FIG. 2C, a recesses are provided in both the cap 200 and the sub-mount 210. The recessed volumes in the caps 200 and the sub-mounts 210 form cavity 220 in the sub-mount assemblies 20. Hermetic seal 250 provides and maintains the isolation between the cavity 220 and ambient environmental conditions outside of the sealed cavities 220.

Figure 3:
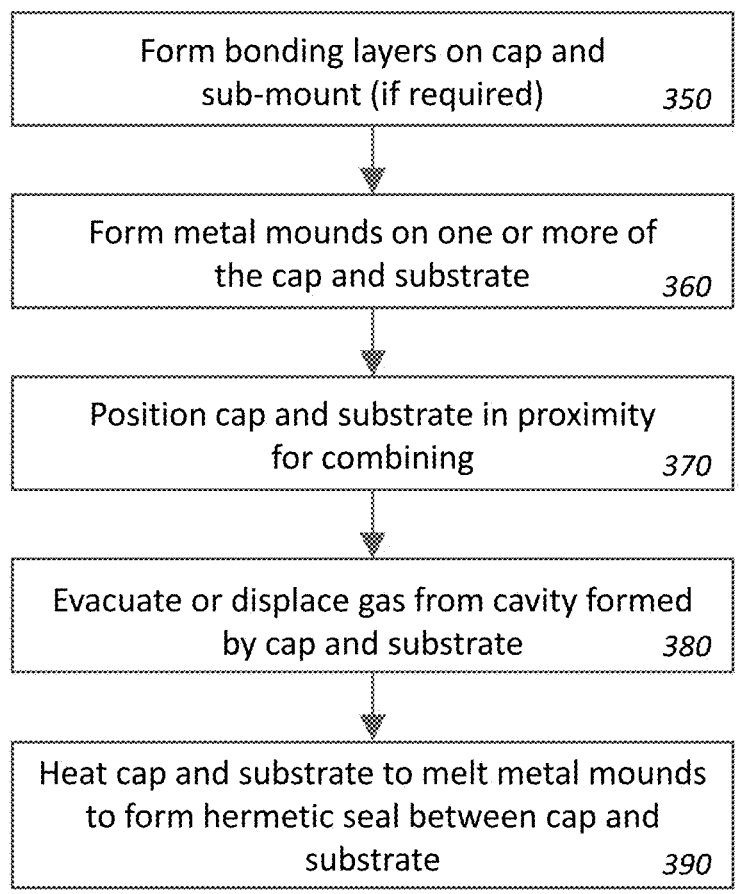
FIG. 3 shows a hermetic seal fabrication sequence for some embodiments.
Figure 4A:
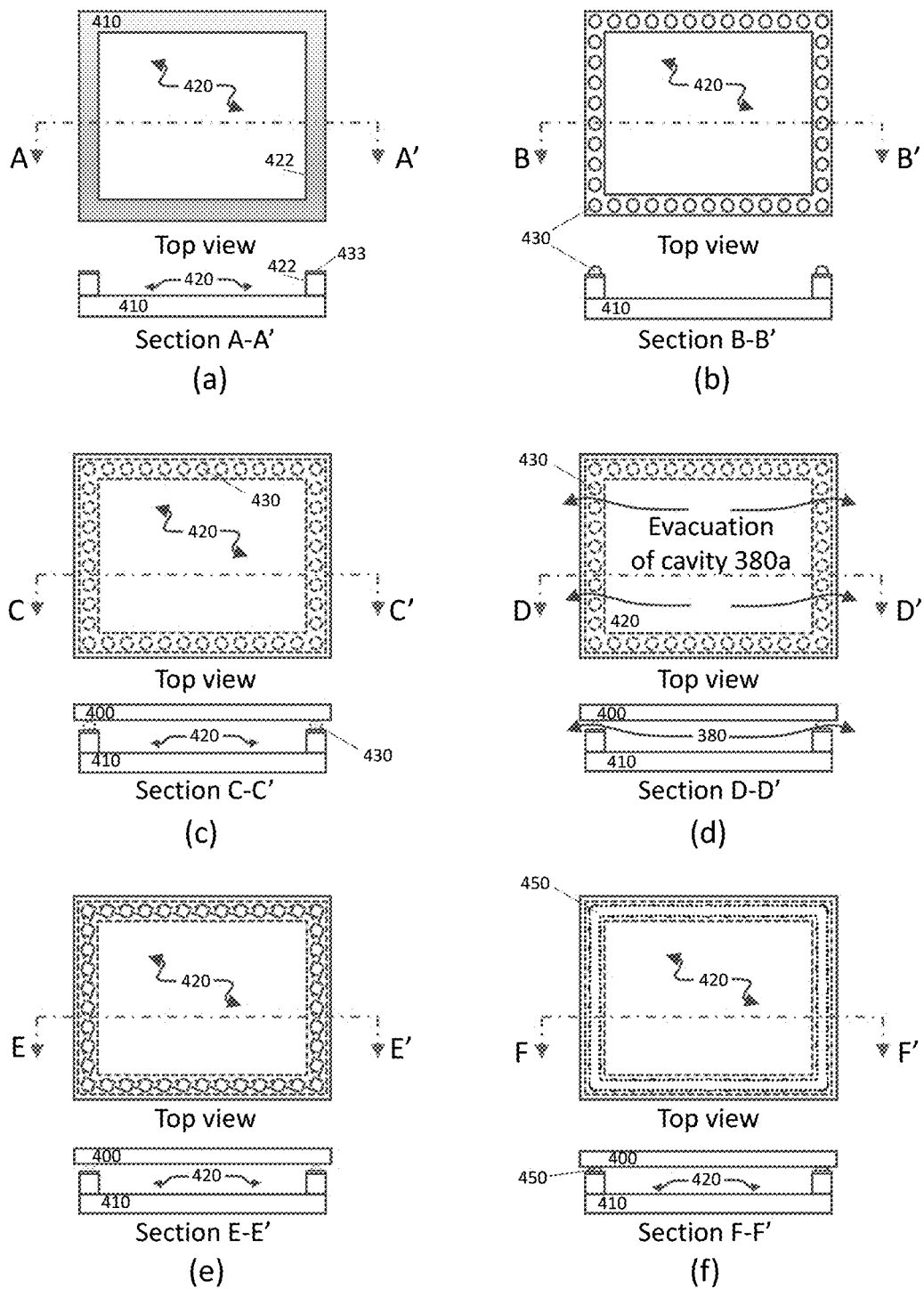
FIG. 4A(a-f) shows fabrication sequence in some embodiments with evacuation step.
Figure 4B:
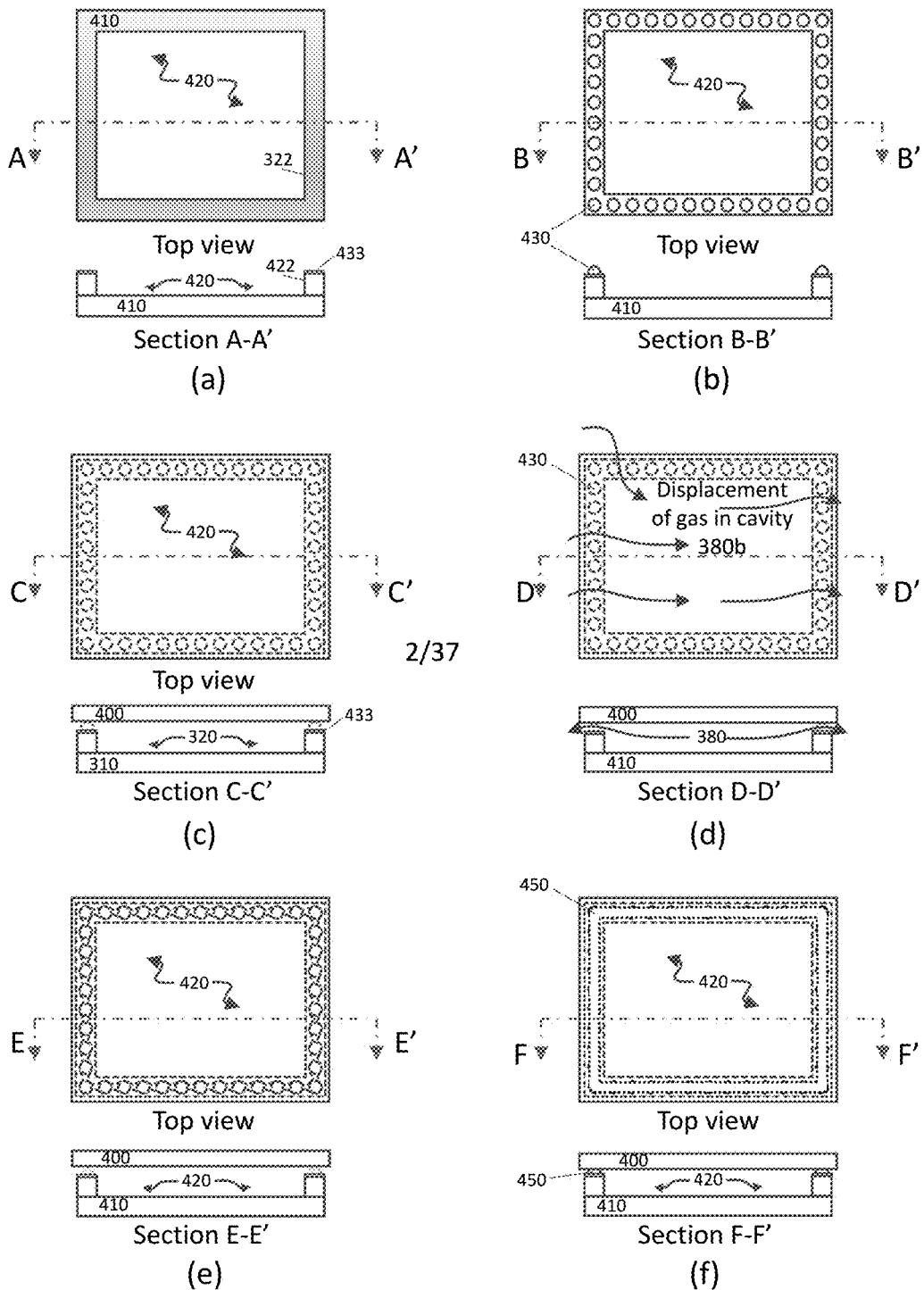
FIG. 4B(a-f) shows fabrication sequence in some embodiments with gas displacement step.

The steps for forming hermetic seal 250 in some embodiments are shown in FIG. 3 in accordance with sequences illustrated in FIGS. 4A and 4B. In step 350, bonding layers are applied to the cap 400 and sub-mount substrate 410. These bonding or adhesion layers 433, facilitate bonding of the metal mounds 430 that are formed in step 360. In some embodiments, bonding layer 433 is a metal layer with which a strong bond can be formed with the metal mounds 430 that are formed in metal mound formation step 360. In metal mound forming step 360, islands of metal are formed on hermetic sealing surfaces on cavity wall 422. In the embodiment shown in FIGS. 4A-a and 4B-a, the hermetic sealing surface is the top surface of the bonding layer 433 on the top of cavity wall 422. Metal mounds 430 formed on cavity wall 422, shown in FIGS. 4A-b and 4B-b are deposited using a solder ball jetting tool in some embodiments and in other embodiments, are deposited using metal deposition techniques such as electrochemical deposition, evaporation, and sputtering, for example. Metal deposition techniques are well known in the art of semiconductor device fabrication. In some embodiments, electroless deposition is used to deposit metal mounds 430. In some embodiments, in conjunction with deposition techniques such as metal evaporation, electrodeposition, electroless deposition, and sputtering, photolithographic methods and techniques are used to form patterns in photosensitive layers that provide openings within which to deposit the islands of metal on the cavity walls 422 of the sub-mount 410. In some embodiments, techniques such as lift-off are used to remove excess metal from regions outside of the islands 430. In a typical lift-off step, the excess metal is rinsed away with the dissolution and removal of a soluble layer beneath the regions in which the excess metal is deposited. In deposition methods that utilize photolithography to pattern the regions for island formation, the photosensitive layers are typically much thicker than the deposited metal layers 430. Holes patterned in the photosensitive layers, within which the metal islands 430 are formed, are typically only partially filled relative to the overall thickness of the photosensitive layers to facilitate the ease of removal in the solvent bath used to dissolve the photosensitive layer after deposition of the metal.

After forming step 360, in which metal mounds 430 are formed on adhesion layer 433 on the top of cavity walls 422, cap 400 is aligned to the sub-mount 410 in positioning step 370. In the embodiments shown in FIG. 4A-c and FIG. 4B-c, flat cap 400 is shown. Cap 400 is formed from a material that has favorable bonding properties with the material in metal mound 430 in some embodiments. In other embodiments, cap 400 has adhesion layer 433 (not shown on cap) to facilitate bonding with the material in the metal mounds 430. After alignment of the cap 400 and sub-mount 410, in embodiments, air or other gas from within the cavity region 420, is evacuated or displaced in evacuation/displacement step 380 as in FIG. 4A-d or FIG. 4B-d, respectively. A controlled environment is formed in some embodiments with the evacuation of air from within the cavity 320. In some embodiments in which the evacuation/displacement step 380 is an evacuation step, the air is removed from cavity 420 using a suitable process chamber that is equipped with a vacuum pump or other vacuum forming apparatus. Air from within cavity 420 escapes through openings between the metal mounds 430 as shown in the top down and cross-sectional illustrations in FIG. 4A-d. In other embodiments in which the evacuation/displacement step 380 is a displacement step 380a, the air is displaced from cavity 420 using a suitable process chamber that is equipped with a gas source or other means for providing an inert or otherwise suitable gas and an exit or exhaust port to enable or allow for the removal of gas, including the undesirable air from with the cavity 420, from the process chamber. Undesirable air from the cavity 420 is displaced by the movement of inert gas through the openings between the metal mounds 430. In some embodiments, the substrate is heated prior to, or during the evacuation/displacement step 380 to promote the release of water molecules and oxygen molecules from surfaces within cavity 420. Heating, prior to, or during the evacuation/displacement step 380 is limited in some embodiments to temperatures below the soft melting temperature of the metal from which the metal mounds 430 are formed.

In some embodiments, gas is evacuated from cavity 420 using an evacuation step 380a, and this evacuation step 380a is followed by a heating/sealing step 390 in which the metal mounds 430 are raised to a temperature, typically just above the melting point, to enable the liquified metal mounds 430 to melt and flow to fill the openings between the metal mounds 430 to form a continuous hermetic seal 450. In some embodiments, a mechanical force is applied to the cap 400 or sub-mount 410 to narrow the gap between the cap 400 and the sub-mount 410. FIG. 4A-e shows the anticipated partial flow of the metal mounds 430 as the mound material moves into the gaps between the metal mounds as the temperature is raised beyond the melting point in heating step 390. Narrowing of the gap between the cap 400 and sub-mount 410 is also depicted in FIG. 4B-e. The movement of the melted metal mound between into the gaps between the mounds 430 is shown for illustrative purposes for some embodiments. In other embodiments, the gap between the cap and the sub-mount does not narrow. Factors such as the sealing temperature, the heating rate, and the heating duration, along with such factors as the choice of metal in the metal mound 430, the choice of the adhesion or binding material 433, and the surface tension in the melted metal, among other variables, can each contribute to the progression of the hermetic seal formation in step 390. After the gaps between the metal mounds have been bridged with the melted metal, the temperature of the assembly is reduced to re-solidify the metal and to form the hermetic seal 450 with evacuated cavity 420. The hermetically sealed assembly with cap 400 and sub-mount 410 is shown in FIG. 4A-f.

In yet other embodiments, gas is displaced from cavity 420 in evacuation/displacement step 380 using a displacement step 380b, and this displacement step 380b is followed by a heating/sealing step 390 in which the metal mounds 430 are raised to a temperature, typically just above the melting point, to liquify the metal mounds 430 and enable the liquified metal to flow to fill the openings between the metal mounds 430 to form a continuous hermetic seal 450. In some embodiments, a mechanical force is applied to the cap 400 or sub-mount 410 to narrow the gap between the cap 400 and the sub-mount 410. FIG. 4B-e shows the anticipated partial flow of the metal mounds 430 as the mound material moves into the gaps between the metal mounds as the temperature is raised beyond the melting point in heating step 390. Narrowing of the gap between the cap 400 and sub-mount 410 is also depicted in FIG. 4B-e. The movement of the melted metal mound between into the gaps between the mounds is shown for illustrative purposes for some embodiments. In other embodiments, the gap between the cap and the sub-mount does not narrow. Factors such as the sealing temperature, the heating rate, and the heating duration, along with such factors as the choice of metal mound material 430, the choice of the adhesion or binding material 433, and the surface tension in the melted metal, among other variables, can each contribute to the progression of the hermetic seal formation in step 390. After the gaps between the metal mounds have been bridged with the melted metal, the temperature of the assembly is reduced to re-solidify the metal and to form the hermetic seal 450 with the displacer gas in cavity 420. The hermetically sealed assembly with cap 400 and sub-mount 410 is shown in FIG. 4B-f.

In yet other embodiments, gas is evacuated from cavity 420 using an evacuation step 380a, and this evacuation step 380a is followed by a purging step to fill the cavity 420 with the purge gas prior to the heating/sealing step 390. In heating/sealing step 390, the metal mounds 430 are raised to a temperature that is typically just above the melting point to liquify the metal mounds 430 and enable the liquified metal to flow to fill the openings between the metal mounds 430 to form continuous hermetic seal 450. In some embodiments, a mechanical force is applied to the cap 400 or sub-mount 410 to narrow the gap between the cap 400 and the sub-mount 410. FIG. 4B-e shows the anticipated partial flow of the metal mounds 430 as the mound material moves into the gaps between the metal mounds as the temperature is raised beyond the melting point in heating step 390. Narrowing of the gap between the cap 400 and sub-mount 410 is also depicted in FIG. 4B-e. The movement of the melted metal mound between into the gaps between the mounds is shown for illustrative purposes for some embodiments. In other embodiments, the gap between the cap and the sub-mount does not narrow with heating. Factors such as the sealing temperature, the heating rate, and the heating duration, along with such factors as the choice of metal mound material 430, the choice of the adhesion or binding material 433, and the surface tension in the melted metal, among other variables, can each contribute to the progression of the hermetic seal formation in step 390. After the gaps between the metal mounds have been bridged with the melted metal, the temperature of the assembly is reduced to re-solidify the metal and to form the hermetic seal 450 with the purge gas in cavity 420. The hermetically sealed assembly with cap 400 and sub-mount 410 is shown in FIG. 4B-f.

Figure 5:
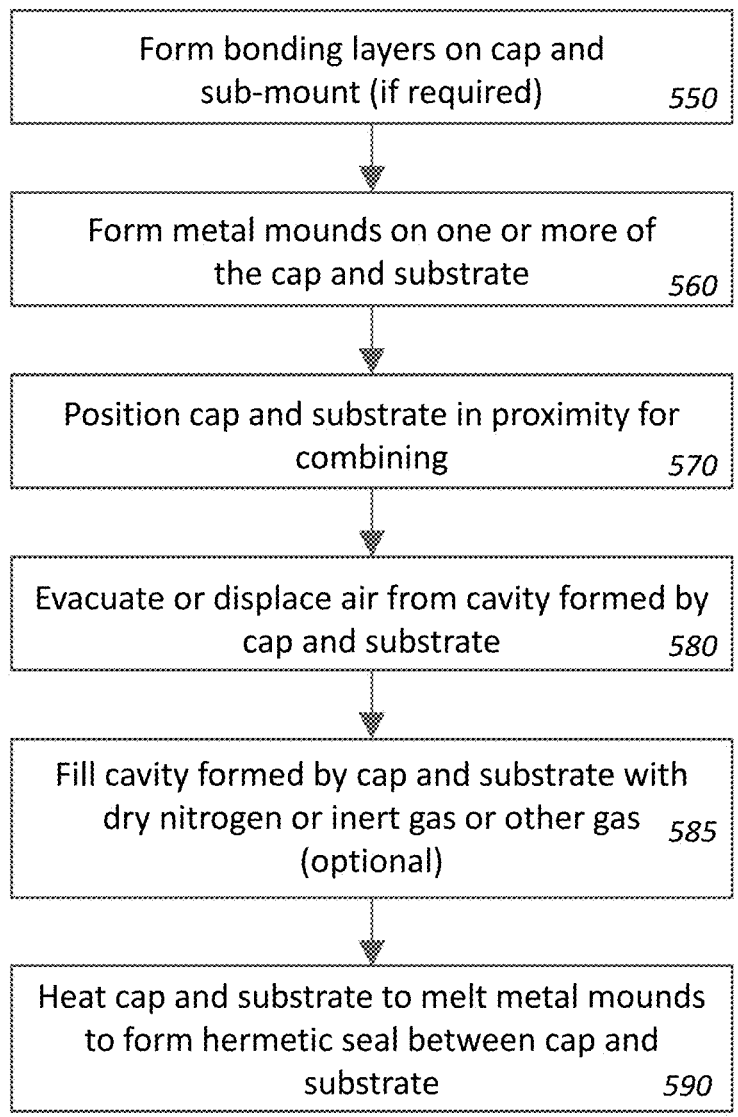
FIG. 5 shows steps in some embodiments for forming an hermetic seal with metal islands or mounds that includes a step for filling cavity with gas.

Referring to FIG. 5, a process flow is shown for embodiments that includes a fill step 585 of the cavity 420 following the evacuation/displacement step 580. In step 550, bonding layers 433 are formed on the cap 400 and sub-mount 410 if required. In some embodiments, the cap 400 or sub-mount 410 are fabricated of materials that require the addition of adhesion layer 433. In some embodiments, the cap 400 or sub-mount 410 are fabricated of materials that do not require the addition of adhesion layer 433. In step 560, metal mounds 430 are formed on cap 400 or sub-mount 410. In step 570, the cap 400 and sub-mount 410 are positioned in proximity for combining. In step 580, air from within the cavity 420 formed by the placement of the cap 400 in proximity to the sub-mount 410 is evacuated 580a or displaced 580b. In step 585, the cavity 420 formed by the placement of the cap 400 in proximity to the sub-mount 410 is filled with nitrogen, argon, dry air, or other inert gas. The particular gas or gases used in fill step 585 is dependent on the specific requirements for the operation of the devices within the cavity 420. In many embodiments, the removal and replacement of ambient air with dry nitrogen is sufficient to provide an adequately inert environment to ensure reliable long term operation of the devices and materials within the cavity 420. In some embodiments, the dry nitrogen at a pressure above or below that of ambient is necessary. Specific conditions for the inert environment are dependent on the requirements and operating conditions to which the materials and devices contained within the cavity 420 are exposed. Some optical devices, such as waveguides for example, do not produce high temperatures and may not require the highly inert environments that other devices such as lasers might require. The potential for degradation is higher in configurations in which devices such as lasers are implemented in cavity 420 as a result of the excess heat that is generated by these devices.

Figure 6:
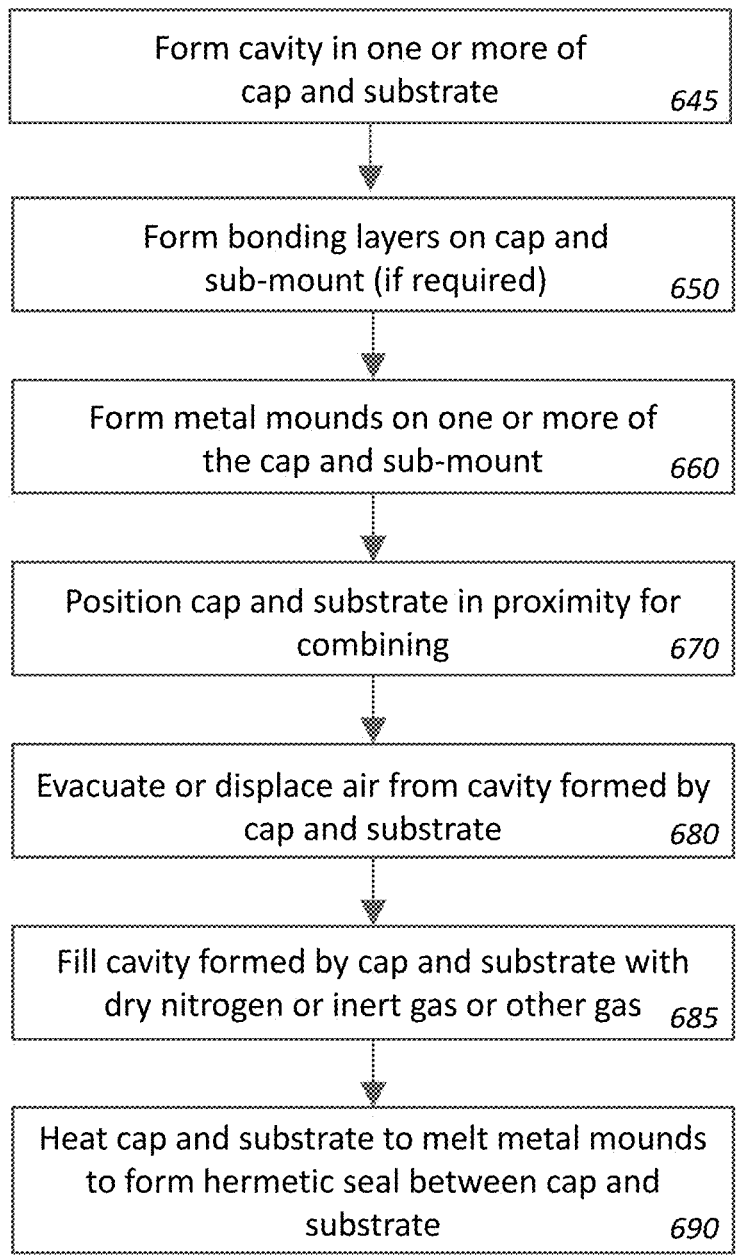
FIG. 6 shows steps for forming an hermetic seal with metal mounds in embodiments that include the formation of a recess in the cap or submount and a step for cavity filling with gas.

Referring to FIG. 6, a process flow is shown for embodiments that include the formation of a cavity in cavity-forming step 645 in the cap, in the sub-mount, or both. The formation of the cavity 420 provides a volume within which the electrical, optoelectrical, optical, or other devices are mounted on the sub-mount 410. The cavity 420 is used in embodiments to provide space for the inclusion of optoelectronic, electronic, and optical devices, waveguides, and interconnections, for example, within the volume enclosed by the cap 400 and sub-mount 410. In step 650. bonding layers 433 are formed on the cap 400 and sub-mount 410 if required. In some embodiments, the cap 400 or sub-mount 410 are fabricated of materials that require the addition of adhesion layer 433. In some embodiments, the cap 400 or sub-mount 410 are fabricated of materials that do not require the addition of adhesion layer 433. In step 660, metal mounds 430 are formed on cap 400 or sub-mount 410. In step 670, the cap 400 and sub-mount 410 are positioned in proximity for combining. In step 680, air from within the cavity 420 formed by the placement of the cap 400 in proximity to the sub-mount 410 is evacuated 680a or displaced 680b. In step 685, the cavity 420 formed by the placement of the cap 400 in proximity to the sub-mount 410 is filled with nitrogen, argon, dry air, or other inert gas. The particular gas or gases used in fill step 685 is dependent on the specific requirements for the operation of the devices within the cavity 420. In many embodiments, the removal and replacement of ambient air with dry nitrogen is sufficient to provide an adequately inert environment to ensure reliable long term operation of the devices and materials within the cavity 420. In some embodiments, the dry nitrogen at a pressure above or below that of ambient is necessary. Specific conditions for the inert environment are dependent on the requirements and operating conditions to which the materials and devices contained within the cavity 420 are exposed. Some optical devices, such as waveguides for example, do not produce high temperatures and may not require the highly inert environments that other devices such as lasers might require. The potential for degradation is higher in configurations in which devices such as lasers are implemented in cavity 420 as a result of the excess heat that is generated by these devices.

Referring to FIG. 2, FIG. 5, and FIG. 6, process flows are shown for embodiments with metal mound forming steps 360, 560, 660. In some embodiments, solder materials such as SnAgCu 105, SnAgCu 305, SnAgCu 405, SnAg, PbSn (95/5, 90/10), AuSn 80/20, InSn, and SnBi are used to form the metal mounds 430. Solder materials, such as these and others, have melting points in temperature ranges that are favorable for forming hermetic seals. The melting temperature of many solder materials are such that hermetic seals can be formed without raising the temperatures of the cap and sub-mount assemblies during the hermetic sealing steps 390, 590, 690 beyond that which would lead to degradation of the devices or materials in the cap and sub-mount assemblies 12.

Solder materials are widely used in semiconductor device fabrication and exhibit favorable adhesive properties. The choice of a suitable metal seal material in embodiments should fall in a range above the melting point of the solder, but below any temperature that might lead to degradation or damage to any portion, part, component, element, or feature of the sub-mount assembly. That is, in embodiments, the selection of the hermetic sealing material should be such that the temperature for forming the metal seal does not lead to damage or degradation of the package or materials used therein. In some embodiments, the choice of metal or solder may lead to a modification of the properties of a material portion of the sub-mount assembly, and in some instances may be beneficial, but the temperature required to form the seal should be such that raising the temperature to the level required for the formation of the seal does not render the sub-mount assembly unusable.

Figures 7A, 7B, 7C, 7D, 7E:
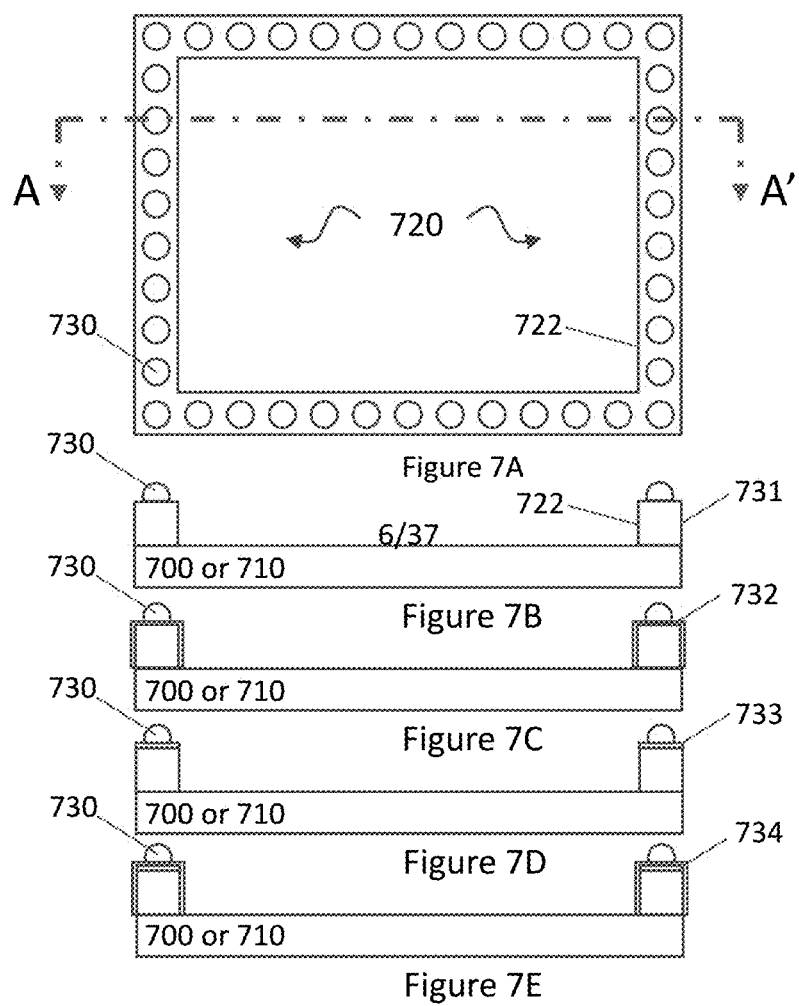
FIG. 7A-7E show FIG. 7A top down and FIG. 7B-7E sections (A-A') of embodiments with various adhesion layers on cavity walls.

Referring to FIG. 7, illustrations are shown of examples of embodiments that facilitate adhesion of the hermetic seal material to the cavity wall of the cap or sub-mount. In FIG. 7A, a top down view of a sub-mount assembly component, either a cap 700 with a cavity or a sub-mount 710 with a cavity 720, is shown with spaced metal mounds 730. Formation of the metal mounds 730 are described herein. Examples of the configurations that facilitate adhesion with the metal or solder material used in the hermetic seal material with the cap 700 or sub-mount 710 are shown in the cross sections in FIGS. 7B to 7E. In FIG. 7B, an embodiment is shown in which the cap or sub-mount material is made of a material that provides adequate adhesion of the metal or solder mound material upon heating to form an hermetic seal. In FIG. 7C, an embodiment is shown in which a layer of adhesion material 732 is provided that coats or surrounds the cavity wall 722. In FIG. 7D, an embodiment is shown in which an adhesion layer 733 is provided at the top (as oriented in FIG. 7D) of the cavity wall 722. In FIG. 7E, an embodiment is shown in which an adhesion layer 734 surrounds a cavity wall 722 that is capped with a layer of material or materials other than that of which the wall is made. It is to be understood that a range of configurations can be contrived to provide adhesion for the solder or metal mound material that is used to form the hermetic seal. For example, the configuration in FIG. 7E in some embodiments may have a first layer that surrounds the cavity wall and a second layer that is provided only at the top of the cavity wall. In yet other embodiments, the surrounding layers shown in configurations such as FIGS. 7B and 7E only cover part of the vertical cavity walls. The provision for adequate adhesion between the metal mounds 730 formed on the cavity walls of the sub-mount 710 or cap 700 and its mating cap or sub-mount, respectively, helps to ensure the formation of the hermetic seal in embodiments.

Figure 8A:
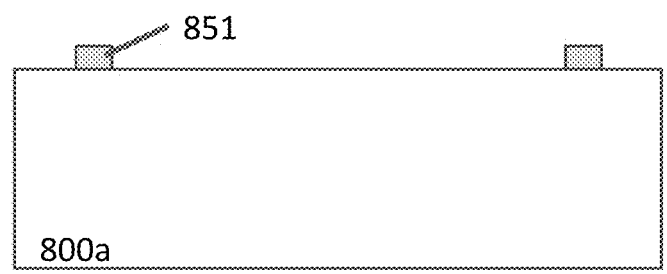
FIG. 8A-8B shows steps to form a cap with a cavity in some embodiments.
Figure 8B:
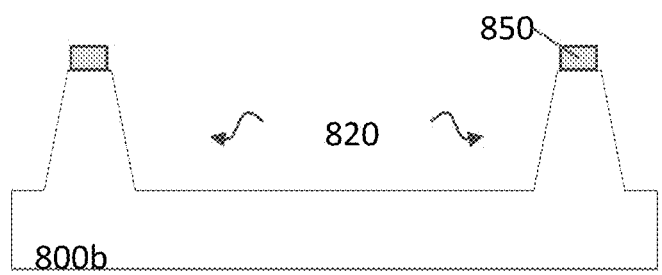

Referring to FIG. 8, an embodiment of a method for forming a cavity in a cap 800 is shown. FIG. 8A shows a substrate for a cap with a patterned mask layer 850. Mask layer 851 is a patterned mask layer for an etch process to remove material from cap substrate 800*a* to form cavity region 820 and to form cap substrate 800*b* with cavity. Mask layer 851 in some embodiments is a photosensitive mask layer as is commonly used in semiconductor photolithographic patterning processes. Mask layer 851 in some embodiments is a positive photoresist layer and in other embodiments is a negative photoresist layer. Mask layer 851 in some embodiments is a metal that can secondarily be used as an adhesion layer without the need for removal after cavity. In embodiments in which the mask layer 851 is a not a photosensitive mask layer, the mask layer 851 is patterned with a photosensitive mask layer as described herein. Mask layer 851 can be a metal layer, a dielectric layer, a polymer layer, a semiconductor layer, for example, or any layer that allows for the transfer of a pattern into the substrate 800*a* to form a cavity. In some embodiments, the cavity 820 is shaped as in cap 800*b* shown in FIG. 8B. In other embodiments, the cavity differs in shape than that shown in FIG. 8B. In embodiments, the cavity 820 provides a spatial volume for the placement of devices, interconnects, waveguides, and the like within the cap 800 and sub-mount assembly. In some embodiments, the cavity 820 has multiple regions with the bathtub shaped recesses shown in FIG. 8B, for example.

Cavity 820 in cap 800*b* can also be formed with a deposition process. In some embodiments, a photosensitive film is patterned with openings for the formation of cavity walls. Once openings are formed, an evaporative deposition process, an electrochemical deposition process, or other deposition process is used to partially or fully fill the openings in the photosensitive layer to form the cavity walls. Excess material on the photosensitive layer is removed using lift off or other means to create cap 800*b* with cavity 820.

Figure 9A:
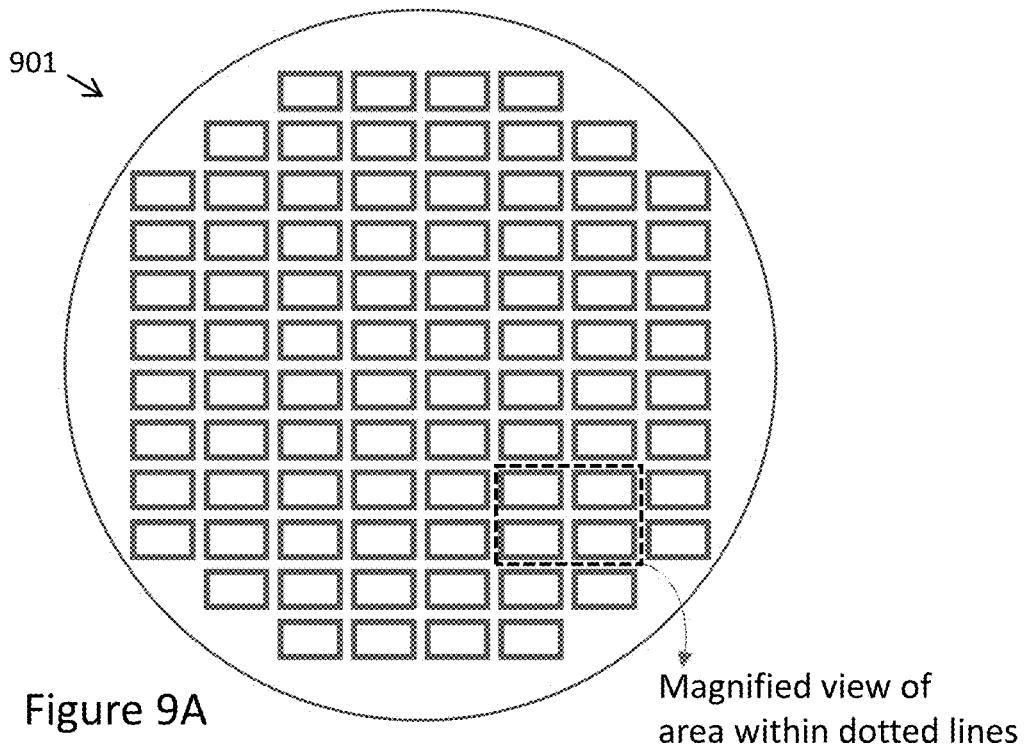
FIG. 9A-9B show FIG. 9A Top down view of cap wafer in an embodiment showing cavity walls and FIG. 9B perspective view of a section of wafer from FIG. 9A as shown that contains four non-singulated caps with cavity walls and enclosed volumes.

Referring to FIG. 9A, a wafer level layout is shown for a cap substrate 901 with multiple cap structures 900*a-d*. Cap wafer 901 shows multiple cap structures that are formed simultaneously by exposure of the wafer 901 to wafer-scale processes. In wafer scale processes, multiple caps are formed on a common substrate either all at once, or in a stepped manner, as is often the case in photolithographic patterning, for example. In some embodiments, full wafer etch or deposition processes are used to form all or part of the cap structure to which the sub-mount is combined. In the embodiment shown in FIG. 9B, cavity walls 908 are provided to form cavities 920*a-d*. In other embodiments, cavities are provided in the sub-mounts. In yet other embodiments, cavities are provided in the sub-mounts and the caps are bonded directly to the sub-mounts. In an embodiment, cap wafer 901 is a silicon substrate. In another embodiment, cap wafer 901 is a non-silicon based semiconductor. In yet other embodiments, cap wafer 901 is one or more of a dielectric material, a metal material, a semiconductor, or a substrate with multiple layers of insulating, semiconducting, or conducting layers, a substrate with openings, or a substrate with alignment features. A wide range of materials can be used to form substrate 901 for the purpose of providing cap-with-cavity 800*b* and are included within the scope of the current invention.

Figure 10A:
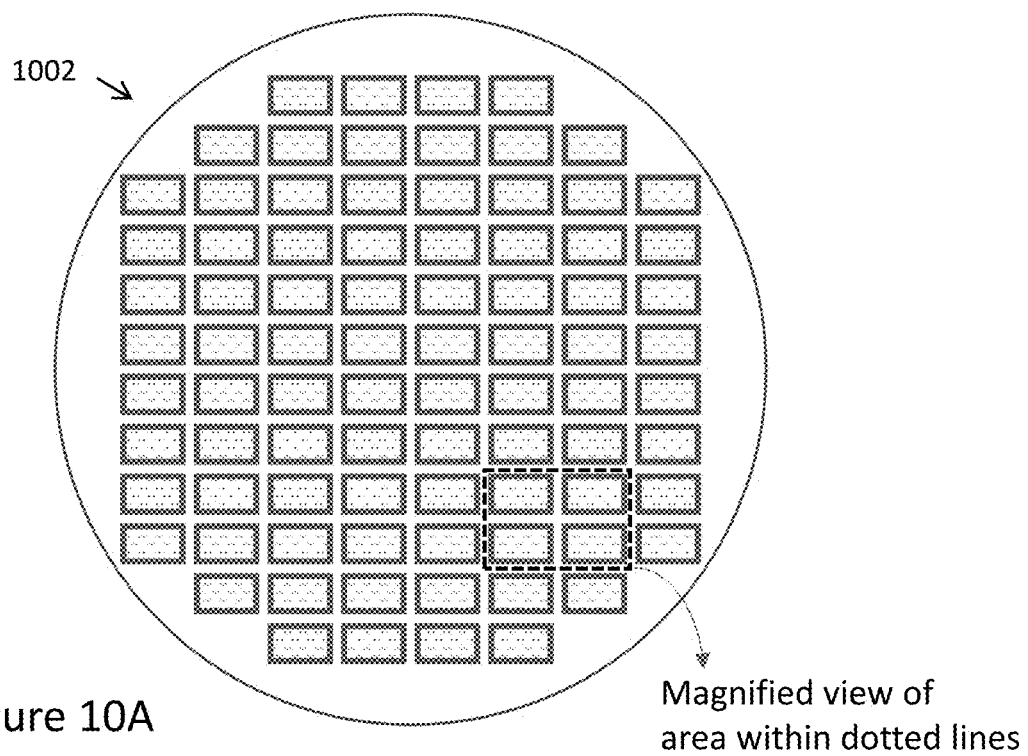
FIG. 10A-10B show FIG. 10A Top down view of sub-mount wafer in an embodiment showing layout of adhesion layers and FIG. 10B perspective view of a section of wafer from FIG. 10A as shown that contains four non-singulated sub-mounts.
Figure 10B:
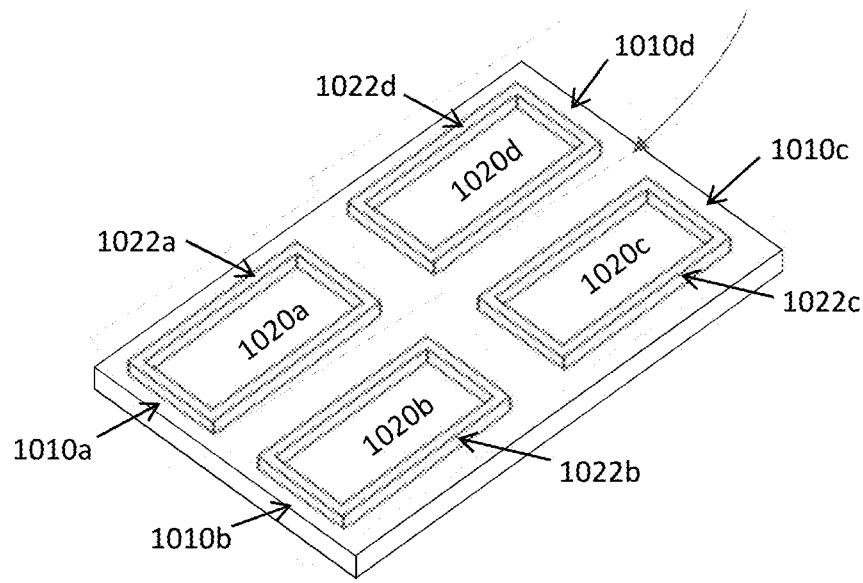

Referring to FIG. 10A, a wafer level layout is shown for a sub-mount substrate 1002 with multiple sub-mount structures 1010*a-d*. Sub-mount wafer 1002 in FIG. 10A shows multiple sub-mount structures that are formed simultaneously by exposure of the wafer 1002 to wafer-scale processes. In wafer scale processes, multiple sub-mounts are formed on a common substrate either all at once, or in a stepped manner, as is often the case in photolithographic patterning, for example. In some embodiments, full wafer etch or deposition processes are used to form all or part of the sub-mount structure that is joined to the cap wafer 901. In some embodiments, an adhesion layer is formed on the surface of the sub-mount substrate as shown in FIG. 10B. In other embodiments, cavity walls are formed on the sub-mount substrate. In yet other embodiments, no structure is required or provided on the sub-mount substrate, and the caps are bonded directly to the sub-mount surface. In the embodiment shown in FIG. 10B, flat sub-mount wafer 1002 is shown with patterned adhesion layers 1022*a-d*. In other embodiments of sub-mount wafer 1002, sub-mounts are formed with cavity walls.

In an embodiment, sub-mount wafer 1002 is a silicon substrate. In another embodiment, sub-mount wafer 1002 is a non-silicon based semiconductor. In yet other embodiments, sub-mount wafer 1002 is one or more of a dielectric material, a metal material, a semiconductor, or a substrate with multiple layers of insulating, semiconducting, or conducting layers, a substrate with openings, or a substrate with alignment features. A wide range of materials can be used to form sub-mount substrate 1002 for the purpose of providing sub-mounts and are included within the scope of the current invention.

Figure 9B:
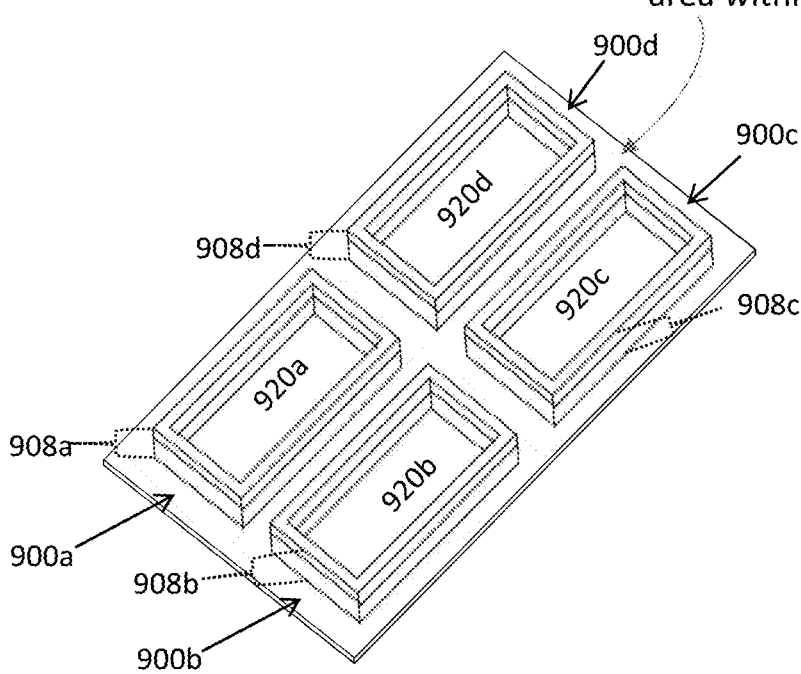

Referring to FIG. 9B, a portion of cap wafer 901 is shown with four non-singulated caps 900*a-d* with cavities 920*a-d*, and cavity walls 908*a-d*, respectively. Singulation of the individual caps is accomplished in some embodiments prior to mating of the caps 900 with sub-mounts and in some embodiments, after combining with a sub-mount or sub-mount wafer 1002. A single cap 900 is combined with a single sub-mount 1010 in an embodiment. In other embodiments, the full wafer of caps 901 is combined with a full wafer of sub-mounts 1002 as shown. In embodiments, submount wafer 1002 is a wafer that is populated with one or more of an electrical, optoelectrical, optical, or other types or combinations of devices. In some embodiments, sub-mount wafer 1002 is singulated. In some embodiments, sub-mount wafer 1002 is singulated but the sub-mounts are held together on a carrier material, polymeric film, or tape to enable ease of removal in subsequent processing. Referring to FIG. 10B, a portion of sub-mount wafer 1002 is shown with four non-singulated sub-mounts 1010*a-d*. FIG. 10*b* shows an embodiment for sub-mounts 1010*a-d* with patterned adhesion layer 1022*a-d*, respectively. Singulation of the individual sub-mounts is accomplished in some embodiments prior to mating of the caps 900 with sub-mounts 1010 and in some embodiments, after combining with a cap wafer 901.

Figure 11:
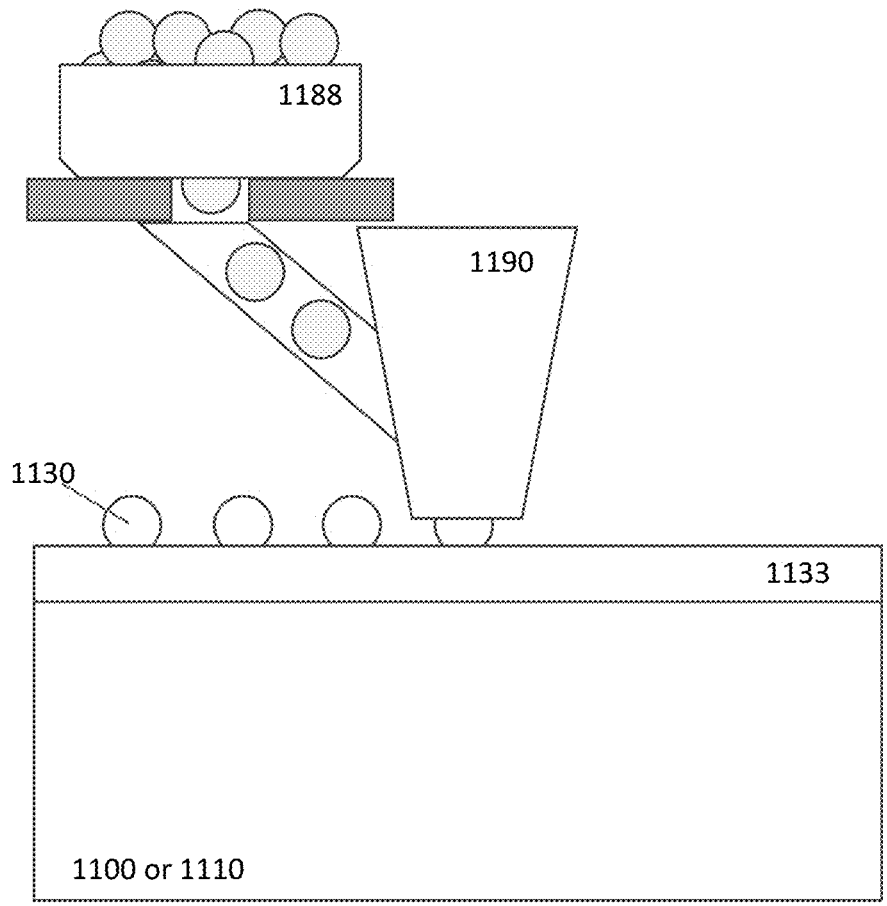
FIG. 11 shows a schematic of a solder ball jetting machine for applying solder mounds in some embodiments.
Figure 12A:
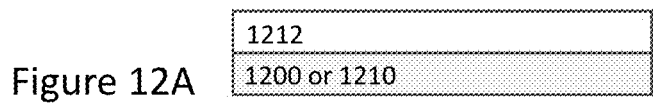
FIG. 12A-12E show cross sections of a section of cap or sub-mount for a sequence of steps for fabricating metal mounds in some embodiments that includes a patterning step and a metal deposition step.
Figure 12B:
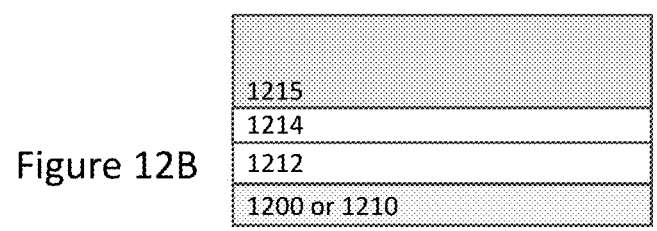
Figure 12C:
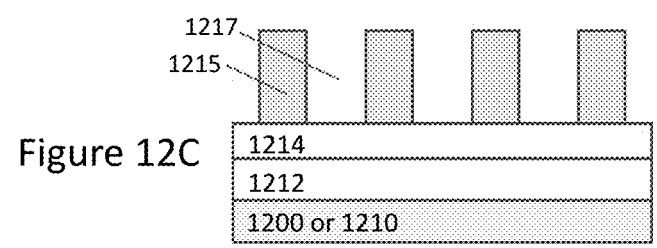
Figure 12D:
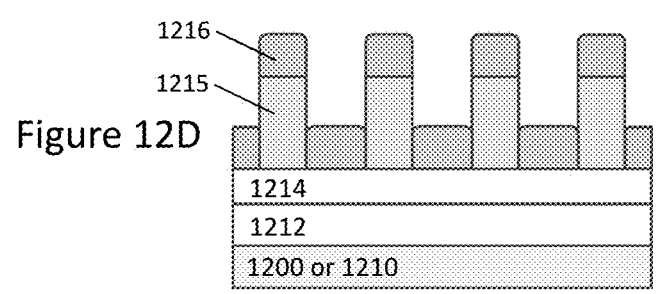
Figure 12E:
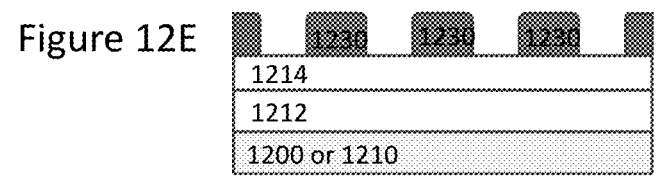
Figure 12F:
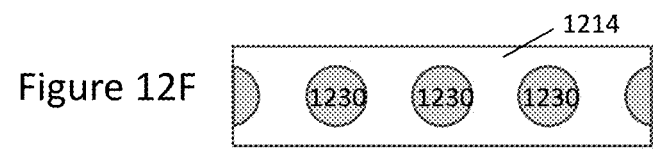
FIG. 12F shows a top view.

Referring to FIG. 11, a schematic diagram is shown for a solder ball deposition system such as the SB²-Jet system manufactured by Packaging Technologies GmbH. The SB2-Jet system provides an exemplary means for the application of metal mounds 1130 as in steps 360, 560, 660 in FIGS. 3, 5, and 6, respectively. Solder balls are loaded into a hopper 1188 and the placement head 1190 is positioned over a location on the cap 1100 or sub-mount 1110 and solder balls are sequentially delivered through the placement head 1190 to the substrate surface and heated with a laser to bond the solder balls to the top surface of the substrate, typically an adhesion layer 1133 as shown in the embodiment in FIG. 11, to form solder mounds 1130. Solder ball deposition machines such as the SB2-Jet system can deposit a range of materials that include various alloys of SnAgCu, SnAg, PbSn, AuSn, InSn, and SnBi. Other materials can be used in solder ball deposition systems to form metal mound structures 1130 in embodiments and remain within the scope of the current invention.

Referring to FIG. 12, an embodiment of another method for forming metal mound structures 1230 as in steps 360, 560, and 660 of FIGS. 3, 5, and 6, respectively, is shown. FIG. 12 shows a sequence of steps for metal mound formation that utilizes a mask layer 1215 within which openings 1217 are formed and a metal 1216 is deposited within these openings to form the metal mounds 1230. In FIG. 12A, a cap substrate 1200 or sub-mount substrate 1210 in an embodiment that includes an adhesion layer 1212 is shown. In other embodiments, the cap 1200 or substrate 1210 is fabricated from a material that provides sufficient adhesion so as to not require the addition of an adhesion layer 1233. In some embodiments, particularly for those in which an electrochemical deposition process is used to form the metal mounds 1230, a seed layer 1214 is deposited over the adhesion layer 1212. In some embodiments, a layer of photoresist 1215 or other photosensitive material 1215 is formed on the seed layer 1214 as shown in FIG. 12B and patterned to provide openings 1217 for the metal mound formation 360, 560, 660 as shown in FIG. 12C. In the embodiments depicted in FIG. 12D, metal layer 1216 is formed in the openings 1217. In embodiments in which an evaporative technique is used to deposit the metal, this metal layer 1216 is typically also formed on the top surface of the photosensitive mask layer 1215. In FIG. 12E, the patterned mask material 1215 and excess metal 1216 is removed. In an embodiment, the excess metal is removed using a lift off process in a solvent bath. In FIG. 12E, a cap 1200 or sub-mount 1210 structure is shown with the metal mounds 1230. It should be noted that many variations in the deposition process can be utilized to form the metal mounds as depicted in FIG. 12. Specific adhesion layer 1212 may not be required in all embodiments, for example. Similarly, seed layer 1214 may not be required in all embodiments. Also, a hard mask or other intermediate mask layer or combinations of layers can be used in which a pattern in a photosensitive layer is at first transferred to one or more layers to form openings 1217 before the deposition of the metal layer 1216. Also, particularly in embodiments in which a hard mask is used, a damascene process is used to remove the excess metal from the top surface of the hard mask layer. FIG. 12 is provided to demonstrate a method of forming metal mounds 1230 that includes a patterning step and a deposition process. Variations on the process of creating openings in a mask layer or a masked layer, and on the process of depositing a metal layer within these openings are well understood in the art and remain within the scope of the current invention.

Figure 13A:
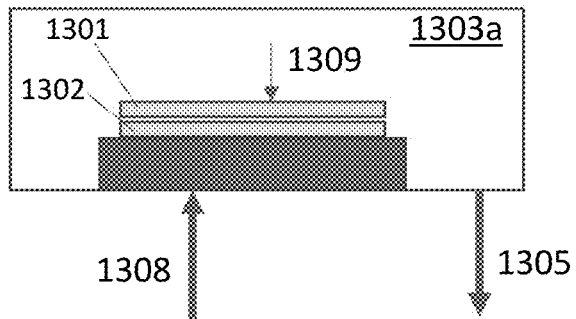
FIG. 13A-13C show schematics of environmentally controlled chambers for the formation of hermetic seals in some embodiments FIG. 13A equipped with vacuum, FIG. 13B equipped with gas source and vacuum, and FIG. 13C equipped with gas source and exhaust.
Figure 13B:
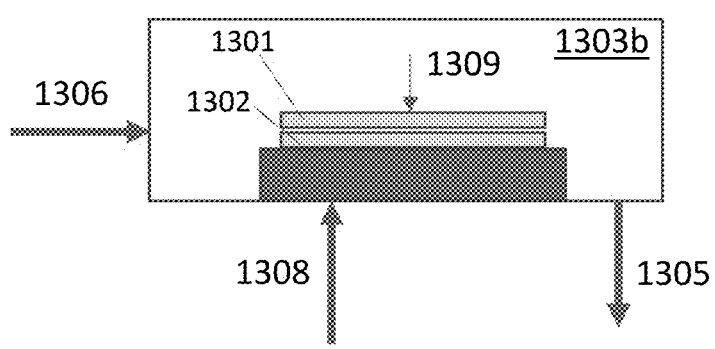
Figure 13C:
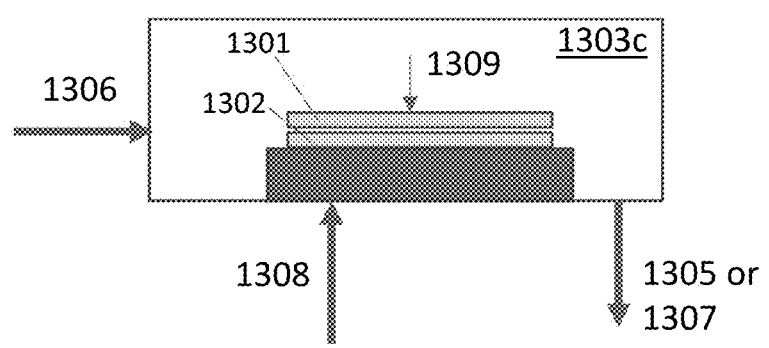

Referring to FIG. 13, schematic illustrations are shown for environmentally controlled process chambers that are used in embodiments. In FIG. 13A, a schematic for process chamber 1303*a* with vacuum pumping capabilities is provided. Process chamber 1303*a* is equipped with vacuum pump 1304 to evacuate gas as in steps 380, 580, and 680. In embodiments, cap substrate 1301 is positioned 370, 570, 670 in proximity with sub-mount substrate 1302 within process chamber 1303*a* equipped with vacuum pump 1305. In the embodiments shown in FIGS. 13A-13C, wafer 1302 is shown in a position below wafer 1301. In other embodiments, wafer 1301 is in contact with a mechanical support 1303 and wafer 1302 is positioned above wafer 1301. In some embodiments, mechanical support 1303 provides mechanical support and a heating source 1308. Heating source 1308 is a resistive heating element in some embodiments. In other embodiments, heat source 1308 is a source of infrared or visible light. In yet other embodiments, heating source 1308 is a source of heated gas. In embodiments, the heating source provides heat to the cap and sub-mount assembly sufficient to melt the metal mounds 430, 730, 1130, 1230. Heating source 1308 is equipped with a means for controlling the temperature of the wafers 1301, 1302. In some embodiments, the heating of the wafers is programmed in a process recipe as an element of an automated control system that is used to control the process parameters of the processing system, such as pressure, temperature, gas flow, pumping speed, among others, as is common in semiconductor processing equipment common utilized in semiconductor wafer fabrication. In embodiments, the vacuum pump 1305 removes gas from process chamber 1303 and from one or more cavities 1320 between cap wafer 1301 and sub-mount wafer 1302. Alternatively, in some embodiments, cavities 320 in one or more discrete and aligned cap 300 and sub-mount 310 assemblies, are evacuated in process chamber 1303a.

In FIG. 13B, a schematic for process chamber 1303b is shown that includes vacuum pump 1305 and gas source 1306. In embodiments, gas source 1306 is an inert gas that provides inert gas to process chamber 1303b to provide an inert environment within cavity 1320 of the caps 1300 and sub-mounts 1310. In embodiments with processes that utilize evacuation or displacement steps 380, 580, 680 or fill steps 585, 685, a process chamber with so-called pump-purge capabilities as shown in FIG. 13B provides the capability to evacuate the chamber and to subsequently purge the chamber with a gas that is suitable for providing a favorable environment within the cavity 1320. In some embodiments using process chambers such as that schematically illustrated in FIG. 13B, a programmable control system is utilized to automate the sequence of steps required to provide the environmental conditions within cavity 1320. In some embodiments, a single evacuation step is followed by a single purge or fill step with the inert gas. In other embodiments, one or more evacuation steps is coupled with one or more purge steps. In some embodiments, the purge gas is a single gas such as nitrogen, argon, helium, or a gas mixture that is suitable for reducing the effect of aging relative to the ambient air that is removed from the cavity. In some embodiments, no purge gas is re-introduced into the cavity after evacuation. And in yet other embodiments, the cap 1301 and sub-mount 1302 wafers or components 1300, 1310 are simply heated to bake off water vapor without the intentional displacement or replacement of ambient air.

Referring to FIG. 13C, a schematic is shown for a process chamber 1303c that is equipped with gas source 1306 and exhaust outlet 1307. In embodiments that utilize process chambers 1303c with displacement steps 380, 580, 680, as shown in FIGS. 3, 5, and 6, respectively, the cap wafer 1301 and sub-mount wafer 1302 (or individual components cap 1300 and submount 1310) are positioned inside process chamber, and the gases within cavities 1320 are displaced with the flow of gas from gas source 1306. In embodiments, gas flows from gas source 1306 into process chamber 1303c and out through exhaust port 1307. Alternatively, in some embodiments, gas flow from gas source 1306 pressurizes process chamber 1303c and the increased pressure of the gas from gas source 1306 displaces and dilutes the residual ambient gas in cavity 1320. Simultaneous heating of the cap and sub-mount assembly or cap wafer and sub-mount wafer assembly with the flow of gas, preferably below the melting point of the metal mounds 1303, can improve the movement and displacement of gas from the cavities 1320.

The schematic diagrams shown in FIG. 13 show temperature control capabilities for the three process chamber configurations depicted in FIGS. 13A, 13B, and 13C. Raising the temperature of the cap wafer 1301 and sub-mount wafer 1302 facilitates the removal of residual ambient oxygen and water vapor from cavities 1320. Temperature control of the cap and sub-mount assemblies is achieved in some embodiments with one or more of resistive heating of the wafer stage, resistive heating of the process chamber 1303, heating of the gas flowing into the process chamber, exposure of the chamber or substrate to infrared or visible light, among other methods. In some embodiments, a gas from gas source 1306 is heated and the hot gas is used to raise the temperature of the cap wafer 1301 and the sub-mount wafer 1302. The evacuation or displacement of gas from gas cavity 1320 as in evacuation/displacement steps 380, 580, and 680, is accomplished in some embodiments at temperatures above ambient conditions.

The evacuation or displacement of gas from gas cavity 1320 as in evacuation/displacement steps 380, 580, and 680, and in some embodiments by fill steps 585, 685, respectively, is followed by hermetic seal formation steps 390, 590, and 690, respectively, as shown in FIGS. 3, 5, and 6, respectively. In some embodiments, the temperature of the assembly, consisting of the cap wafer 1301 and the sub-mount wafer 1302, is raised to the melting point, or just above, of the metal or metal alloy used to form the metal mounds 430, 730, 1130, 1330. For process chambers 1303 that are equipped with a mechanism to provide a force 1309 in the vertical direction Process chambers 1303 are shown with a force mechanism 1309 for providing a force in the vertical direction to cause the cap wafer 1301 and the sub-mount wafer 1302 to be moved toward one another, and in some embodiments, to reduce the spacing between the cap wafers 1301 and the sub-mount wafer 1302. The application of the vertical force is accomplished in some embodiments with a force applied to the cap wafer 1301. In other embodiments, a vertical force is applied to the sub-mount wafer 1302. In some embodiments, a force is applied such that the wafer holder upon which the cap wafer 1301 and the sub-mount wafer 1302 is staged is moved upward, until the upper wafer in the assembly, either the cap wafer 1301 or the sub-mount wafer 1302, receives a counter force from a stop mechanism in the process chamber 1303. The applied force draws the cap wafer 1301 and the sub-mount wafer 1302 together to decrease the vertical spacing as shown, for example, in FIGS. 4A-e, f and 4B-e, f. In FIGS. 4A-e and 4B-e, the molten metal from mounds 430 are shown filling the inter-mound gaps as would be anticipated as a vertical force is applied to the cap wafer 1301 or the sub-mount wafer 1302 and the temperature is raised above the melting point of the metal or metal alloys used in the metal mounds. Ultimately, the spacing between the cap wafer 1301 and the sub-mount wafer 1302 is reduced until the gap is closed sufficiently to allow a full peripheral hermetic seal to form between the caps 300 and the sub-mounts 310.

Figure 14A:
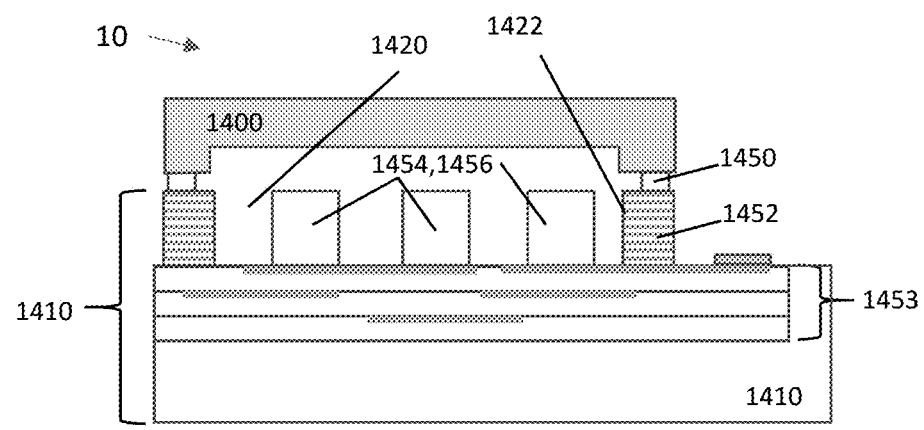
FIG. 14A-14B show schematic of embodiments of capped subassemblies with devices mounted on sub-mount substrate and other features.
Figure 14B:
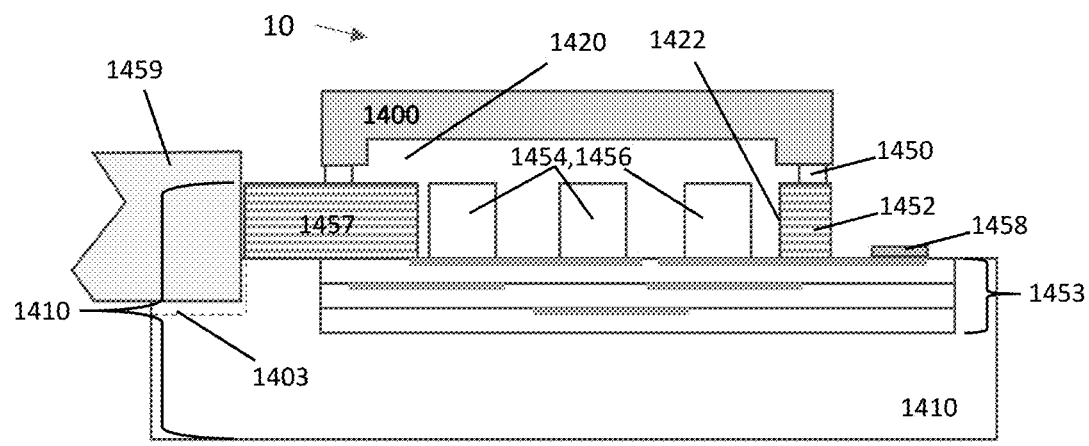

Referring to FIG. 14, schematic cross sections are shown for assemblies with cap 1400 and sub-mount 1410. Hermetic seals 1450 are shown on the cavity walls 1422 between the raised perimeter of the cap 1400 and the sub-mount 1410. Cavity wall 1422 is formed from patterned dielectric 1452 on the sub-mount 1410. In FIG. 14B, the patterned dielectric at the left of the schematic cross section is a waveguide 1459. The embodiments shown in FIGS. 14A and 14B also show metallization structures 1453, a combination of metal interconnects and dielectric interlayers that electrically interconnect electrical and optoelectrical devices 154 that are provided on sub-mounts 1410. The embodiment shown in FIG. 14A shows devices 1454 mounted in cavity 1420 between the cap 1400 and the sub-mount 1410. The embodiment shown in FIG. 14B shows optoelectrical devices 1454 and optical devices 1456 mounted in cavity 1420 between the cap 1400 and the sub-mount 1410 with waveguide 1457 that also forms a cavity wall 1422 below the hermetic seal 1450. Also shown in the embodiment in FIG. 14B is optical fiber waveguide 1459, mounted to sub-mount 1410. In some embodiments that utilize optical signals, optical fiber waveguide 1459 is attached to one or more of the sub-mount 1410 or cap 1400 (not shown). In embodiments, the hermetic seal 1450 includes adhesion layers (not shown) on the cap 1400 and the sub-mount 1410 as required.

Figure 15B:
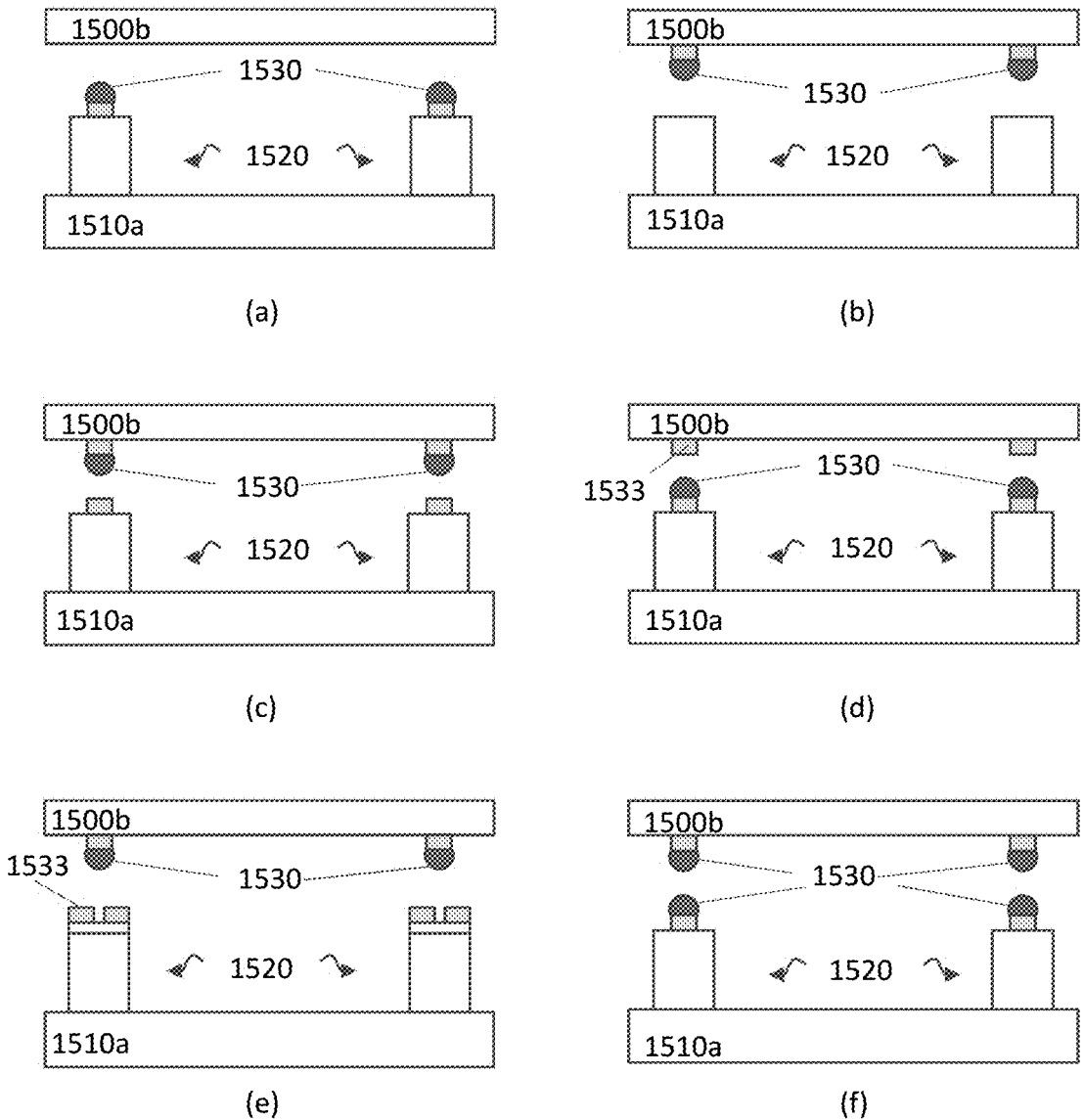
FIG. 15B(a-f) show embodiments for a flat cap and with cavity in sub-mount.
Figure 15C:
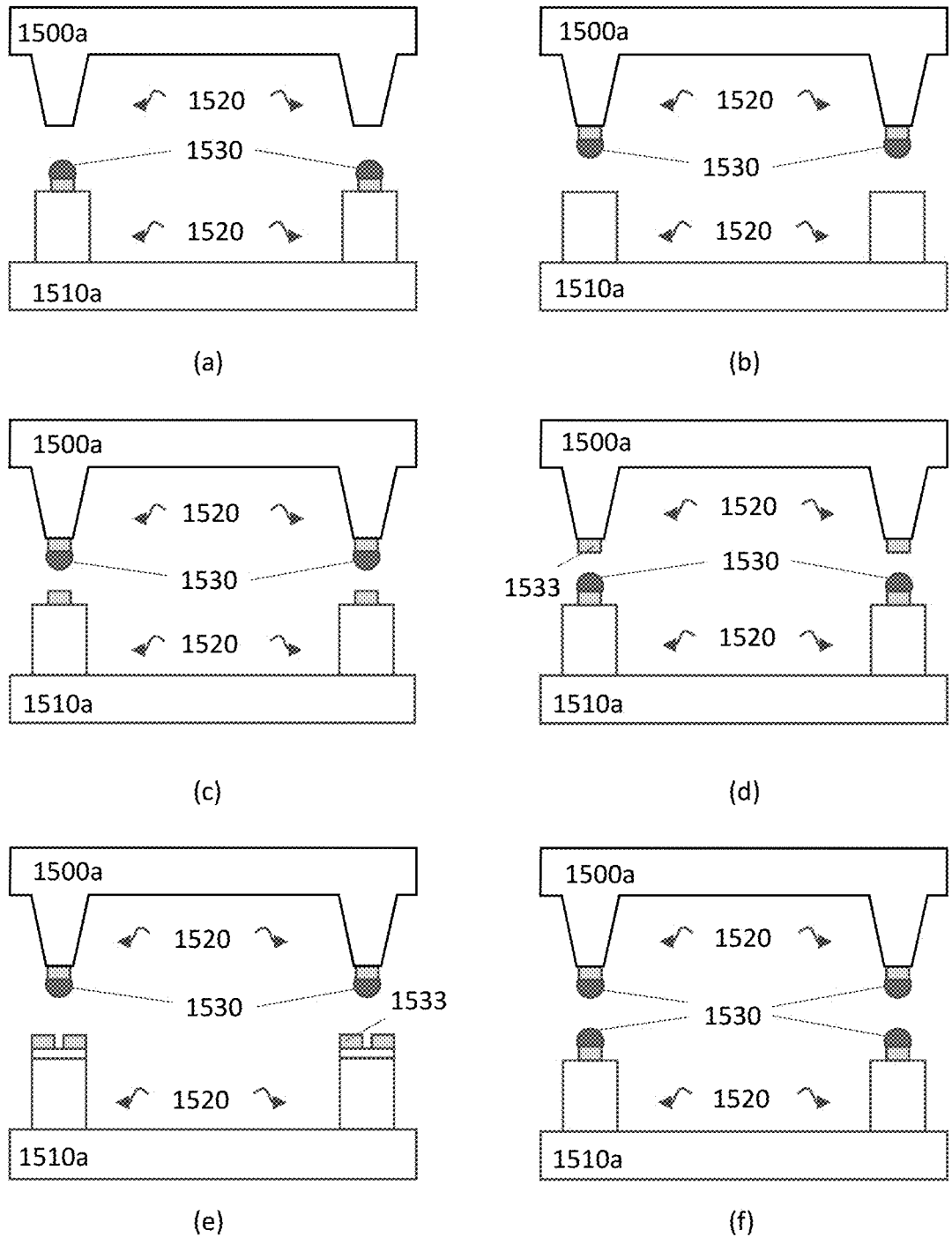
FIG. 15C(a-f) show embodiments for a cap with cavity and sub-mount with cavity.

Referring to FIG. 15A, a number of embodiments are shown for cap 1500 and sub-mount 1510 configurations in which a cavity 1520 is provided in the cap 1500a and assembled with a flat sub-mount 1510b. In FIG. 15A-a, metal mounds 1530 are provided on the flat sub-mount wafer with adhesion layer 1533. In FIG. 15A-a, with no adhesion layer shown on the cap 1500a, the cap 1500a is assumed to have properties such that an adhesion layer 1533 is not required. In FIG. 15A-b, the metal mounds 1530 are provided on the cap 1500a with an adhesion layer. In FIG. 15A-b, with no adhesion layer shown on the sub-mount, the flat sub-mount 1510b is assumed to have properties such that an adhesion layer 1533 is not required. In FIG. 15A-c, metal mounds 1530 are shown formed on adhesion layer 1533 on the cap 1500a. In the embodiment depicted in FIG. 15A-c, an adhesion layer 1533 is also provided on the sub-mount 1510b to facilitate the formation of the hermetic seal. Conversely, in FIG. 15A-d, the metal mounds 1530 are provided on an adhesion layer on the flat sub-mount 1510b, and an adhesion layer is provided on the cap 1500a to facilitate bond formation for the hermetic seal. In FIG. 15A-e, the metal mounds 1530 are shown on the cap 1500a in embodiments in which the corresponding adhesion layer on the sub-mount 1500a is divided to allow for additional surface area, for example, for the metal mounds 1530 to form an hermetic seal. Divided adhesion layer 1533 as shown in FIG. 15A-e can also guide the flow of the metal mounds 1530 while in a molten state during the hermetic seal forming step 390, 590, 690. In FIG. 15A-f, an embodiment is shown in which the metal mounds 1530 are provided on adhesion layers 1533 on both the cap 1500a and the sub-mount 1510b. It is to be understood that the embodiments shown in FIG. 15A show exemplary configurations for providing metal mounds 1530 on a cap 1500a with a cavity 1520 that is combined with a flat, or substantially flat, sub-mount 1500b.

It should be noted that the metal mounds 1530 shown in FIG. 15A are not continuous, and that spaces are provided between mounds as described herein in subsequent discussion. It should also be noted that the adhesion layers 1533 in embodiments are generally continuous layers covering the adjoining surfaces of the cap 1500 and sub-mount 1510, and in some other embodiments, surrounding, for example, the top or bottom of the cavity wall 1522.

Referring to FIG. 15B, multiple embodiments are shown for cap 1500 and sub-mount 1510 configurations in which a cavity 1520 is provided in the sub-mount 1510a and assembled with a flat cap 1500b. In FIG. 15B-a, metal mounds 1530 are provided on the sub-mount 1510a with adhesion layer 1533. In FIG. 15B-a, with no adhesion layer shown on the cap 1500b, the cap 1500b has adhesive properties such that an adhesion layer 1533 is not required. In FIG. 15B-b, the metal mounds 1530 are provided on the flat cap 1500b with an adhesion layer 1533 formed on the cap 1500b. It should be noted that the adhesion layer is shown to be patterned such that the metal mounds 1530 cover substantially the width of the adhesion layer 1533 in FIG. 15B-b, although this need not be the case in all embodiments. In some embodiments, the adhesion layer could cover the entire surface of the cap 1500, or all or a portion of the bottom surface of the cap 1500, for example, so long as the area in which the hermetic seal is formed is fully or substantially covered with the adhesion material. In FIG. 15B-b, with no adhesion layer shown on the sub-mount, the flat sub-mount 1510a has properties such that an adhesion layer 1533 is not required. In FIG. 15B-c, metal mounds 1530 are shown on adhesion layer 1533 on the cap 1500b. In the embodiment depicted in FIG. 15B-c, an adhesion layer 1533 is also provided on the sub-mount 1510a to facilitate the formation of the hermetic seal. Conversely, in FIG. 15B-d, the metal mounds 1530 are provided on an adhesion layer 1533 on the flat sub-mount 1510a, and an adhesion layer 1533 is provided on the cap 1500b to facilitate bond formation for the hermetic seal. In FIG. 15B-e, the metal mounds 1530 are shown on the cap 1500b in embodiments in which the corresponding adhesion layer on the sub-mount 1500b is divided to allow for additional surface area for the metal mounds to form an hermetic seal and to direct the flow of the metal mounds while in a molten state. In FIG. 15B-f, an embodiment is shown in which the metal mounds 1530 are provided on adhesion layers 1533 on both the cap 1500b and the sub-mount 1510a. It is to be understood that the embodiments shown in FIG. 15B show exemplary configurations for providing metal mounds on a flat, or substantially flat, cap 1500b that is combined with a sub-mount 1500a within which a cavity 1520 is provided.

It should be noted that the metal mounds shown in FIG. 15B are not continuous, and that spaces are provided between mounds 1530 to facilitate the evacuation, displacement, and filling of the cavity 1520 as described herein. It should also be noted that the adhesion layers 1533 in embodiments are generally continuous layers surrounding, for example, the cavity wall periphery that defines the hermetic seal.

Referring to FIG. 15C, multiple embodiments are shown for cap 1500 and sub-mount 1510 configurations in which a cavity 1520 is provided in both the cap 1500a and the sub-mount 1510a. In FIG. 15c-i, metal mounds 1530 are provided on the sub-mount 1510a with adhesion layer 1533. In FIG. 15C-a, with no adhesion layer shown on the cap 1500a, the cap 1500a has adhesive properties such that an adhesion layer 1533 is not required. In FIG. 15C-b, the metal mounds 1530 are provided on the cap 1500a with an adhesion layer 1533. It should be noted that the adhesion layer is shown to be patterned in FIG. 15C-b such that the metal mounds cover substantially the width of the adhesion layer 1533, although this need not be the case in all embodiments. In some embodiments, the adhesion layer could cover the entire surface of the cap 1500, or all or a portion of the bottom surface of the cap 1500, for example, so long as the area in which the hermetic seal is formed is covered with the adhesion material. In FIG. 15C-b, with no adhesion layer shown on the sub-mount, the cavity wall of the sub-mount 1510a has properties such that an adhesion layer 1533 is not required. In FIG. 15C-c, metal mounds 1530 are shown on adhesion layer 1533 on the cap 1500a. In the embodiment depicted in FIG. 15C-c, an adhesion layer 1533 is also provided on the sub-mount 1510a to facilitate the formation of the hermetic seal. Conversely, in FIG. 15C-d, the metal mounds 1530 are provided on an adhesion layer on the flat sub-mount 1510a, and an adhesion layer 1533 is provided on the cap 1500a to facilitate bond formation for the hermetic seal. In FIG. 15C-e, the metal mounds 1530 are shown on the cap 1500a in embodiments in which the corresponding adhesion layer on the sub-mount 1510a is divided to allow for additional surface area for the metal mounds to form the hermetic seal and to aid in directing the flow of the metal mounds while in a molten state. In FIG. 15C-f, an embodiment is shown in which the metal mounds 1530 are provided on adhesion layers 1533 on both the cap 1500a and the sub-mount 1510a. It is to be understood that the embodiments shown in FIG. 15C show exemplary configurations for providing metal mounds on a cap 1500*a* with cavity 1520 that is combined with a sub-mount 1500*a* also within which a cavity 1520 is provided.

It should be noted that the metal mounds 1530 shown in FIG. 15C are not continuous, and that spaces are provided between mounds 1530 to facilitate the evacuation, displacement, and filling of the cavity 1520 as described herein. It should also be noted that the adhesion layers 1533 in embodiments are generally continuous layers surrounding, for example, the cavity wall periphery on the cap 1500*a* and the sub-mount 1510*a* that defines the hermetic seal.

Figure 16B:
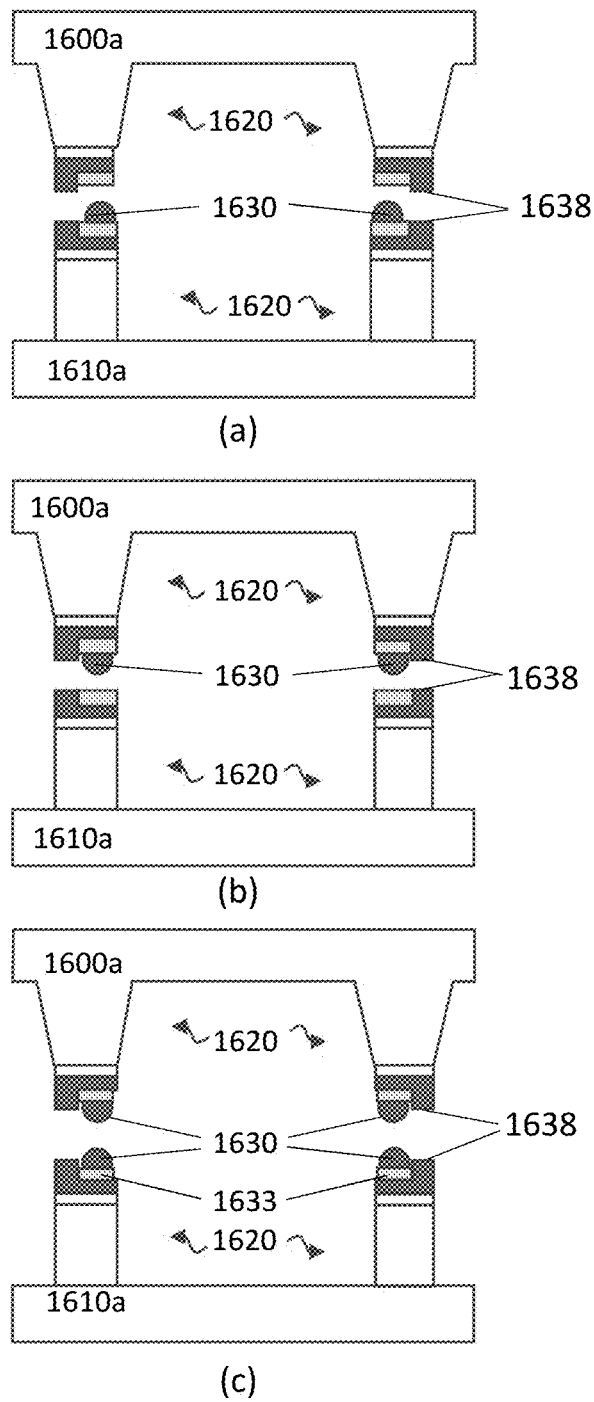
FIG. 16B(a-c) show cap and sub-mount assembly in embodiments with z-stops for assemblies with a cavity in the cap and the sub-mount.

Referring to FIGS. 16A-16C, embodiments are shown in which a vertical stop is incorporated into the cavity wall of the cap 1600 or sub-mount 1610 within or adjacent to the hermetic sealing surface. In FIG. 16A-a, flat cap 1600*b* is shown with cavity-containing sub-mount 1610*a* for which the submount is shown in an embodiment with an adhesion layer 1633 adjacent to a vertical stop 1638. The vertical stop is hereinafter noted in these and other embodiments as a z-stop 1638. In embodiments, the z-stop limits the spacing between the sealing surface of the cap 1600 and the sealing surface of the sub-mount 1610. In the embodiment shown in FIG. 16A-a, for which the metal mounds 1630 are formed on adhesion layer 1633 on flat cap 1600*b*, the application of a vertical force in hermetic sealing steps 390, 590, 690, for example, will compress molten metal mounds 1630, but the amount and distance of compression is favorably limited by the presence of the z-stop 1638. Similar z-stop configurations to those shown in FIG. 16A-a are shown in FIG. 16A-b and FIG. 16A-c. In FIG. 16A-b, an embodiment is shown with the cavity 1620 provided in the cap 1600*a* and with a flat sub-mount 1610*b*. And in FIG. 16A-c, an embodiment is shown with cavity 1620 in both the cap 1600*a* and the sub-mount 1610*a*, with metal mounds 1630 formed on adhesion layer 1633 on the cap, and with z-stop 1638 on the sub-mount 1610*a*. (Note: 1600*a* denotes cap structure with cavity 1620 and 1610*a* denotes sub-mount structure with cavity 1620; 1600*b* denotes a flat cap structure and 1610*b* denotes a flat sub-mount.)

Referring to FIG. 16B, embodiments are shown in which z-stops 1638 are incorporated into the cavity wall of both the cap 1600 and the sub-mount 1610 within or adjacent to the hermetic sealing surface. In FIGS. 16B-a, b, and c, cap 1600*a* is shown with cavity-containing sub-mount 1610*a* for which the sub-mounts 1610*a* are shown in embodiments with both an adhesion layer 1633 and an adjacent vertical stop 1638. In the embodiment shown in FIG. 16B-a, metal mounds 1630 of hermetic sealing material are provided on the adhesion layer 1633 on the cavity wall of the sub-mount 1610*a*. In the embodiments shown in FIG. 16B-b, metal mounds 1630 of hermetic sealing material are provided on the adhesion layer 1633 on the cavity wall of the cap 1600*a*. And in the embodiments shown in FIG. 16B-c, metal mounds 1630 of hermetic sealing material are provided on the adhesion layers 1633 on the cavity walls of both the cap 1600*a* and the sub-mount 1610*a*.

In embodiments, the z-stops shown in FIG. 16B limit the spacing between the hermetic sealing surface of the cap 1600 and the sealing surface of the sub-mount 1610. In the embodiments shown in FIG. 16B, the application of a vertical force in hermetic sealing steps 390, 590, 690, for example, will compress molten metal mounds 1630, but the amount and distance of compression is limited by the presence of the z-stops 1638. In the embodiment shown in FIG. 16B, the z-stops 1638 on the cap 1600 and the sub-mount 1610 are shown to be of the same size and in direct alignment. In other embodiments, z-stops are not the same size. In other embodiments, the z-stops are such that a portion of the z-stop on cap 1600 makes contact with the z-stop on the sub-mount 1610. It should be understood that variations on the incorporation of the z-stops into the cavity walls can be implemented by varying the sizes and the precise alignment of the z-stops and that these variations are within the scope of embodiments of the current invention.

Similar z-stop configurations to those shown in FIG. 16B are provided in embodiments (not shown) that have flat caps 1600*b* with the cavity 1620 in sub-mount 1610*a*, and in other embodiments that have flat sub-mounts 1610*b* and caps 1600*a* with cavity 1620.

Additional exemplary embodiments with variation of the z-stops are shown in FIG. 16C. In FIG. 16C-a, an embodiment is shown in which patterned metal mounds 1630 are provided on cap 1600*a* (with cavity 1620) that are aligned with an adhesion layer on flat sub-mount 1610*b*. In FIG. 16C-b, an embodiment is shown in which the cavity wall of the cap 1600*a* is used as the z-stop. Other embodiments that utilize various combinations of the placement of the z-stop 1638 on caps 1600*a* with cavity 1620, flat caps 1600*b*, sub-mounts 1600*a* with cavity, and flat sub-mounts 1610*b*, and on the placement of the metal mounds 1630 are within the scope of the current invention.

Referring to FIG. 17, embodiments are shown with variations in the size and spacing of the metal mounds as illustrated, for example, in metal mounds 430, 730, 1130, 1230, 1530, 1630, 1730. In FIG. 17A, equally sized and equally spaced metal mounds 1730 are shown on cap 1700 or sub-mount 1710. In FIG. 17B, the metal mounds 1730 are formed in closely spaced pairs with an equal spacing between the pairs. These pairs are shown in embodiments in FIG. 17B in which the spacings between the pairs are equidistant. In other embodiments, similarly deposited pairs are not all spaced equidistant from neighboring pairs (not shown). In some other embodiments, the spacing of pairs of metal mounds are optimized to optimize the redistribution of the metal from the metal mounds 1730 in the hermetic sealing step 390, 590, 690. In FIG. 17C, the metal mounds 1730 are formed in closely spaced groups of three mounds (triplets) with an equal spacing between these triplets. These triplets are shown in embodiments in FIG. 17B in which the spacings between the groups are equidistant. In other embodiments, similarly deposited metal mound triplets are not all spaced equidistant from neighboring triplets pairs (not shown). In some other embodiments, the spacing of the triplets of metal mounds 1730 are optimized to optimize the redistribution of the metal from the metal mounds 1730 in the hermetic sealing step 390, 590, 690. In some other embodiments, the spacing between the three mounds in the triplet group are not equally spaced.

Figure 17A:
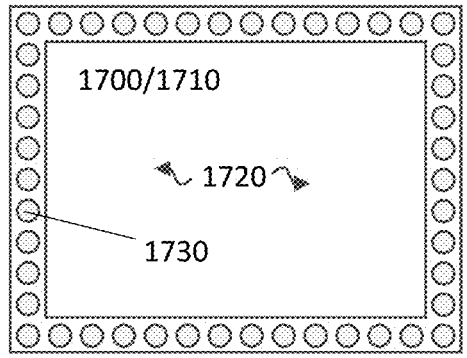
FIG. 17A-17F show top views of some embodiments of metal mound layouts with various mound sizes and spacings.
Figure 17D:
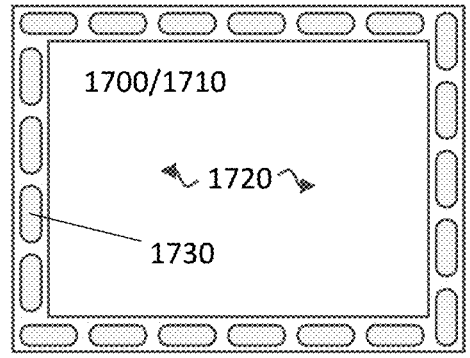
Figure 17B:
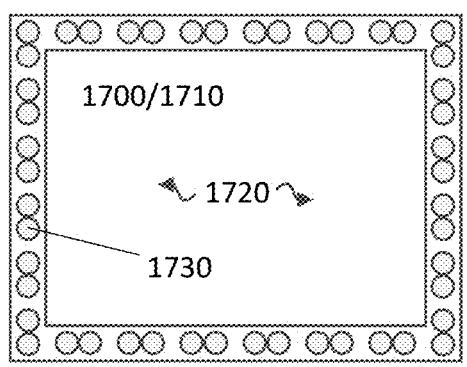
Figure 17E:
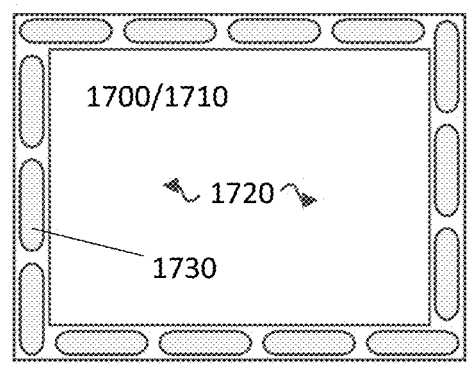
Figure 17C:
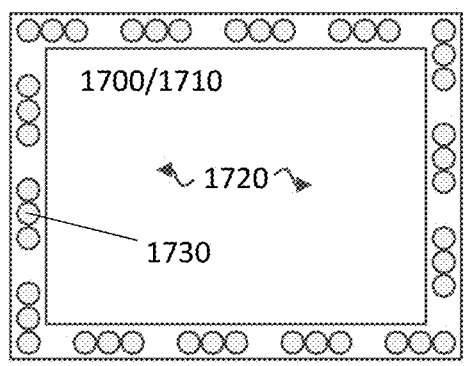
Figure 17F:
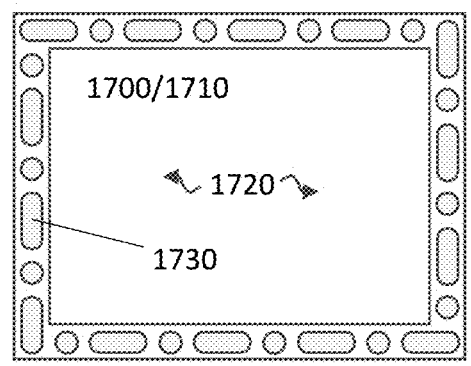
Figure 18A:
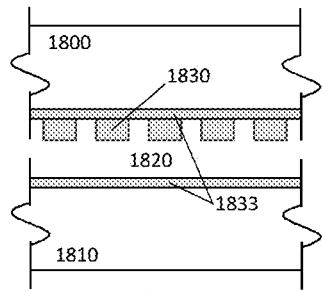
FIG. 18A-18F show side views of some embodiments of metal mound layouts on sections of caps and sub-mounts with various mound sizes and spacings.
Figure 18B:
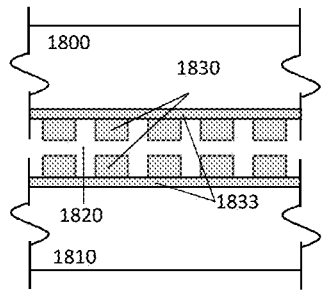
Figure 18C:
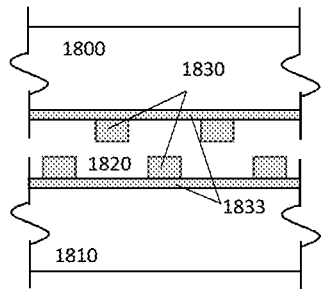
Figure 18D:
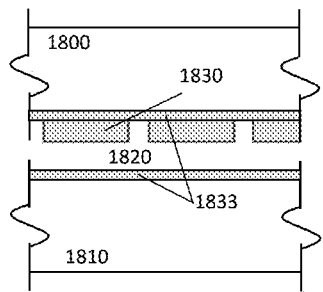
Figure 18E:
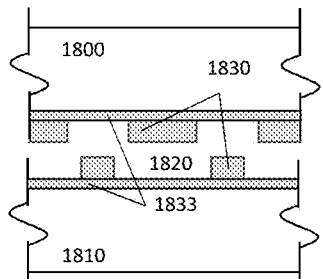
Figure 18F:
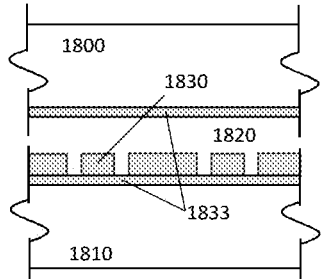

In FIG. 17D, metal mounds are shown as the mounds might appear in some embodiments in which a photolithographic patterning step in which a photosensitive material such as photoresist is used to create openings within which metal is deposited using evaporation, sputtering, or electrochemical deposition to form the metal mounds 1730, and as described, for example in FIG. 12. In the embodiments shown in FIG. 17D, the metal mounds 1730 are elongated in shape and are formed on the cavity wall of the cap 1700 or submount 1710. In FIG. 17D, the elongated metal mounds are shown as being spaced equidistant from one another. In other embodiments, the spacing between metal mounds 1730 are not equidistant. In some other embodiments, the spacing between the metal mounds is varied to optimize the redistribution of the metal in the metal mounds during the hermetic sealing step 390, 590, 690. In the embodiments shown in FIG. 17E, the metal mounds 1730 are of further elongated shapes, longer than those of FIG. 17D that are formed on the cavity wall of the cap 1700 or submount 1710. The longer metal mounds have fewer spaces than the shorter elongated shapes shown in FIG. 17D. In FIG. 17E, the elongated metal mounds are shown as being spaced equidistant from one another. In other embodiments, the spacing between metal mounds 1730 are not equidistant. In some other embodiments, the spacing between the metal mounds is varied to optimize the redistribution of the metal in the metal mounds during the hermetic sealing step 390, 590, 690. In FIG. 17F, embodiments for the metal mounds 1730 are shown in which elongated metal mounds are combined with metal mounds in the shape of circular metal dots to form the metal mounds 1730 on cap 1700 or sub-mount 1710. In FIG. 17F, the metal mounds 1730 are shown as being spaced equidistant from one another. In other embodiments, the spacing between the metal mounds are not equidistant from one another. In some other embodiments, the spacing between the metal mounds, as shown for example, in FIG. 17F, is varied to optimize the redistribution of the metal from the metal mounds during the hermetic sealing step 390, 590, 690. It should be understood that wide ranges in the size and spacing of the metal mounds 1730 can be used and remain within the scope of the embodiments of the current invention. Some of these variations are further described in accordance with FIG. 18.

Referring to FIG. 18, schematic cross sections of cap 1800 and sub-mount 1810 are shown in which the metal mounds 1830 are formed on the cap 1800 and the sub-mount 1810 as shown in FIGS. 15Ac, 15Ae, 15Bc, 15Be, 15Cc, 15Ce, 16Aa, 16Ab, 16Ac, and 16Bb, for example, in which the metal mounds are provided on the cap 1800. In FIG. 18A, an embodiment is shown in which the metal mounds 1830 are of equal sizes and that are equally spaced from neighboring metal mounds 1830. Adhesion layers 1833 on the cap 1800 and the sub-mount 1810 are provided to facilitate adhesion of the metal mounds 1830 in the illustrative embodiments in FIG. 18. In FIG. 18B, an embodiment is shown in which the metal mounds 1830 on the cap 1800 are aligned with the mounds 1830 on the sub-mount 1810. Similar embodiments are shown in FIGS. 15Af, 15Bf, 15Cf, and FIG. 16Bc in which the metal mounds are provided on both the cap 1800 and the sub-mount 1810. In FIG. 18C, embodiments are shown in which the mounds on the cap 1800 are not aligned with the mounds on the sub-mount 1810 as in FIG. 18B, but rather the mounds 1830 on the cap 1800 are aligned with spaces between the mounds on the sub-mount 1810. In FIG. 18D, embodiments are shown, similar to those shown in FIG. 18A but with elongated mounds 1830. Embodiments such as those illustrated in FIG. 18D have similar features to those shown in the top views provided in FIG. 17D and FIG. 17E. In FIG. 18E, a side view is shown for embodiments in which elongated metal mounds 1830 are formed on the cap wafer 1800 and smaller metal mounds are formed on the sub-mount 1810. In an embodiment of FIG. 18E, the elongated mounds on the cap wafer 1800 are formed with one metal mound fabrication technique, that includes a photoresist patterning step followed by a metal deposition step, for example, and the metal dots on the sub-mount are formed by a solder ball jetting method. In another embodiment of FIG. 18E, the metal mounds on the cap 1800 and the metal mounds on the sub-mount 1810 are formed using the same mound formation technique. In FIG. 18F, an embodiment is shown in which metal mounds are formed only on the sub-mount 1810, without any metal mounds 1830 on the cap 1800. The illustrated descriptions in FIG. 18 show a range of exemplary embodiments for metal mounds 1830 as provided in metal mound forming steps 360, 560, 660. Many variations of the sizes and spacings of the metal mounds, on the placement of the metal mounds 1830 on the cap 1800 and the sub-mount 1810, and on the inclusion and placement of adhesion layer 1633, 1833, and z-stop 1638 are anticipated and remain with the scope of embodiments of the current invention.

Figures 19A, 19B, 19C:
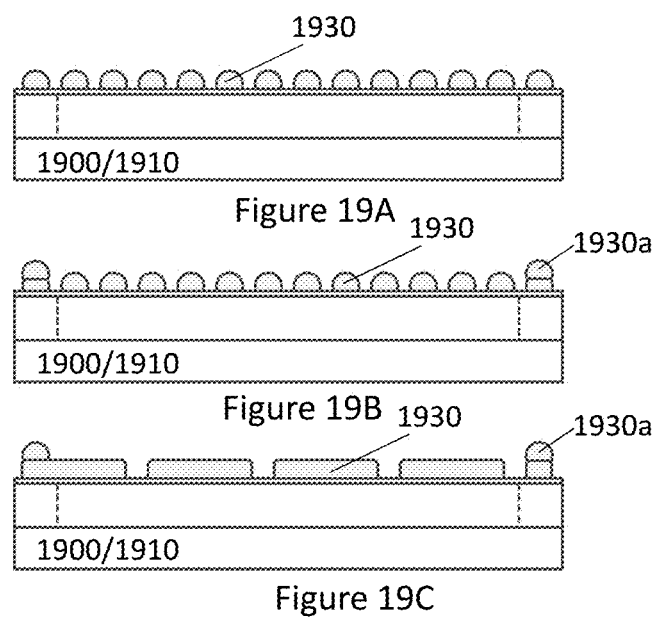
FIG. 19A-19C show side views of a number of embodiments of metal mound layouts FIG. 19A with all mounds at the same height, FIG. 19B with mounds at multiple heights, and FIG. 19C with mounds at multiple widths and heights.

Referring to FIG. 19, schematic side views of embodiments with various metal mound structures 1930 are shown. In FIG. 19A, metal mounds 1930 are formed on a cap 1900 or sub-mount 1910. The metal mounds 1930 shown in FIG. 19A are equally sized and equally spaced and are equal or approximately equal in height. In FIG. 19b, by contrast to FIG. 19A, an embodiment is shown in which the metal mounds 1930 are formed in a similar pattern of sizes and spacings as that shown in FIG. 19A with the exception that the metal mounds in the corners of the cap 1900 or sub-mount 1910 (the leftmost and rightmost metal mounds) are higher in height than the metal mounds 1930 between these corner mounds 1930a. In some embodiments, the increased height of one or more of the metal mounds can facilitate an intermediate attachment of the cap 1900 to the sub-mount 1910, prior to the formation of the hermetic seal. In an embodiment in which cap 1900 as shown in FIG. 19B with multiple height metal mounds 1930, the cap 1900 is heated and brought into contact only with the metal mounds that have the increased height. Contact of a heated cap 1900, allows for the separation of the alignment step 370, 570, 670 from the hermetic sealing step 390, 590, 690. In some embodiments, the capability for separating the alignment steps and the hermetic sealing steps allows for the optimization of each step in equipment that is more ideally suited for each step, for example. In alignment steps 370, 570, 670, an automated alignment system with optical detection can be used to align the caps 1900 and sub-mounts 1910. In some embodiments, automated alignment systems are not equipped with gas source 1306 or vacuum pump 1305. The provision for an intermediate tacking step in an alignment system, therefore, can be beneficial. The implementation of the metal mounds with increased height 1930a allows for an intermediate tacking step in which the cap 1900 is aligned and bonded to the sub-mount 1910 without completing the formation of the hermetic seal. After alignment and tacking of the cap 1900 with the sub-mount 1910 in a suitably equipped alignment system, the cap and submount assembly, in some embodiments, is moved to another system to perform the hermetic sealing step 390, 590, 690.

In other embodiments, as shown in FIG. 19C, metal mounds 1930 of multiple heights are formed with multiple techniques. A base layer of metal mounds is formed, for example, by a process similar to that shown in FIG. 12. On this base layer of metal mounds, a layer of elevated metal dots is formed, for example, using a solder ball jetting process at one or more locations to create the metal mound structure with multiple heights as shown in the embodiment in FIG. 19C. The metal mounds 1930a with the increased height, shown at the ends of the row of metal mounds in FIG. 19C, are used in embodiments to temporarily bond the cap 1900 to the sub-mount 1910. Temporary bonding would allow, for example in some embodiments, for the separation of the alignment steps 370, 570, 670 and the hermetic sealing steps 390, 590, 690.

Following the formation of the metal mounds 430, 730, 1130, 1230, 1530, 1630, 1730, 1830, 1930 in metal mound forming steps 360, 560, 660 as described herein, cap or cap wafer 901 is positioned with sub-mount or sub-mount wafer 1002 in positioning step 370, 570, 670. In embodiments, the positioning step 370, 570, 670 is followed by the evacuation/displacement step 380, 580, 680, and in some embodiments by cavity fill step 580, 680, and hermetic seal forming step 390, 590, 690. Inventive method provides for the formation of hermetic seal 150, 250, 450, 1450, as shown in FIGS. 1, 2, 4, and 14, respectively.

Figure 20:
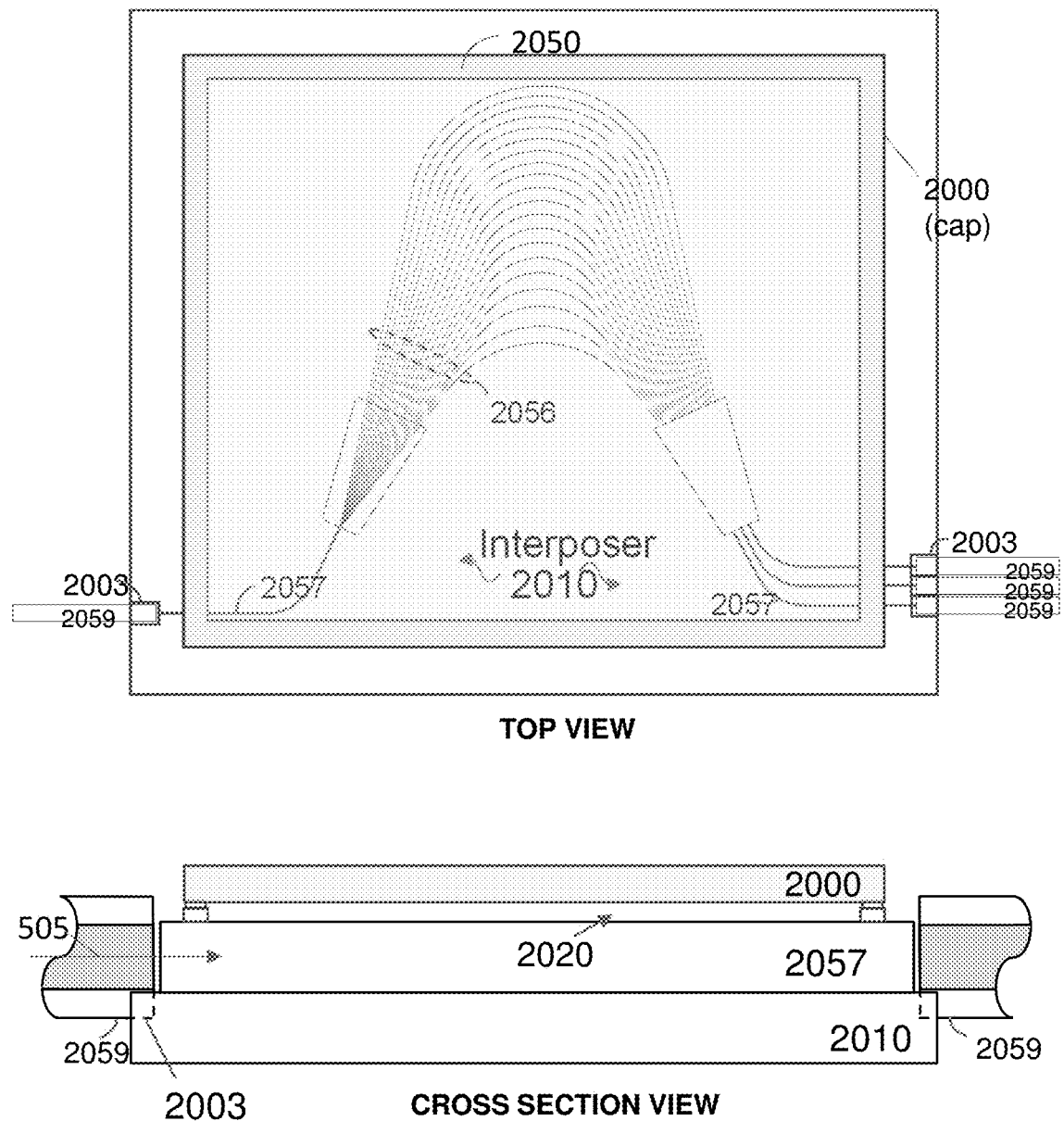
FIG. 20 shows top down view and cross-sectional view of an exemplary optical circuit that includes an arrayed waveguide showing planar waveguide on a substrate to form an optical dielectric interposer structure. Also shown are mounted optical fibers.

Referring to FIG. 20, an exemplary embodiment is shown for a planar waveguide on a substrate, interposer, or sub-mount assembly. Planar waveguides are used in embodiments to fabricate optical devices such as waveguides, arrayed waveguides, and echelle gratings, among other optical devices. In FIG. 20, a schematic drawing is shown for an arrayed waveguide that is formed from a planar waveguide. The arrayed waveguide shown in the schematic illustration in FIG. 20, uses the hermetic sealing approaches described herein in some embodiments in providing a seal for the cap of a capped subassembly. In other embodiments, the planar waveguide is used to fabricate planar optical devices in which the hermetic sealing approaches described herein are not utilized to seal the cap. The innovative use of the planar waveguide structures with and without the hermetic seal approaches described herein are further described in the following discussion.

Figure 21:
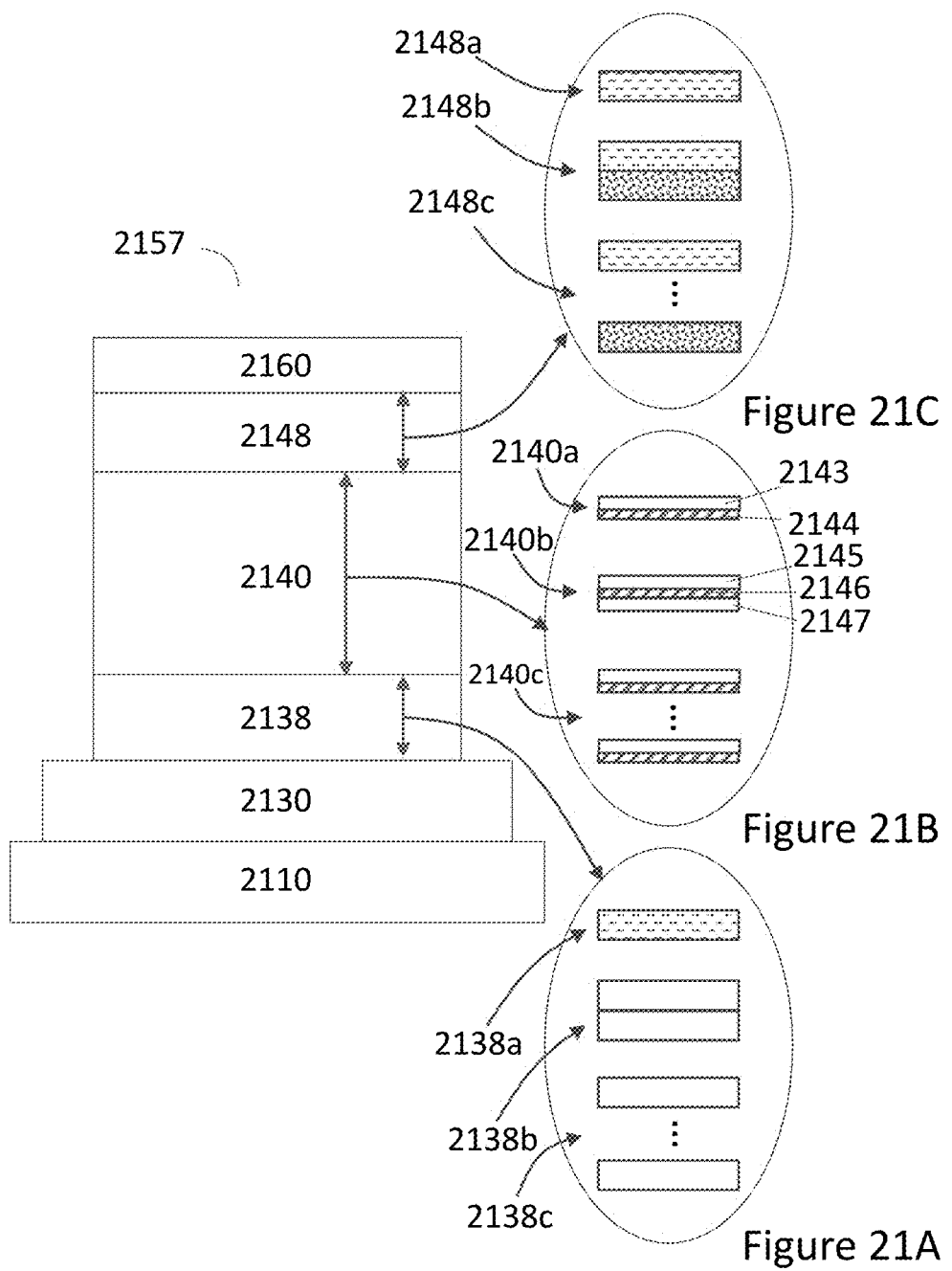
FIG. 21A-21C show an embodiment for a dielectric waveguide film structure that provides thick planar waveguides with low stress and low optical loss.

FIG. 20 shows a top-down and cross-sectional view of an arrayed waveguide structure utilizing a planar waveguide structure in which the waveguide layers are patterned to form optical pathways, in some embodiments, within which optical signals can propagate. In some embodiments, optical signals enter an optical device such as a waveguide, an arrayed waveguide, or an echelle grating, for example, for coding and decoding of information. In an embodiment as depicted in FIG. 20, an arrayed waveguide optical device 2056 is formed on substrate 2010 from planar waveguide layer 2057. Substrate 2010 as shown is an optical dielectric interposer. In other embodiments, substrate 2010 is a substrate or a sub-mount assembly. Optical signals 505 are received from mounted optical fiber 2059 in the embodiment by the interposer 2010 through the waveguide 2057 before entering the arrayed waveguide 2056. The optical fiber 2059 is mounted in V-groove 2003 formed in substrate 2010 in the embodiment shown. In some embodiments, the planar waveguide layer 2057 is a stack of layers as shown in FIG. 21. FIG. 21 shows a thick dielectric waveguide structure that can be formed with low stress and with low optical loss. In some embodiments, the waveguide structure 2157 is a stack of silicon oxynitride and silicon oxide layers.

An embodiment of a dielectric waveguide structure 2157 suitable for planar waveguide applications that require thick film structures with low stress and low optical loss is shown in FIG. 21. The inventive dielectric waveguide structure is a stack of dielectric films deposited on a substrate 2110 to form optical dielectric interposer 2010 and other embodiments to form a thick planar dielectric waveguide structure on a substrate, interposer, or sub-mount assembly. In an embodiment, the substrate is silicon. In other embodiments, the substrate is GaAs, InP, SiGe, SiC, or another semiconductor. In yet other embodiments, the substrate is aluminum nitride, aluminum oxide, silicon dioxide, quartz, glass, sapphire, or another ceramic or dielectric material. In yet other embodiments, the substrate is a metal. And in yet other embodiments, the substrate is a layered structure of one or more of a semiconductor, a ceramic, and a metal. It is to be understood that the substrate can be any material that provides a suitable mechanical support. It is to be further understood that a substrate with an interconnect layer that contains electrical lines and traces, separated with intermetal dielectric material, is a substrate.

The optical dielectric interposer 2010 includes a planar waveguide structure formed on substrate 2110. In an embodiment, the planar waveguide structure includes a buffer layer 2130, spacer layer 2138, a repeating stack of silicon oxynitride films 2140, a top spacer layer 2148, and an optional top layer 2160.

In preferred embodiments, buffer layer 2130 is one or more layers of silicon dioxide or silicon oxynitride. In some embodiments, the buffer layer is a layer of silicon oxynitride. In a preferred embodiment, the buffer layer 2130 is a silicon oxynitride layer, 5000 nm in thickness, with an index of refraction of 1.55. In other embodiments, the buffer layer 2130 is silicon oxynitride with refractive index of 1.55 and is thicker than 2000 nm. In other embodiments, the buffer layer 2130 is a silicon dioxide layer with a refractive index of approximately 1.445. In other embodiments, the buffer layer 2130 is a silicon dioxide layer with a refractive index of approximately 1.445 that is greater than 2000 nm in thickness. In a preferred embodiment, the buffer layer 2130 is a silicon dioxide layer that is approximately 4000 nm in thickness and with a refractive index of approximately 1.445.

Buffer layer 2130 can be a composite layer of one or more layers of silicon dioxide or silicon oxynitride with varying thicknesses that in some embodiments sum to greater than 4000 nm in total thickness. Similarly, the buffer layer 2130, in some preferred embodiments, can be a composite layer of one or more layers with varying refractive index, that when combined, provide a total thickness of greater than 4000 nm and a composite refractive index in the range of 1.4 to 2.02.

In some embodiments, spacer layer 2138 is one or more layers of silicon dioxide or silicon oxynitride. In an embodiment, the spacer layer 2138 is a single spacer layer 2138a of silicon oxynitride, 500 nm in thickness, with an index of refraction of 1.55. In some embodiments, single spacer layer 2138a is a layer of a single material, such as silicon dioxide. In other embodiments, single spacer layer 2138a is a layer of silicon oxynitride. In yet other embodiments, the single spacer layer 2138a is a layer of silicon oxynitride with refractive index of 1.55 with thickness of 500 nm. In yet other embodiments, single spacer layer 2138a is a layer of silicon oxynitride with thickness in the range of 0 to 1000 nm. Although in some embodiments, a spacer layer 2138 is included in the structure, in some other embodiments, the spacer layer 2138, can be combined with the buffer layer, can be made very thin, or is not included.

Spacer layer 2138 can be a composite spacer layer 2138b of one or more layers of silicon oxynitride or silicon dioxide. In an embodiment, composite spacer layer 2138b includes two layers of silicon oxynitride with thicknesses of 250 nm and with a composite refractive index of approximately 1.55. In some embodiments, the sum of the thicknesses of the two layers in composite spacer layer 2138b is in the range of 1 to 1000 nm.

Similarly, the spacer layer 2138 can be a composite layer 2138c of three or more layers with the same or varying thicknesses and refractive indices, that when combined, provide a total thickness in the range of 1 nm to 1000 nm and a composite refractive index in the range of 1.4 to 2.02. Variations in the construction of the spacer layer 2138 are shown in FIG. 21A.

The combined thicknesses of the buffer layer 2130 and the spacer layer 2138 in embodiments provide spatial separation between the core repeating stack 2140 and the substrate 2110 and reduce, minimize, or eliminate the interaction of the transmitted optical signal with the substrate 2110. The transmission of optical signals with low optical loss through the repeating structure 2140 requires some degree of confinement of the signal to the waveguide with minimal interaction of the optical signals with the substrate 2110 in embodiments for which the optical signals are attenuated in the substrate material. Silicon and some other semiconductors, and metal layers in the interconnect layers, for example, can lead to significant attenuation of optical signals. The combined thicknesses of the buffer layer 2130 and the spacer 2138 provide spatial isolation between the substrate materials and the upper layers of the inventive dielectric stack structure to reduce the interaction of transmitted optical signals with materials in the substrate that can lead to attenuation. In some embodiments, the spacer layer 2138 is an etch stop layer such as aluminum nitride, for example. In embodiments, in which the spacer layer 2138 is an etch stop layer, the etch stop is used, for example, to provide an etch stop for an etch patterning process for layers above the spacer layer in the stack structure, such as the repeating layer 2140.

Dielectric stack 2140 forms the core of the inventive waveguide structure through which optical signals can be transmitted with low optical loss. In preferred embodiments, the dielectric film stack 2140 of is a layered structure of silicon oxynitride films.

In an embodiment, the dielectric stack 2140 has a repeating stack 2140a of two dielectric films in which the constituent films within the repeating stack structure 2140a are of differing refractive indices. Differences in the refractive indices can occur primarily from changes in the stoichiometric composition of the films. In preferred embodiments, the changes in the stoichiometry of the films in the repeating film structure 2140 is accomplished with changes in the process conditions used in the deposition of the films in the repeating film structure 2140. In a preferred embodiment, the repeating stack structure 2140a includes a first film 2143 of 900 nm of silicon oxynitride with an index of refraction of 1.6 and a second film 2144 of 50 nm of silicon oxynitride with an index of refraction of 1.7. In another preferred embodiment, the repeating structure 2140a includes a first film 2143 of 40 nm of silicon oxynitride with an index of refraction of 1.7 and a second film 2144 of 500 nm of silicon oxynitride with an index of refraction of 1.65. In yet another preferred embodiment, the repeating structure 2140a includes a first film 2143 of 60 nm of silicon oxynitride with an index of refraction of 1.7 and a second film 2144 of 500 nm of silicon oxynitride with an index of refraction of 1.65. It is to be understood that the order of the first film 2143 and the second film 2144 in embodiments can be reversed and remain within the scope and spirit of the invention.

In another embodiment, the dielectric stack 2140b has a repeating stack 2140 of more than two dielectric films in which the constituent films 2145-2147 within the repeating structure 2140a are of differing refractive indices, and in some embodiments, of the same or differing thicknesses. In an embodiment, repeating stack 2140b includes a first film 2145 of 400 nm of silicon oxynitride with an index of refraction of 1.6, a second film 2146 of 500 nm of silicon oxynitride with an index of refraction of 1.65, and a third film 2147 of 50 nm of silicon oxynitride with an index of refraction of 1.7.

In yet other embodiments, the repeating stack 2140c of dielectric stack 2140 includes more than three layers for which the index of refraction for the constituent layers of silicon oxynitride is varied to achieve the total film thickness of the overall dielectric stack structure 2157. In embodiments, for example, in which the repeating film structure 2140a has two constituent films with a combined thickness of 600 nm, the stack must be repeated 15 times to reach an overall thickness of 9 microns for the dielectric film stack 2140. In other embodiments in which the overall thickness of the dielectric film stack is 9 microns, a repeating stack of 45 constituent layers of 100 nm each can be implemented in which the overall repeating structure 2140a-2140c need only be repeated twice to achieve the overall thickness. In yet other embodiments, the repeating structure 2140a-2140c of dielectric stack 2140 has a layered film structure that does not repeat because the total number of constituent films in the repeating stack provides sufficient overall film thickness for the film structure 2140.

In some embodiments, the repeating film structure 2140 is a composite structure of repeating stacks. In embodiments with the repeating stack 2140a, the overall thickness of repeating film structure 2140 is the combined thickness of the repeating stack 2140a, 2140b multiplied by the number of times that the repeating stack 2140a-2140b is repeated. For example, the repeating film structure 2140a for a preferred embodiment in which the first layer 2143 is 900 nm and the second layer 2144 is 50 nm has a total repeating stack thickness of 950 nm and when repeated 9 times, the resulting combined film thickness for dielectric stack 2140 is 8590 nm ((900 nm+50 nm)×9=8590 nm)). Similarly, in another preferred embodiment, the repeating film structure 2140a, which has a first layer 2143 that is 40 nm with a refractive index of 1.7, and which has a second layer 2144 that is 500 nm in thickness with a refractive index of 1.65, has a combined thickness for repeating stack 2140 of 540 nm, and when repeated 10 times, has a resulting combined film thickness for dielectric stack 2140 of 5400 nm ((500 nm+40 nm)×10=5400 nm)). The variations in film structure for embodiments of repeating layer 2140 are shown in the inset in FIG. 21B.

Generally, the thickness of the overall dielectric stack 2157 is sufficiently thick to achieve the low optical loss for optical signals transmitted through the resulting waveguide structure 2140. The multilayer structure, deposited at low temperatures, ensures low stress in the resulting film structure and enables thick waveguides (2000 nm to 25000 nm) to be formed. Waveguide structures 2140 are thus sufficiently thick to enable transmission of the optical signals with low interaction levels for the transmitted optical signals with the substrate, interaction levels that could lead to undesired attenuation of the transmitted signals for thinner waveguide structures.

It is to be understood that the thickness, the number of films, and the refractive index for the films in dielectric stack 2140 can vary and remain within the scope of the current invention. The refractive index of silicon oxynitride films can vary in the range of 1.4 to 2.02. As the concentration of nitrogen in deposited silicon oxynitride films is minimized, the refractive index approaches the index of refraction of silicon dioxide, 1.445. Conversely, as the concentration of oxygen is minimized in the deposited films, the refractive index approaches the index of refraction of silicon nitride, 2.02. The index of refraction can thusly be varied in the range of 1.445 to 2.02 by varying the stoichiometric concentration of silicon, oxygen, and nitrogen in the deposited films. In embodiments, the index of refraction for the constituent films 2143, 2144 in the repeating dielectric film stack 2140a, for example, are varied in the range of 1.445 to 2.02 to produce thick film structures of 2000 to 25000 nm, or greater, and that provide low stress and low optical signal losses, in dielectric film stacks 2140.

In another preferred embodiment, the dielectric film stack 2140 includes a repeating stack 2140*a* with a first layer 2143 of silicon oxynitride with thickness of 60 nm and an index of refraction of 1.7 and a second layer 2144 of silicon oxynitride with thickness of 500 nm and an index of refraction of 1.65. Repeating dielectric stack structure 2140*a* is repeated in an embodiment 13 times for a total thickness for dielectric film stack 2140 of 7280 nm. It is to be understood that the total number of repeating film stacks 2140*a* can vary. In some preferred embodiments, the number of repeating film stacks 2140*a* is three to twenty. In some other preferred embodiments, the repeating film stack 2140*a* is such to produce a total dielectric film structure 2140 that in some embodiments is greater than 2000 nm in thickness and in some embodiments less than 25000 nm. In yet other embodiments, the number of repeating film stacks 141 is two or more and the thickness of the dielectric film structure 2140 is greater than 2000 nm and less than 25000 nm.

In some embodiments, the thickness for the first film 2143 is in the range of 5 nm to 1000 nm. In some other embodiments, the thickness of the second film 2144 is in the range of 5 nm to 1000 nm. In these and other embodiments, the thickness of the dielectric film structure 2140, which is the sum of the thicknesses of the repeating film structures 2140*a*, is greater than 2000 nm in thickness. In preferred embodiments, the thickness of the sum of the repeating film structures 2140*a* is in the range of 4000 to 10000 nm.

It is to be understood that the repeating film structure 2140*a* is an integral component of the inventive dielectric stack structure 2140. It is also to be understood that the number of films, the film thicknesses, the refractive indices, and the resulting composition of the films can be varied and remain within the spirit and scope of the inventive dielectric stack structure 2140, and in the practice of utilizing the dielectric stack structure 2140 to provide low stress and low optical loss for signals transmitted through waveguides that are fabricated from the dielectric stack structure 2140. In this regard, in some embodiments, an initial repeating film structure 2140*a* is used for two or more of the films in the dielectric stack 2140, and then a different repeating film structure 2140*a* is used for another two or more films in the same dielectric film structure 2140 to produce inventive dielectric stack 2140. It is to be further understood that an initial repeating film structure 2140*a* can be used for two or more of the films in the dielectric film structure 2140, a different repeating film structure 2140*a*, can be used for another two or more films in the same dielectric film structure 2140, and then any number of additional repeating film structures 2140*a* with the same or different repeating film structures can be used for two or more additional films in the dielectric film structure 2140 and remain within the scope and spirit of the embodiments. In the foregoing discussion, the variations in the first film 2143 and second film 2144 can be produced with one or more variations in the refractive index, the thickness, and the composition or stoichiometry of the films.

It is also to be understood that in some embodiments, first film 2143 in the repeating film structure 2140*a* can include one or more films and remain within the scope of the invention. In an embodiment, first film 2143 in repeating film structure 2140*a*, for example, is 500 nm in thickness with a refractive index of 1.7. In another embodiment, first film 2143 includes a first part that is 250 nm in thickness with a refractive index of 1.7 and a second part that is 250 nm in thickness with a refractive index of 1.65. In yet another embodiment, the first film 2143 in the repeating film structure 2140*a* has a refractive index of 1.68 with a first partial thickness that is 250 nm and a second partial thickness that is deposited in a separate process step from the first, for example, and that is also 250 nm in thickness for a combined thickness of 500 nm for the two partial films of the first film 2143 of repeating film structure 2140*a*.

In some embodiments, the first film 2143 has a graded refractive index or stoichiometric composition. Gradations in the composition of the first film 2143 of the repeating film structure 2140*a*, for example, remain within the scope of the current invention. In some embodiments, the refractive index varies through part or all of the thickness of the first film 2143. Similarly, in some embodiments, the stoichiometric composition varies through part or all of the thickness of the first film 2143. Variations in the refractive index or the stoichiometric composition of the first film 2143 within the thickness of this film remain within the scope of the current invention.

It is also to be understood that in some embodiments, second film 2144 in the repeating film structure 2140*a* can include one or more films and remain within the scope of the invention. In an embodiment, second film 2144 in repeating film structure 2140*a*, for example, is 500 nm in thickness with a refractive index of 1.7. In another embodiment, second film 2144 includes a first part that is 250 nm in thickness with a refractive index of 1.7 and a second part that is 250 nm in thickness with a refractive index of 1.65. In yet another embodiment, the second film 2144 in the repeating film structure 2140*a* has a refractive index of 1.68 with a first partial thickness that is 250 nm and a second partial thickness that is deposited in a separate process step from the first, for example, that is also 250 nm for a combined thickness of 500 nm for the two partial films of the second film 2144 of the repeating film structure 2140*a*.

In some embodiments, the second film 2144 has a graded refractive index or stoichiometric composition. Gradations in the composition of the second film 2144 of the repeating film structure 2140*a*, for example, remain within the scope of the current invention. In some embodiments, the refractive index varies through part or all of the thickness of the second film 2144. Similarly, the stoichiometric composition varies through part or all of the thickness of the second film 2144. Variations in the refractive index or the stoichiometric composition of the second film 2144 within the thickness of this film remain within the scope of the current invention.

In some embodiments, repeating structure 2140 has an unequal number of first layers 2143 and second layers 2144. In some embodiments, repeating structure 2140 includes a first layer 2143 positioned between two second layers 2144.

In embodiments, top spacer layer 2148 is one or more layers of silicon dioxide or silicon oxynitride as shown in FIG. 21C. In some embodiments, single spacer layer 2148*a* is a layer of one type of material, such as silicon dioxide. In some preferred embodiments, single spacer layer 2148*a* is a layer of silicon oxynitride. In yet other preferred embodiments, the single spacer layer 2148*a* is a layer of silicon oxynitride with refractive index of 1.55 and with a thickness of 500 nm. In yet other embodiments, single spacer layer 2148*a* is a layer of silicon oxynitride with thickness in the range of 0 to 1000 nm. Although in preferred embodiments, a spacer layer 2148*a* is included in the structure, in some other embodiments, the spacer layer 2148 can be combined with an optional top layer, can be made very thin, or is not included.

Spacer layer 2148 can be a composite spacer layer 2148*b* of one or more layers of silicon oxynitride or silicon dioxide. In an embodiment, composite spacer layer 2148*b* includes two layers of silicon oxynitride with thicknesses of 250 nm and with a composite refractive index of approximately 1.55. In some embodiments, the sum of the thicknesses of the two layers in composite spacer layer 2148*b* is in the range of 1 to 1000 nm.

Similarly, the spacer layer 2148 can be a composite layer 2148*c* of three or more layers with the same or different thicknesses and refractive indices, that when combined, provide a total thickness in the range of 1 nm to 1000 nm and a composite refractive index in the range of 1.4 to 2.02.

Optional top layer 2160 is one or more layers of a dielectric material such as silicon dioxide, silicon nitride, aluminum oxide, and aluminum nitride, among others. In some embodiments, a top layer 2160 of silicon dioxide with thickness of 200 nm and a refractive index of 1.445 is used. In some embodiments, the film thickness of the top layer is in the range of 0 to 500 nm. In some embodiments, silicon oxynitride is used in the optional top layer 2160. In some embodiments, another dielectric material or combination of materials such as aluminum nitride or aluminum oxide is used. In some embodiments, no optional top layer 2160 is provided.

In embodiments of the inventive planar waveguide structures including substrates, interposers, and sub-mount assemblies, the waveguide structures that are used to carry and route the optical signals in an optoelectronic or photonic circuit can be one or more of a variety of waveguide structures. Innovative dielectric stack layers perform optimally for use in waveguide structures for conditions in which the stack exhibits low optical loss, low stress, and low deposition temperatures. Some examples of waveguide structures include arrayed waveguides, echelle gratings, combiners, splitters, and through-seal waveguides. Through-seal waveguides are used in an embodiment of the planar waveguides to deliver light through a hermetic seal.

Figure 22:
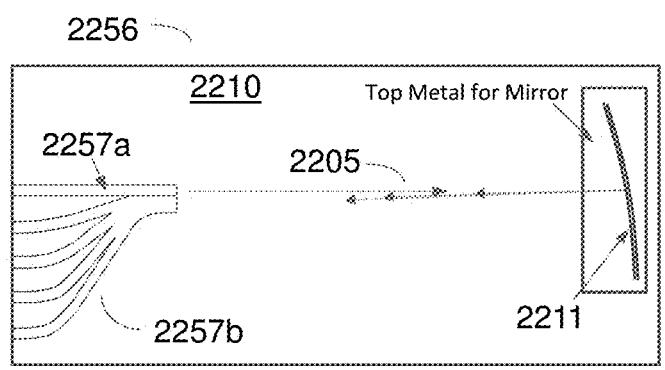
FIG. 22 shows a top down view of an exemplary optical circuit that includes an echelle grating.

Currently, in photonic circuits for which the planar waveguides are not utilized, there is a need to fabricate waveguides as discrete optical circuit elements that are then incorporated with other circuit elements onto a submount assembly to build the circuit. The combination of the innovative planar waveguide structures with a substrate, interposer, or sub-mount assembly is hereinafter referred to as an optical dielectric interposer (ODI). As an alternative to the fabrication of discrete optical circuit or device elements, waveguides can be fabricated directly into the optical dielectric interposer layers using photolithography and etching of the dielectric stack structure. Eliminating the need to add discrete waveguides onto the submount assembly can result in significant cost savings. The exemplary embodiment of optical waveguide devices that can be fabricated into the dielectric interposer layers are shown in the case of an arrayed waveguide in FIG. 20, and additionally for an echelle grating in FIG. 22. The devices shown in FIGS. 20*a* and 22 are just two examples of waveguide structures that can be fabricated directly into the dielectric stack 2157 of the optical dielectric interposer. Other optical devices and device elements can also be fabricated using the optical dielectric interposer structure 2157.

In an embodiment, an Echelle grating, a form of optical device 2256 is fabricated with the optical dielectric stack structure 2257 on substrate 2210. FIG. 22 shows a layout of a patterned input waveguide 2257*a* and output waveguides 2257*b*. Optical signals delivered to the Echelle mirror 2211 are separated into constituent wavelengths and directed to output waveguides 2157*b* and routed for additional processing in some embodiments.

An example of a sequence of steps that could be used to fabricate an Echelle grating 2256 structure in the inventive ODI is shown in FIG. 23. The fabrication of the arrayed waveguides, the Echelle gratings, and other optical devices 2256 in the dielectric interposer structure 2157 can be accomplished using thin film deposition technology and patterning fabrication techniques. A method of formation for an echelle grating, in an embodiment of the inventive ODI, is provided in FIG. 23.

Figure 23A:
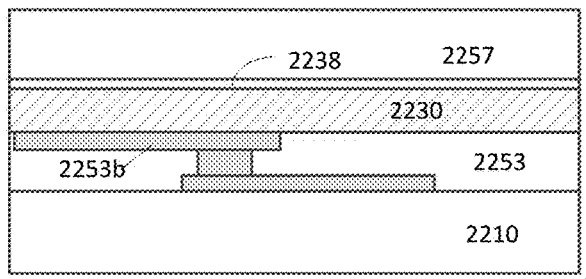
FIG. 23A-23D show a fabrication sequence for an Echelle grating structure that highlights some of the steps in an embodiment required to fabricate a waveguide device in the interposer dielectric.

In FIG. 23A, the film structure for an Echelle grating device in an embodiment is shown. In this embodiment, a high resistivity silicon substrate 2210 is used, for example. A metallization scheme, copper/damascene, for example is utilized to provide the metal contact layers 2253*b* to lasers or diodes mounted on the interposer from which the sub-mount assembly is fabricated. The metallization layer 2253 includes electrical traces 2253*b* and intermetal dielectric layers to form the interconnects between the electrical and optoelectrical devices on the interposer or sub-mount assembly and to contact points for connections to other devices or assemblies mounted on or in proximity to the sub-mount assembly or interposer. In an embodiment in which a laser is implemented, a means for effectively dissipating heat from the discrete laser (not shown), a thermally conductive, electrically insulating layer (thermal spreader) is also incorporated within or between the copper metallization layer 2253 and the underlying substrate 2210. The combined thermal conductivity between the copper metal and the insulating thermal spreader layer remove heat from the laser, or other heat generating device, and channels the heat to the underlying substrate. Once channeled to the underlying substrate, the heat can be dissipated using common computer chip packaging methodologies to couple the substrate to a heat sink.

In the embodiment shown in FIG. 23, multiple layers of copper metallization layers 2253*b* are shown. In another embodiment, a single level copper metallization is used. In yet other embodiments, multilevel metallization is used to incorporate passive devices such as resistors and capacitors, for example. In yet other embodiments, multilevel metallization schemes are utilized to provide interconnects to CMOS or analog circuitry incorporated into the underlying substrate. It is to be understood that the Echelle waveguide can be combined with any of a large number of photonic devices and combinations of devices, and that each combination will require potentially unique metallization layouts and interconnectivity between the devices and the substrate 2210.

In the embodiment shown in FIG. 23A, a buffer layer 2230 of silicon dioxide or silicon oxynitride layer is deposited over the metallization structure 2253 to provide the necessary vertical height alignment of the optical axes for the devices in the photonic circuit and to aid in the isolation of optical signals propagating in layer 2257 from the metallization layer 2253 and substrate 2210. In the embodiment with a laser and an echelle grating, for example, 3-5 um of silicon dioxide or silicon oxynitride is deposited prior to deposition of the upper layers of the dielectric stack structure. In an embodiment, an etch stop layer 2238 such as aluminum nitride is deposited within the dielectric stack either between a superlattice waveguide structure or planar waveguide structure and the underlying silicon oxynitride buffer layer, or elsewhere in the stack, to facilitate the removal of the upper layers of the dielectric structure, in specifically targeted regions defined by the etch mask, to a fixed depth.

Figure 23B:
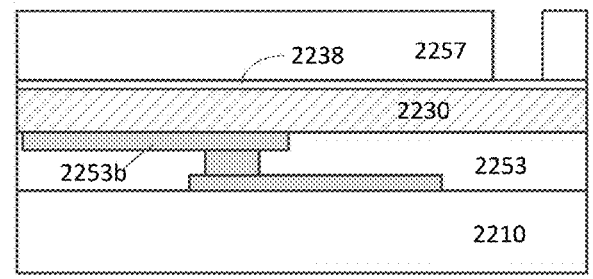
Figure 23C:
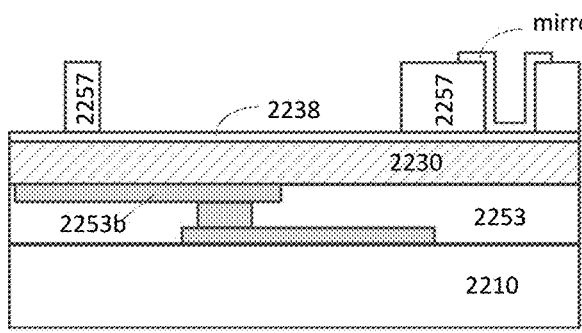

In FIG. 23B, a first patterning step is implemented to create a trench in the dielectric waveguide structure. This trench will be used to form the teeth of the Echelle grating as shown in the top down view in FIG. 22. A hard mask such as aluminum, aluminum nitride, or aluminum oxide is used in some embodiments. Vertical, or near vertical profiles with minimal striations is preferable for the sidewalls in the resulting trench. This trench in the waveguide structure is then lined with aluminum in a preferred embodiment of the inventive ODI. Other reflective metal layers, metal alloys, composite metal structures are used in other embodiments. The aluminum layer is patterned using subtractive photo-lithographic patterning or lift off revealing the structure as shown in FIG. 23C.

Patterning of the island within which the Echelle grating teeth are formed typically follows the preceding aluminum deposition step. The patterning of the island shown in the top down view in FIG. 23c can be accomplished with either a hard mask or photoresist mask layer. In some embodiments the profile is vertical. In other embodiments, a non-vertical profile is used. The steps for implementing either of these island patterning techniques are well known to those skilled in the art of semiconductor device fabrication.

Figure 23D:
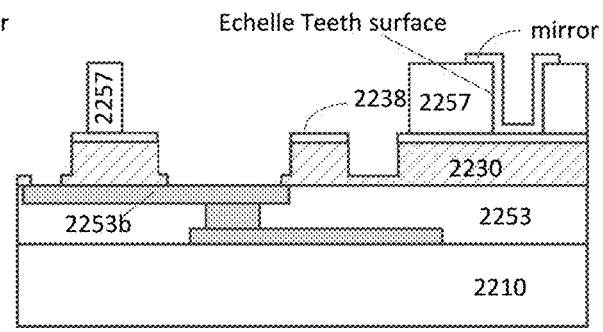

In the described embodiment, the final steps in the fabrication of the ODI with Echelle grating are shown in FIG. 23D. The dielectric buffer layer 2230 is etched to a depth such that a height of 700 nm remains in areas within which accommodations are required for devices that will be mounted onto the subassembly. In other embodiments, the height of the remaining material may differ, and is dependent on the requirements for achieving the alignment of the optical axes for the devices used in the optical circuit. In some embodiments, multiple heights of the remaining buffer layer 2230 may be required to accommodate a variety of devices in the optical circuit. After the vertical step heights of the remaining dielectric stack structures are established with suitable patterning and etch processes, that may include thin etch stop layers such as aluminum nitride to incorporate into the dielectric film stack, the areas required to contact the underlying bond pads are patterned and etched to expose the metallization below.

The fabrication sequence shown in FIG. 23 for a simplified submount assembly 2310 is intended for illustrative purposes and highlights some of the steps required to produce a waveguide, in this case an Echelle grating, in the dielectric stack layers in the inventive ODI.

A commonly used method for evaluating the quality and operability of electronic and optical device assemblies during production is to perform wafer level testing. Wafer level testing is testing that is performed at an intermediate stage of the overall production process prior to the singulation of a semiconductor wafer or other substrate into individual die. In embodiments, the waveguide structure shown in FIG. 24 provides a means for wafer level testing during production, and prior to overall completion of the packaged sub-mount assemblies of interposers that utilize planar waveguides.

Provisions are often made in the design of a wafer, or of the design of the die on a wafer, to provide the means for collection of data that can yield information about whether or not the tested die are expected to function properly upon completion of the fabrication process. Having this information for misprocessed die can limit further processing of die that have been deemed to have failed a functionality test at a particular stage of the production process, thus eliminating any further processing of the failed die.

Functionality tests can require, or benefit from, features that are designed into the wafer or die from which the functionality data are collected. Similarly, test features can be included in substrates that are targeted for use as submount assemblies. In these cases, it is beneficial to incorporate features into the submount assembly, or a peripheral to the submount assembly, to provide the means for the collection of functionality information. In embodiments of the inventive ODI, wafer level testing waveguide structures are incorporated into the substrates upon which the inventive dielectric stacks are deposited.

Figure 24:
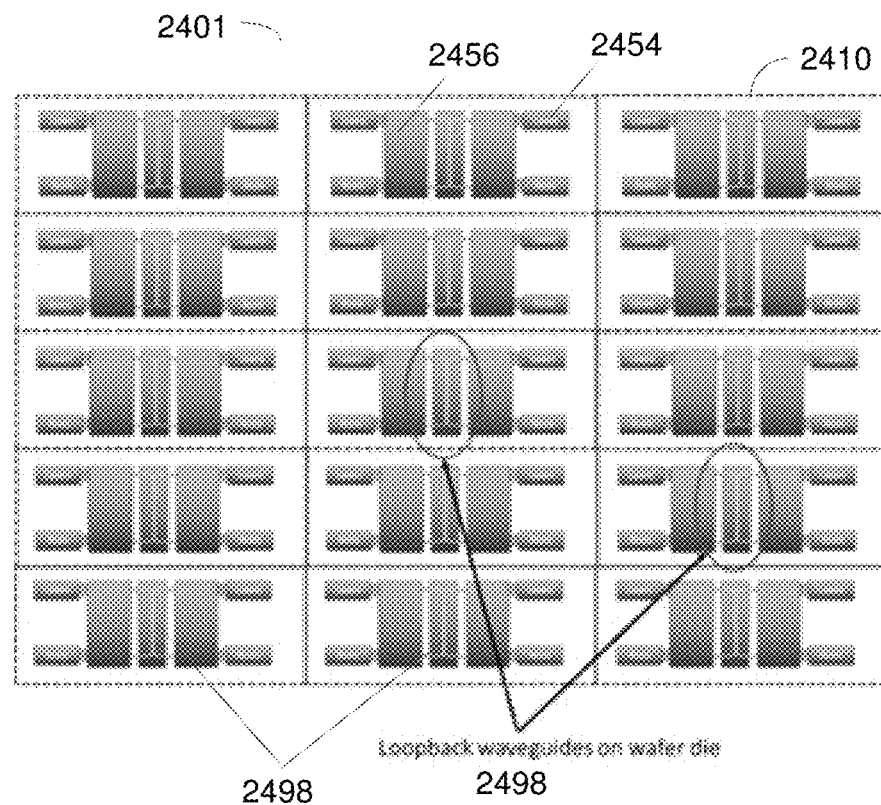
FIG. 24 shows an exemplary layout of optical components in a submount assembly showing the relative positions of the Loopback waveguide in an embodiment in which the Loop back waveguide occupies sacrificial parts of the substrate.

In FIG. 24, an innovative structure that allows for wafer level testing before and after completion of modules or assemblies that are formed from planar dielectric waveguides or optical dielectric interposers is shown in a top-down view. The device structure consists of a planar waveguide on a substrate, interposer, or sub-mount assembly as described herein, for example, in the cross sections shown in FIG. 21. Planar waveguides layers are formed on a substrate, interposer, or sub-mount assembly and patterned to form patterned waveguides as shown in FIG. 24.

In FIG. 24, a portion of a substrate wafer 2401 upon which an embodiment of the inventive ODI is deposited, is shown. FIG. 24 shows a portion of a substrate or wafer assembly with fifteen die in a 3 wide by 5 high exemplary arrangement. Each die contains two ODI submount assemblies with optical devices 2456 and optoelectrical devices 2454 and one sacrificial wafer level test feature 2498 between the two submount assemblies. The test features are labeled "Loopback waveguides on wafer die" for two of the die shown in FIG. 24.

Figure 25:
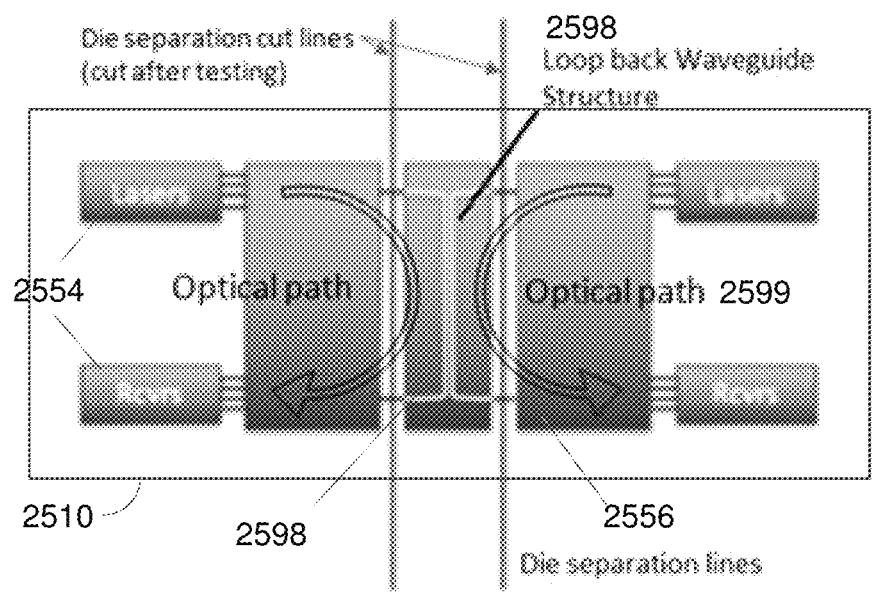
FIG. 25 shows a loop-back waveguide structure that provides an optical path for wafer level testing of electro-optical devices on a submount assembly.

In an embodiment of the inventive ODI, the ODI submount assembly substrates 2410 provide a waveguide on the loopback waveguide test feature 2498 that includes a wafer level test structure that enables the collection of electrical or optical information pertaining to the operability of the assembly, or parts of the assembly. This inventive embodiment of the dielectric stack structure is hereinafter labeled a loop back waveguide structure 2498, for which an embodiment is shown in FIG. 25. In FIG. 25, directional paths 2599 for optical signals 505 in an embodiment that propagate in the test structure 2598 and the sub-assembly 2510 are shown. In this embodiment, optical signals from a sending device, in this case a laser 2554, are routed through waveguides in the optical circuit on the submount assembly 2510, to the loop back structure 2599 on the peripheral die as shown, and then routed back through waveguides on the submount assembly 2510 to a receiving device 2554. Electrical probes in this embodiment are contacted to electrical leads to one or more of the sending or receiving devices 2554 to activate and operate the devices, and to generate data from the test.

The loop back waveguide structures 2598 in the embodiments allow for testing of the electrical and optical operation of the assembly without the need to fully complete the fabrication of the complete submount assembly, and without the need to connect the assembly to an external fiber. Connection and testing with the externally mounted optical fiber connections can be time consuming and costly, raising the costs associated with production and testing of the assemblies 2510. In the event that device assemblies are found to yield test data that are outside of a desired test range, further processing of the assembly can be discontinued, for example, in some embodiments to avoid expensive processing of device assemblies that would not be expected to meet targeted product operational specifications.

Figure 26:
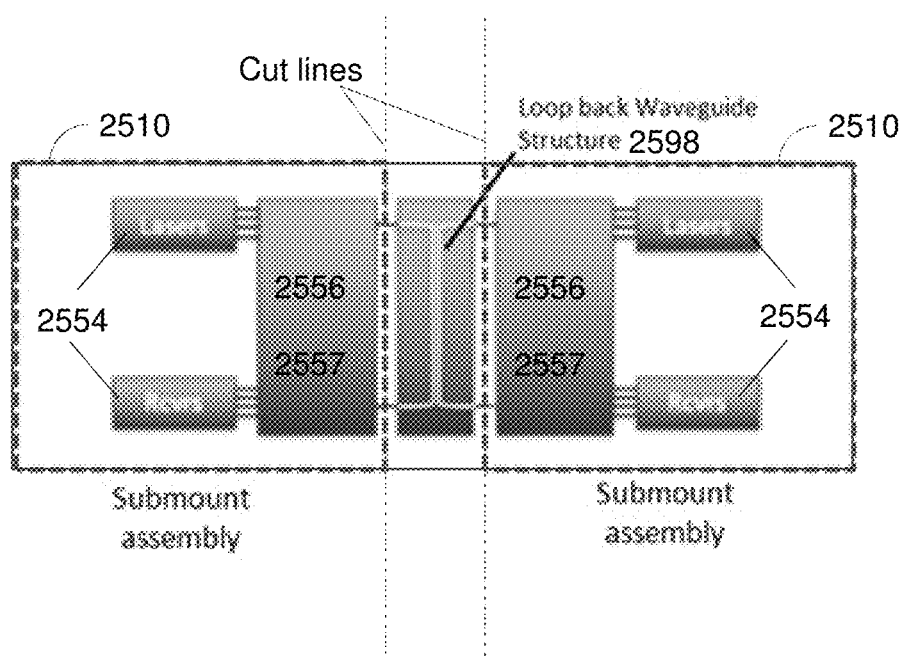
FIG. 26 shows a loop-back waveguide structure that provides an optical path for wafer level testing of electro-optical devices on a submount assembly. The loop back waveguide occupies a sacrificial area of the substrate in this embodiment.

In the drawing shown in FIG. 25 of an embodiment of the inventive ODI that includes a loop back waveguide feature 2598 for wafer level testing, the section of the wafer on which the loop back test feature resides can be discarded after singulation of the die. This sacrificial area of the die lies in a section of a wafer or substrate between two adjacent submount die for this embodiment. In other embodiments, the section of the substrate or die with the loop back waveguide is not discarded after fabrication. The die separation cut lines for an embodiment are shown in FIG. 25. In other embodiments, the loop back waveguide structures are part of the sub-mount assembly and remain part of the assembly upon completion of the sub-mount assembly fabrication. In FIG. 26, approximate die sizes for the submount assembly 2510 are shown within the dotted lines for an embodiment in which the sacrificial regions are singulated and for which these singulated parts can be discarded after testing and separation. Elimination of the loop back structures after fabrication and testing can assist in minimizing substrate area for the final assemblies 2510. Optical devices 2556 formed with waveguides 2257 and connected to optoelectronic devices 2554 are also shown on the sub-mounts or interposer assembly 2510 in FIG. 26.

The loop back waveguide structure 2598 in the inventive ODI allows light to travel from a light sending device 2554, such as a laser, mounted on the submount assembly 2510, outside the submount package in some embodiments, and back into a receiving device 2554, such as a photodiode so that measures of functionality can be ascertained from the assembly at an intermediate stage of the production process. In an embodiment using the simple structure shown in FIG. 26, the loop back structure 2598 resides on a sacrificial section of the wafer that will be separated from the submount assembly upon completion of the production process.

Figure 27A:
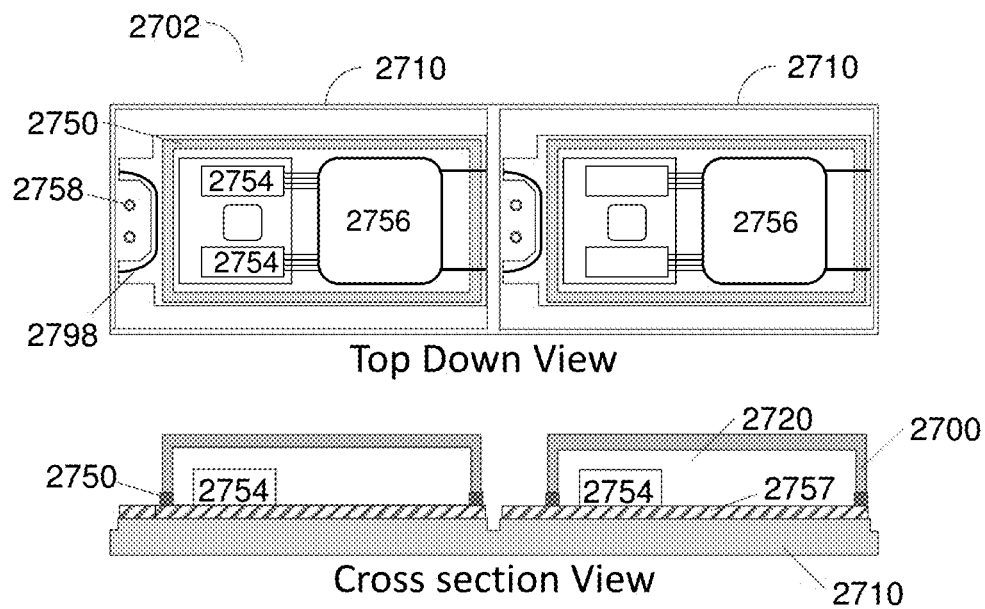
FIG. 27A-27B show an embodiment of an ODI with a loop back waveguide in which the waveguide resides on a neighboring die relative to the die for which the operational data is collected.
Figure 27B:
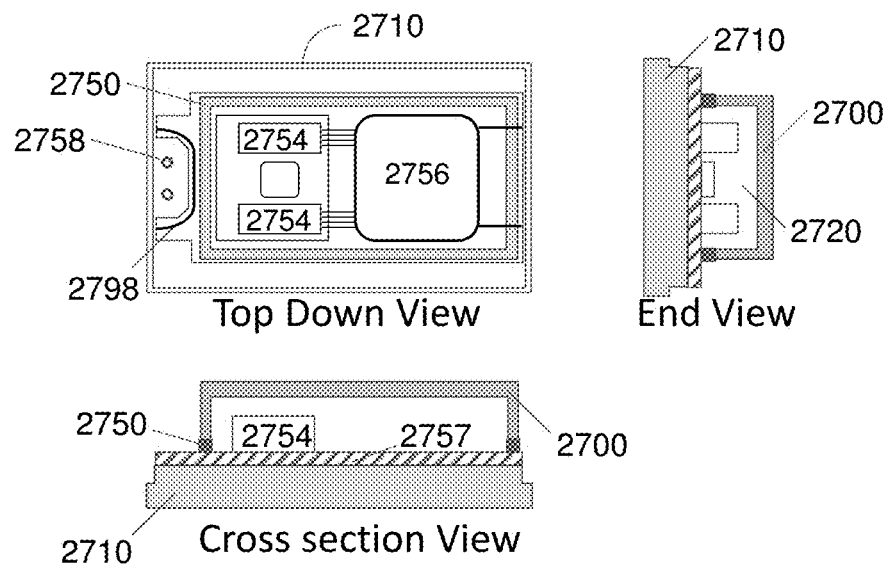

In yet another embodiment, as shown in FIG. 27, the loop back waveguide structure 2798 is formed as a portion of the sub-mount assembly fabrication. The test structures for a specific die on the substrate 2710 reside on a neighboring die as shown in FIG. 27. The loop back waveguide structure shown in the center of the top down view at the top of FIG. 27a, although a portion of the right sub-mount assembly, is used in the testing of the sub-assembly on the left of the top view at the top of FIG. 27A in this embodiment. In these embodiments, the functionality of the test structure is maintained until the neighboring dies are separated during the die singulation process. For the embodiment for the wafer level test feature of the inventive ODI, the loop back test feature 2798 is not discarded after singulation but remains part of the ODI submount assembly 2710. In some embodiments, however, the portion of the substrate with the loop back waveguide feature is repurposed. In yet other embodiments, the loop back waveguides are included on portions of the wafer that would otherwise not be utilized. In an embodiment, the loopback waveguides border the portion of the wafer, that contain the electrical contacts that are external to the hermetically sealed portion of the completed assembly. In FIG. 27B, a singulated sub-mount assembly is shown in top down view, cross-section, and end view. The loop back functionality, in the embodiment shown, occurs in the planar waveguide structure 2757. Also shown in FIG. 27 are the cap structure 2700, enclosed optoelectrical devices 2754 and enclosed optical devices 2756 in cavity 2720, and electrical contacts 2758.

Figure 28A:
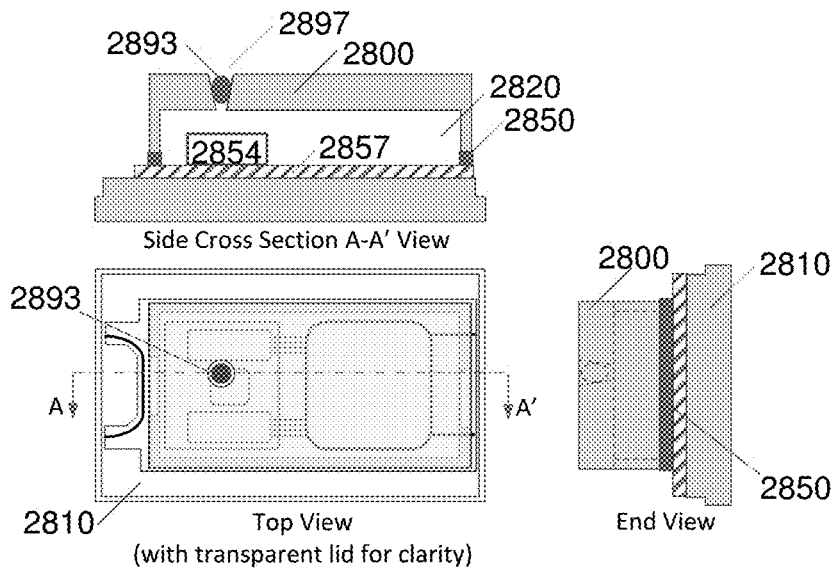
FIG. 28A-28B show a submount assembly with a cap shown with solder plug hermetic seal.

In addition to the many options described herein for evacuating a capped sub-assembly, another innovation is described in which the cap is bonded into place and evacuated through an opening in the cap as shown in FIG. 28. In some embodiments, the capability to perform a final hermetic seal for a capped submount assembly with the cap in place is preferred over the formation of a hermetic seal during the installation of the cap. FIG. 28A shows an embodiment of a structure in which an opening 2897 is formed in the cap 2800 to allow atmospheric gases to be evacuated, exhausted, displaced, or one or more of these processes, from the capped cavity region 2820 of the submount assembly 2810 and replaced with an inert gas such as dry nitrogen or a mixture of gases, after which, the opening 2897 in the cap 2800 is then sealed with a solder plug 2893. Other sealing materials other than solder are used in other embodiments. Although other materials other than solder can be utilized to form the hermetic seal 2893 of the opening 2897 in the cap 2800, this method is hereinafter referred to as the "solder plug hermetic seal."

In FIG. 28A, optoelectrical devices 2854 are shown within a cavity 2820 formed by a subassembly substrate 2810 and a cap 2800. FIG. 28a shows a top view, cross section, and end view of an exemplary sub-mount assembly 2810. The cross section is taken through the opening 2897 and includes a projection of the optoelectronic devices 2854 onto this cross section. Also included in FIG. 28A is hermetic seal 2850 used to bond the cap 2800 to the subassembly 2810, and in embodiments, to the waveguide layer 2857. In an embodiment, the cavity 2820 is evacuated or purged with an inert gas through opening 2897 without the solder plug 2893. While in a purged or vacuum environment, the solder plug 2893 is applied to the opening 2897 to seal the vacuum or inert gas in the cavity 2820. FIG. 28A shows an embodiment of a subassembly that includes the loop back waveguide structure 2798 as was shown in FIG. 27.

Figure 28B:
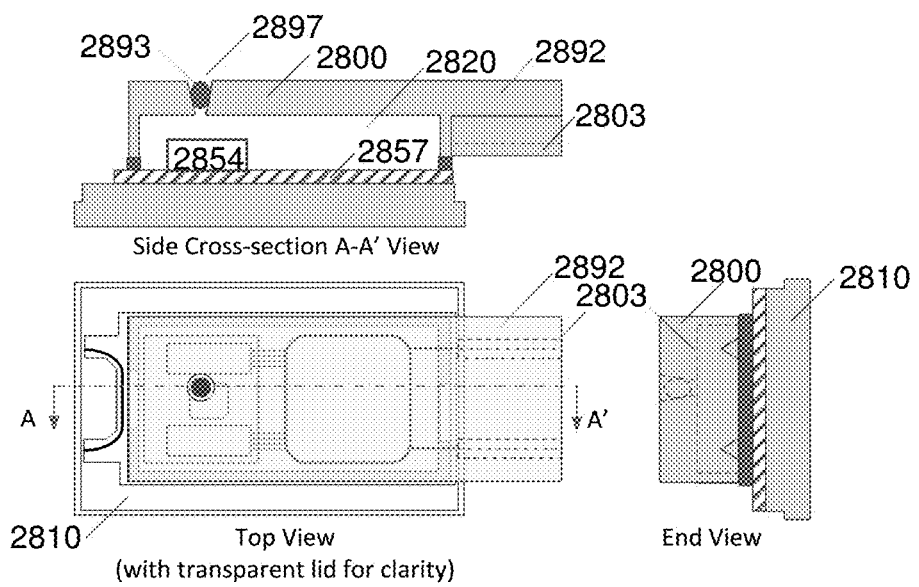

The solder plug hermetic seal 2893 is shown in FIG. 28B for an embodiment in which the cap 2800 includes a cantilevered section 2892 for mounting an optical fibers, or in some embodiments, multiple optical fibers. Optical fibers 2059, for example, are mounted into v-groove 2803 formed in the cantilevered portion 2892 of the cap 2800. In other embodiments, as shown in multiple figures herein, v-grooves are formed in the substrates, interposers, or sub-mount assemblies, to facilitate the attachment of optical fibers directly to the these substrates. Attachment of the optical fibers to the cap assembly enables the fibers to be attached to a less costly portion of the assembly, namely the cap 2800. In general, the cap 2800 does not contain active devices and is therefore a more favorable location for adhering the optical fibers. Limitations to the attachment of the optical fibers to the cap 2800, such as the alignment of the optical fibers to the devices in the sub-mount assembly 2810, are overcome with the formation of v-grooves in the cap and the use of the planar waveguides below the hermetic sealing surface to allow the optical signals to be controllably delivered to devices 2854 within the cavity 2820.

High density packaging of optical subassemblies is increasingly benefiting from higher precision alignment of hermetic and non-hermetic capping structures that isolate completed electro-optical assemblies from atmosphere. Electro-optical subassemblies include lasers, photodetectors, waveguides, and other device elements. Isolation from atmosphere is an important consideration for long term reliability of the completed assembly. Placement and alignment accuracy of +/−0.5 um, or less, is generally required for effective optical waveguide alignment, for example. Precision actuators are commonly used for positioning the cap die over the submount to map mating alignment marks between the cap 2800 and sub-mount 2810.

In certain applications of photonic device assemblies, the cap 2800 contains functional elements to support the functionality of the sub-mount assembly 2810. An example of a function that can be implemented in the cap 2800 includes the use of a lensed window to allow for the transmission of light in and out of the sealed assembly. Yet another example is the use of a mirror on the interior surface of the cap 2800 to reflect light in an optical circuit within the capped assembly. In these examples, precision cap alignment is necessary to ensure optimal performance of the optical device and system.

Figure 29A:
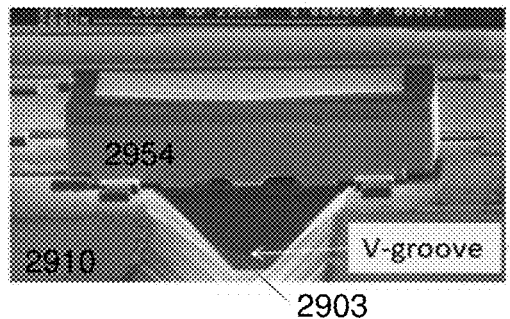
FIG. 29A-29B show FIG. 29A Scanning electron microscope image of the top surface of a submount assembly that contains a V-groove for mounting an optical fiber.
Figure 29B:
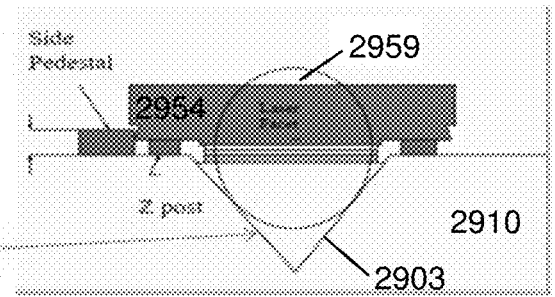
Figure 30A:
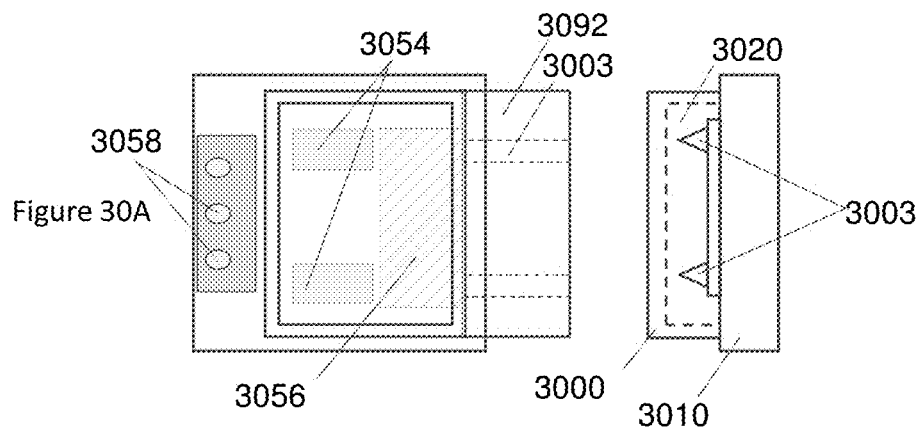
FIG. 30A-30D show a cantilevered submount assembly cap with V-grooves for mounting optical fibers.
Figure 30B:
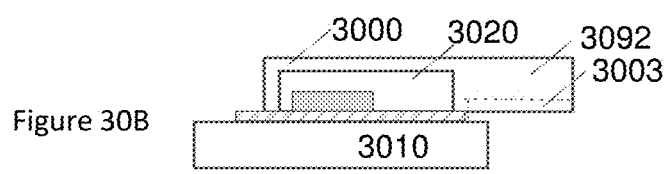
Figure 30C:
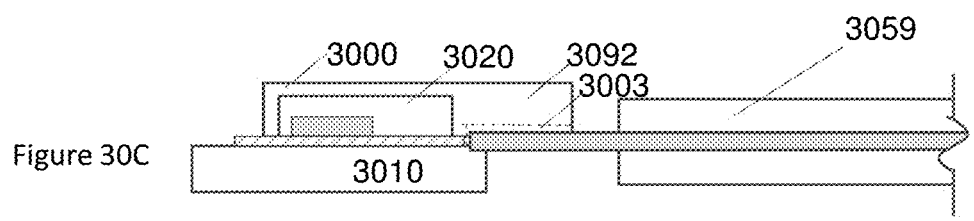
Figure 30D:
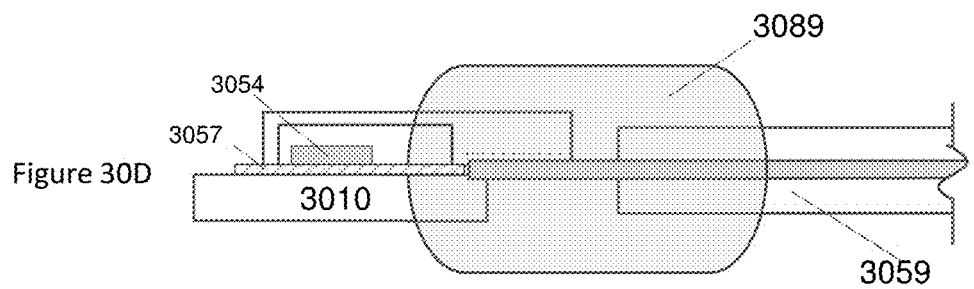

Optical fibers 2959 are used to deliver light signals to, and receive light signal from, optical communication networks. Optical fibers 2959 in these networks are connected to submount assemblies using mounting techniques that provide stable mechanical connection with the capability to align the incoming fiber 2959 with devices 2954 in the onboard optical circuit. A V-groove 2903, such as shown in FIG. 29A, is a commonly used method for mechanically aligning optical fibers 2959 to devices on the submount assembly 2910 as described elsewhere herein. A V-groove 2903 is formed in the submount substrate 2910, and an optical fiber 2959 is positioned within the V-groove 2903 and bonded using a suitable adhesive material to secure the fiber 2959 in place in the V-groove. Alternatively, a mechanical mount can be used to hold the fiber in place in other embodiments. Appropriate sizing and placement of the V-groove 2959 ensures that the fiber 2959, once attached, is aligned with the mounted devices on the submount assembly as shown in FIG. 29B.

In an embodiment of the inventive ODI, precision alignment of the cap is used along with a cantilevered section 3092 of the cap structure 3000 to align and mount optical fibers 3059. The optical fibers 3059 that are mounted onto the cantilevered section 3092 and subsequently interface with the optical circuit within the capped area for which the cap 3000 is an integral part.

In the inventive cap structures 3000 with cantilevered sections 3092, V-grooves 3003 are provided in the cantilevered section 3092 as shown in FIG. 30. The V-grooves 3003 are formed in the cantilevered portion 3092 of the cap 3000 to which the optical fibers 3059 are mounted in some embodiments. In cantilevered section 3092, V-grooves 3003 provide mechanical support for the fibers 3059 and for alignment of the optical fibers 3059 to optical devices 3056 and optoelectronic devices 3054 located in the submount assembly cavity 3020. These elements are shown in the FIG. 30A in the top view of a capped subassembly. The cap 3000 is shown as transparent in FIG. 30A to show the devices 3054, 3056 and structure within the capped assembly in FIG. 30*a*. Side views of the capped subassembly are shown in FIG. 30B without an optical fiber 3059, in FIG. 30C with an optical fiber in position in the V-groove 3003, and in FIG. 30D for an embodiment in which the optical fiber is held in place with stress relief material 3089. In some embodiments, the stress relief material is an adhesive material that is used to maintain the alignment between the mounted optical fiber 3059 and the capped subassembly 3010. In other embodiments, the stress relief material 3089 is a type of glue. The attached optical fiber 3059 delivers optical signals to, and receives optical signals from, the capped subassembly through edge contact with the planar optical waveguide structure 3057 in some embodiments.

In yet another embodiment of the current invention, the optical fibers 3059 are attached to the cantilevered section of the cap using an adhesive material. In yet another embodiment, a mounting element such as a clamp for attaching optical fibers to the cap 3800 of a submount assembly 3810 is provided. In yet another embodiment of the current invention, a mounting element such as a clamp is used to fix an optical fiber 3059 in place and is attached to the cantilevered section 3092 of the cap using an adhesive material.

Figure 31:
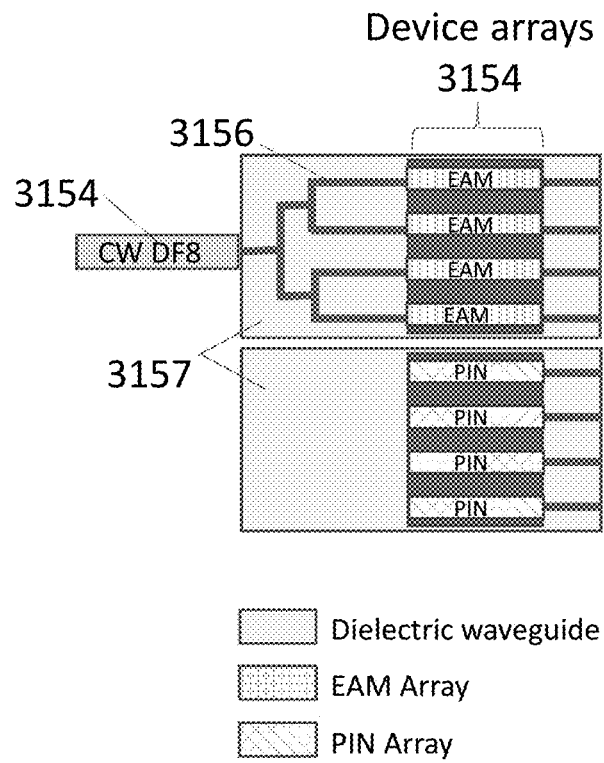
FIG. 31 shows a 400G DR4 Optical Engine Block Architecture shown with a summary of the benefits of the optical Dielectric Interposer.
Figure 32:
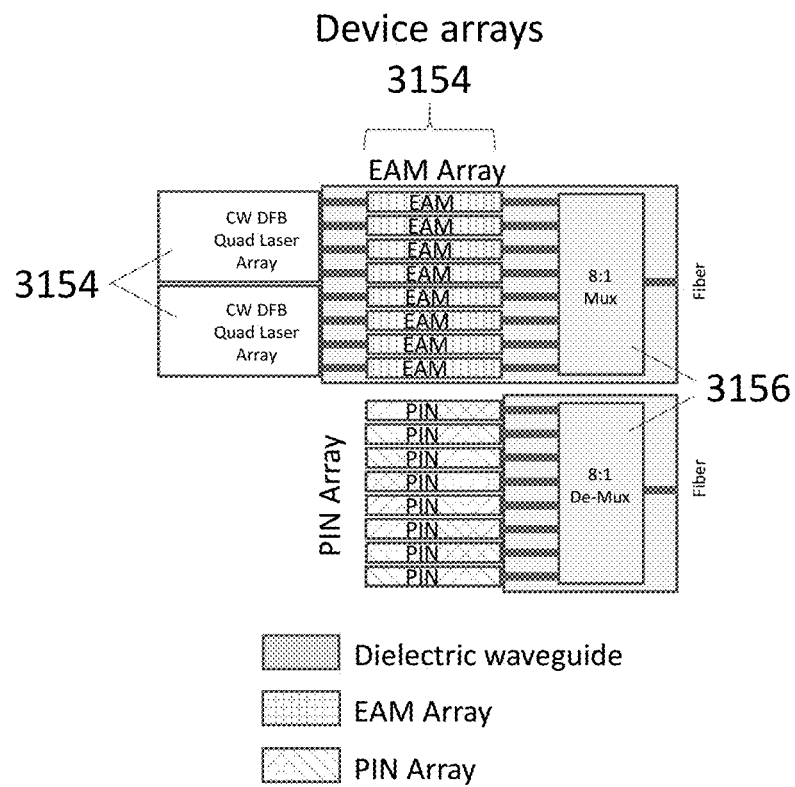
FIG. 32 shows a 400G Base-FR8 Optical Engine Block Architecture using ODIs.

In an embodiment, the optical dielectric interposer with the planar dielectric waveguide structure formed on the substrate, interposer, or sub-mount assembly is used to enable a low cost platform for advanced optical communication architectures. In yet another embodiment, a 400G optical engine block architecture that benefits from the planar waveguide features of the ODI as described in FIG. 31 and FIG. 32 is fabricated using the ODI. Co-design of the active components in embodiments of the inventive ODI allows for passive placement of the active device components. Additionally, pick-and-place die attachment components and equipment are utilized for one or more of the continuous wave distributed feedback lasers (CW DFB), the p-i-n diode photodetectors (PIN), the electro absorption modulator (EAM) arrays, the wafer level testing with the loop back waveguides, and hermetic sealing of the cap. In FIG. 31, an embodiment of the 400G DR4 Optical engine block architecture is shown. Laser 3154 is shown in a position to deliver optical signals to optical waveguide structure 3156 fabricated on substrate 3110 with waveguide layer 3157

In yet other embodiments of the inventive ODI, low cost assembly platform for multi-channel architectures such as the 400GBASE-FR8 and the 400GBASE-LR8 are enabled resulting in mitigated costs of the optics in multi-channel optoelectronic circuits through the use of low cost multiplexers and demultiplexers using photolithographically patterned dielectric gratings directly in the interposer in contrast to the more costly approach of the fabrication and mounting of discrete optical elements into the submount assembly. Additionally, in these architectures, pick-and-place die attach of the CW DFB lasers, PIN devices, and EAM devices are implemented. Additionally, in yet other embodiments, the capability for separating the DFB and EAM devices enables higher yielding array form factors.

In yet other embodiments, the inventive ODI technology provides numerous benefits in the platforms described in FIG. 31 and FIG. 32. These benefits are extended to a wide range of existing photonic and optoelectronic circuits and these benefits also provide for, and enable device architectures through the integral, low optical loss waveguides constructed on the assembly platform. The ODI platform provides numerous space-saving and cost saving benefits.

Techniques consistent with the present invention provide, among other features, methods for the formation of an hermetic seal on electrical, optoelectrical, and other device packages. While various exemplary embodiments of the disclosed system and method have been described herein it should be understood that the descriptive embodiments have been presented for purposes of example, and the descriptions are not exhaustive and do not limit the invention to the precise forms disclosed. Additionally, techniques consistent with the formation and utilization of planar dielectric waveguide layers in the formation of the hermetic seal structures that allow for the transfer of optical signals to devices within capped sub-assemblies and interposers have also been presented.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:
1. A method comprising
   forming an assembly,
      wherein the assembly comprises a first substrate in contact with a second substrate, wherein the first substrate comprises a first wall forming a close-loop boundary defining a volume between the first and second substrates,
wherein the first wall comprises portions having different heights configured so that the first substrate contacting the second substrate with at least an opening,
wherein the second substrate comprises a boundary line or a second wall,
wherein the boundary line or the second wall is configured to contact the first wall;
placing the assembly in a chamber;
conditioning an ambient in the chamber,
wherein conditioning the ambient comprises at least one of
evacuating gases in the chamber, or
flowing an inactive gas or an inert gas to the chamber, or
flowing an inactive gas or an inert gas to the chamber having an exhaust, or
evacuating gases in the chamber, followed by flowing an inactive gas or an inert gas to the chamber, or
performing multiple cycles of evacuating gases in the chamber and flowing an inactive gas or an inert gas to the chamber;
supplying a heat source to heat the wall to form a hermetic seal for the volume,
wherein supplying the heat source to heat the wall comprises at least one of
flowing a hot inactive gas or a hot inert gas to the chamber, or
heating ambient in the chamber, or
supplying an IR heating directed toward the assembly, or
heating the chamber, or
heating a support on which the assembly is located.

2. A method as in claim 1, further comprising
supplying the heat source to heat the assembly to remove water vapor,
wherein heating the assembly to remove water vapor comprises a lower temperature than heating the wall to form a hermetic seal to not forming the hermetic seal.

3. A method as in claim 1,
wherein the second wall comprises portions having different heights configured so that the second wall contacting the wall with at least a second opening.

4. A method as in claim 1,
wherein the wall comprises multiple solder balls disposed on a flat top portion,
wherein the multiple solder balls are space apart to provide the different heights.

5. A method as in claim 1,
wherein contact areas between the first and second substrates comprise Al, Ag, Ni, Au, Pd, or alloys thereof.

6. A method as in claim 1,
wherein the first wall is configured to have a waveguide passing through while still maintaining the hermetic seal.

7. A method as in claim 1,
wherein the first wall is configured to surround at least one of an optical element, or a semiconductor device.

8. A method as in claim 1, further comprising
applying a force on the assembly.

9. A method comprising
forming an assembly,
wherein the assembly comprises a first substrate in contact with a second substrate,
wherein the first substrate comprises a wall forming a close-loop boundary,
wherein the wall comprises portions having different heights configured so that the first substrate contacting the second substrate with at least an opening;
placing the assembly on a support in a chamber;
heating the support to form a hermetic seal around the close-loop boundary.

10. A method as in claim 9,
wherein supplying the heat source to heat the wall comprises at least one of
flowing a hot inactive gas or a hot inert gas to the chamber, or
heating ambient in the chamber, or
supplying an IR heating directed toward the assembly, or
heating the chamber, or
heating a support on which the assembly is located.

11. A method as in claim 9, further comprising
conditioning an ambient in the chamber before supplying the heat source,
wherein conditioning the ambient comprises at least one of
evacuating gases in the chamber, or
flowing an inactive gas or an inert gas to the chamber, or
flowing an inactive gas or an inert gas to the chamber having an exhaust, or
evacuating gases in the chamber, followed by flowing an inactive gas or an inert gas to the chamber, or
performing multiple cycles of evacuating gases in the chamber and flowing an inactive gas or an inert gas to the chamber.

12. A method as in claim 9,
wherein the wall comprises multiple separated columns, or
wherein the wall comprises columns with different heights.

13. A method as in claim 9,
wherein the wall comprises multiple solder balls disposed on a flat top portion,
wherein the multiple solder balls are space apart to provide the different heights,
wherein the multiple solder balls comprise an alloy of at least one of tin, copper, bismuth, lead, silver, gold, or indium.

14. A method as in claim 9,
wherein the wall is configured to have a waveguide passing through while still maintaining the hermetic seal.

15. A method as in claim 9, further comprising
applying a force on the assembly.

16. A method comprising
forming an assembly,
wherein the assembly comprises a first substrate in contact with a second substrate,
wherein the first substrate comprises a wall forming a close-loop boundary,
wherein the wall comprises portions having different heights configured so that the first substrate contacting the second substrate with at least an opening;
placing the assembly in a chamber;
flowing a heated gas to the chamber to form a hermetic seal around the close-loop boundary.

17. A method as in claim 16,
wherein supplying the heat source to heat the wall comprises at least one of
  flowing a hot inactive gas or a hot inert gas to the chamber, or
  heating ambient in the chamber, or
  supplying an IR heating directed toward the assembly, or
  heating the chamber, or
  heating a support on which the assembly is located.

18. A method as in claim 16, further comprising
conditioning an ambient in the chamber before supplying the heat source,
  wherein conditioning the ambient comprises at least one of
    evacuating gases in the chamber, or
    flowing an inactive gas or an inert gas to the chamber, or
    flowing an inactive gas or an inert gas to the chamber having an exhaust, or
    evacuating gases in the chamber, followed by flowing an inactive gas or an inert gas to the chamber, or
    performing multiple cycles of evacuating gases in the chamber and flowing an inactive gas or an inert gas to the chamber.

19. A method as in claim 16, further comprising
forming a boundary line or a second wall on the second substrate,
  wherein the boundary line or the second wall is configured to contact the wall.

20. A method as in claim 16, further comprising
forming a boundary line on the second substrate,
  wherein the boundary line comprises a metal or an alloy configured to contact a metal or alloy top portion of the wall.

* * * * *